(12) United States Patent
St-Amant

(10) Patent No.: US 11,275,556 B2
(45) Date of Patent: Mar. 15, 2022

(54) METHOD, COMPUTER-READABLE MEDIUM, AND PROCESSING UNIT FOR PROGRAMMING USING TRANSFORMS ON HETEROGENEOUS DATA

(71) Applicant: ZETANE SYSTEMS INC., Québec (CA)

(72) Inventor: Patrick St-Amant, Québec (CA)

(73) Assignee: ZETANE SYSTEMS INC., Saint-Lazare (CA)

( * ) Notice: Subject to any disclaimer, the term of this patent is extended or adjusted under 35 U.S.C. 154(b) by 0 days.

(21) Appl. No.: 16/971,805

(22) PCT Filed: Feb. 27, 2019

(86) PCT No.: PCT/IB2019/051577
§ 371 (c)(1),
(2) Date: Aug. 21, 2020

(87) PCT Pub. No.: WO2019/166967
PCT Pub. Date: Sep. 6, 2019

(65) Prior Publication Data
US 2021/0037262 A1  Feb. 4, 2021

Related U.S. Application Data

(60) Provisional application No. 62/635,627, filed on Feb. 27, 2018.

(51) Int. Cl.
*G06F 7/00* (2006.01)
*H04N 19/146* (2014.01)
(Continued)

(52) U.S. Cl.
CPC ............... *G06F 7/00* (2013.01); *G06F 8/34* (2013.01); *G06F 9/06* (2013.01); *G06F 16/258* (2019.01); *H04N 19/146* (2014.11); *H04N 19/63* (2014.11)

(58) Field of Classification Search
CPC .... G06F 2212/1016; G06F 30/20; G06F 7/00; G06F 11/2097; G06F 8/33; G06F 8/34;
(Continued)

(56) References Cited

U.S. PATENT DOCUMENTS 4,644,461 A   2/1987  Jennings
5,182,642 A *  1/1993  Gersdorff ................. H04N 7/54
                                                375/240.01

(Continued)

OTHER PUBLICATIONS

International Search Report and Written Opinion dated Jun. 3, 2019 in international patent application No. PCT/IB2019/051577, 6 pages.

*Primary Examiner* — Helen Rossoshek
(74) *Attorney, Agent, or Firm* — Blueshift IP, LLC; Robert Plotkin

(57) ABSTRACT

There is provided a processing unit device comprising: at least one control unit for controlling operations of the processing unit device; and a transform logic unit comprising at least one transform block associated with a transform to be executed by the at least one control unit, the transform comprising an effect to be applied to an output site contained in an output universe, each one of the at least one transform block comprising an effect block and an outsite block, the effect block comprising at least one first storing unit for storing thereon information relative to the effect and the outsite block comprising at least one second storing unit for storing thereon information relative to the output site.

20 Claims, 44 Drawing Sheets

(51) Int. Cl.
*H04N 19/63* (2014.01)
*G06F 8/34* (2018.01)
*G06F 9/06* (2006.01)
*G06F 16/25* (2019.01)

(58) Field of Classification Search
CPC ......... G06F 9/06; G06F 9/5027; H04N 19/63; H04N 19/146; G06N 10/00; G11C 7/1006
See application file for complete search history.

(56) References Cited

U.S. PATENT DOCUMENTS

| | | | |
|---|---|---|---|
| 5,339,265 A | 8/1994 | Liu | |
| 5,386,568 A | 1/1995 | Wold | |
| 5,699,286 A * | 12/1997 | Lee | G06F 17/148 708/626 |
| 5,748,192 A * | 5/1998 | Lindholm | G06T 3/005 345/427 |
| 5,768,561 A * | 6/1998 | Wise | G06F 3/14 709/221 |
| 6,061,705 A * | 5/2000 | Hellberg | G06F 17/142 708/408 |
| 6,271,875 B1* | 8/2001 | Shimizu | G06F 3/011 348/169 |
| 6,684,789 B2* | 2/2004 | Krautter | G06F 3/1206 101/484 |
| 6,806,883 B2* | 10/2004 | Lavelle | G09G 5/363 345/520 |
| 6,885,375 B2* | 4/2005 | Emberling | G06T 1/20 345/506 |
| 6,914,637 B1* | 7/2005 | Wolf | H04N 21/2383 348/473 |
| 6,920,457 B2* | 7/2005 | Pressmar | G06F 16/282 |
| 6,985,630 B2* | 1/2006 | Kajiwara | H04N 19/70 375/240.19 |
| 7,149,362 B2* | 12/2006 | Lafruit | G06F 17/148 382/240 |
| 7,333,114 B2 | 2/2008 | Andrews | |
| 7,340,462 B2* | 3/2008 | Bertrand | G06F 21/34 |
| 7,385,940 B1* | 6/2008 | Harrow | G06F 9/5027 370/204 |
| 7,613,761 B2* | 11/2009 | Hou | G06F 17/147 708/402 |
| 7,916,177 B2* | 3/2011 | Motomura | H04N 5/23264 348/208.4 |
| 7,936,376 B2* | 5/2011 | Fukuhara | H04N 19/152 348/222.1 |
| 8,060,857 B2* | 11/2011 | Biggerstaff | G06F 8/456 717/106 |
| 8,443,205 B2* | 5/2013 | Kolesnikov | H04L 9/06 713/189 |
| 8,498,413 B2* | 7/2013 | Kita | G06T 1/0021 380/243 |
| 8,897,582 B2* | 11/2014 | Amano | H04N 19/122 382/233 |
| 8,958,472 B2* | 2/2015 | Kung | H04N 19/146 375/240 |
| 8,984,488 B2* | 3/2015 | Bhatt | G06F 11/3684 717/126 |
| 9,106,933 B1* | 8/2015 | Bankoski | H04N 19/14 |
| 9,235,201 B2* | 1/2016 | Umeda | G05B 13/048 |
| 9,511,226 B2* | 12/2016 | Pelizzone | A61N 1/36038 |
| 10,142,628 B1* | 11/2018 | Mukherjee | H04N 19/176 |
| 10,256,974 B1* | 4/2019 | Rodriguez De Castro | H04L 9/0877 |
| 10,652,633 B2* | 5/2020 | Borrelli | G06T 11/60 |
| 10,768,904 B2* | 9/2020 | Wenskovitch, Jr. | G06F 3/04847 |
| 2002/0154825 A1* | 10/2002 | Okada | H04N 19/63 382/239 |
| 2003/0223647 A1* | 12/2003 | So | H04N 19/176 382/248 |
| 2004/0150625 A1* | 8/2004 | Shih | G06F 3/038 345/168 |
| 2007/0165959 A1* | 7/2007 | Takada | H04N 19/124 382/240 |
| 2008/0013845 A1* | 1/2008 | Fukuhara | H04N 19/63 382/240 |
| 2008/0199104 A1* | 8/2008 | Mushano | G06T 3/608 382/296 |
| 2008/0319730 A1* | 12/2008 | Clark | G06F 30/20 703/19 |
| 2011/0302397 A1* | 12/2011 | Mitola, III | G06F 9/524 712/241 |
| 2012/0010879 A1* | 1/2012 | Tsujino | G10L 19/03 704/203 |
| 2012/0128065 A1* | 5/2012 | Shibahara | H04N 19/122 375/240.03 |
| 2016/0371871 A1* | 12/2016 | Aguado | G06T 13/20 |
| 2017/0192827 A1* | 7/2017 | Ghafourifar | G06F 9/543 |
| 2017/0300911 A1* | 10/2017 | Alnajem | G06Q 10/0635 |
| 2018/0246703 A1* | 8/2018 | Ren | G06F 8/313 |
| 2020/0042410 A1* | 2/2020 | Gupta | G06F 11/2038 |
| 2020/0074035 A1* | 3/2020 | Javadiabhari | G06F 30/337 |
| 2020/0293828 A1* | 9/2020 | Wang | G06K 9/6257 |
| 2020/0296155 A1* | 9/2020 | McGrath | G06F 9/5027 |

\* cited by examiner

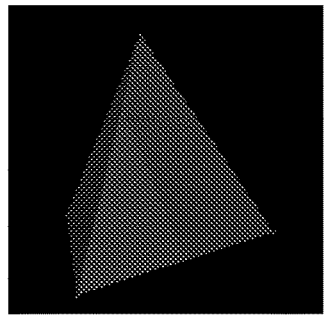
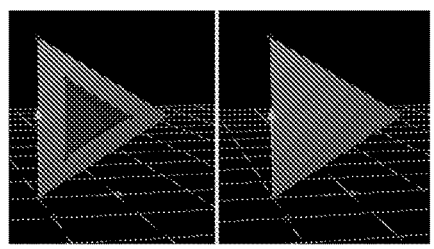
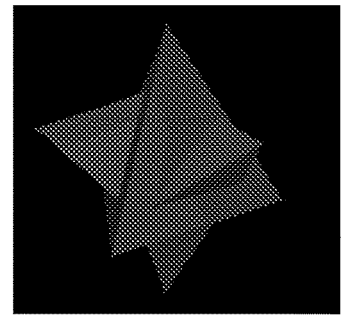
FIGURE 38a  FIGURE 38b  FIGURE 38c
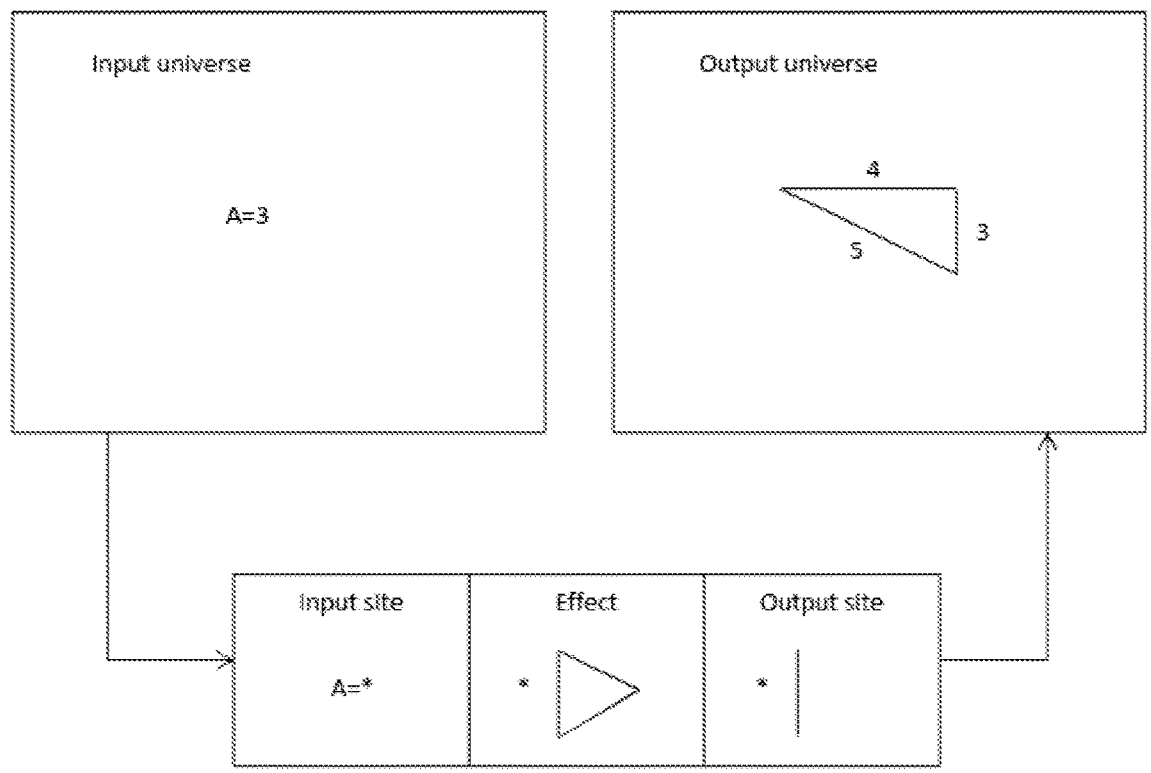
FIGURE 39

METHOD, COMPUTER-READABLE MEDIUM, AND PROCESSING UNIT FOR PROGRAMMING USING TRANSFORMS ON HETEROGENEOUS DATA

TECHNICAL FIELD

The present invention relates to the field of computers, and more particularly to processing units for heterogeneous data.

BACKGROUND

High-performance computing and supercomputing have been behind many achievements such as the discovery of the Higgs Boson (CERN) and sequencing of the human genome (Human Genome Project). It is believed that high performance computing (HPC) and supercomputing are expected to have a profound impact on domains such as healthcare and medicine, modeling and simulation, security, fintech, engineering and manufacturing industries.

The HPC and supercomputing community are facing challenges that need to be addressed to have a deeper impact on the above industries. Some of the challenges are to handle scalability at both the hardware and software level, represent and process multilevel hierarchy, achieve heterogeneous-data fusion and address the human bottleneck problem which is to find alternative ways to compensate for human cognitive weaknesses. Prior art processors and computer systems capability need to evolve further to handle exascale computing and beyond, and there is also a need for common tools that are functionally complete that are also easy to use and understand so that researchers and the industry to take advantage of supercomputers.

Furthermore, a large number of systems have been developed to perform computer models or simulation. These systems are usually restricted to a few applications and most often can only be used in one field of knowledge. As a result, an expert in a system is not fluent in other systems unless considerable efforts are spent in training and learning. Moreover, models and simulation models are usually not compatible between platforms. Some companies offer some degree of compatibility within their product's ecosystem, but often the users need to know each product and understand their respective methods, techniques and modeling paradigms, which is an important drawback.

Some simulation software or solutions offer software development kits (SDK) or access to a scripting language. These scripting languages are usually textual and resemble programming languages such as C++™, C#™, Java™ or Python™. For such software languages, a user will quickly hit what can be referred to as a "coding barrier" which has the effect of greatly limiting the type of user who can use the software. To make the software more widely accessible, the vendors of these software sometime hide the code, functions and script in blocks that are displayed in a 2D visual interface as a symbol. By adding multiple blocks and interconnecting them, a block diagram is created and represents a simulation model, presented in 2D. After running the simulation, outputs can be displayed in 2D graphs to help analysis. In such a system, there is a gap between the representation of the physical model and data related to the physical model. For example, although one can access and graph the forces acting on the wheels of a car, there is no 3D model of a car with its wheels turning. In the automotive industry, different parts can be interconnected and simulated, but these simulations will be discarded when the car will be designed. Such simulations are meant to study abstract information about a product and mostly relies on differential equations. Because a user needs advanced knowledge of physics and mathematics, such programming systems are to be used only by trained persons such as engineers or researchers.

Modern scientific and corporate projects are now multi-disciplinary, collaborative, worldwide and highly complex. There are many large multidisciplinary project initiatives regrouping a large number of corporate and public entities (Virtual Physiological Human Project, Human brain project, BRAIN Initiative). In such projects, only a fraction of the participants have the skills to create models and simulations. Most participants are experts in their highly-specialized field and it is difficult for them to communicate their knowledge to experts in other fields or integrate their knowledge into a large cohesive model.

Therefore, there is a need for an improved processing unit architecture that allows for improved programming method.

SUMMARY

According to a first broad aspect, there is provided a processing unit device comprising: at least one control unit for controlling operations of the processing unit device; and a transform logic unit comprising at least one transform block associated with a transform to be executed by the at least one control unit, the transform comprising an effect to be applied to an output site contained in an output universe, each one of the at least one transform block comprising an effect block and an outsite block, the effect block comprising at least one first storing unit for storing thereon information relative to the effect and the outsite block comprising at least one second storing unit for storing thereon information relative to the output site.

In one embodiment, the at least one control unit is configured for executing the transform further using a transform-form instruction set comprising transform data defining parameters for the transform.

In one embodiment, the at least one control unit is included in the transform logic unit.

In one embodiment, the at least one control unit is included in a one of the at least one transform block.

In one embodiment, the at least one control unit comprises a plurality of control units and the at least one transform block comprises a plurality of transform blocks, each one of the plurality of control units being included in a respective one of the plurality of transform blocks.

In one embodiment, the at least one control unit comprises at least one first logic unit included in the effect block and at least one second logic unit included in the outsite block.

In one embodiment, the at least one first logic unit and the at least one second logic unit comprise one of arithmetic logic units and logic gates.

In one embodiment, the at least one control unit further comprises a central unit included in the transform logic unit.

In one embodiment, the at least one control unit is connectable to an external memory.

In one embodiment, information about the output universe is stored on the external memory.

In one embodiment, the processing unit device further comprises an internal memory.

In one embodiment, information about the output universe is stored on the internal memory.

In one embodiment, information about the output universe is stored on at least one of some of the first storing units and some of the second storing units.

In one embodiment, the at least one first storing unit and the at least one second storing unit comprise registers.

In one embodiment, each one of the at least one transform block further comprises an insite block comprising at least one third sorting unit for storing thereon information relative to an input site contained in an input universe.

In one embodiment, the at least one control unit comprises a plurality of control units and the insite block comprises at least one the plurality of control units.

In one embodiment, each one of the at least one transform block further comprises:
- an insite scope block comprising at least one fourth sorting unit for storing thereon information relative to an input scope defining a subspace of the input universe; and
- an outsite scope block comprising at least one fifth sorting unit for storing thereon information relative to an output scope defining a subspace of the output universe.

According to another broad aspect, there is provided a processing unit device comprising: at least one control unit for controlling operations of the processing unit device; and a transform logic unit comprising at least one transform block associated with a transform to be executed by the at least one control unit, the transform comprising an effect to be modified with information from an input site contained in an input universe, each one of the at least one transform block comprising an effect block and an insite block, the effect block comprising at least one first storing unit for storing thereon information relative to the effect and the insite block comprising at least one second storing unit for storing thereon information relative to the input site.

In one embodiment, the at least one control unit is configured for executing the transform further using a transform-form instruction set comprising transform data defining parameters for the transform.

In one embodiment, the at least one control unit is included in the transform logic unit.

In one embodiment, the at least one control unit is included in a one of the at least one transform block.

In one embodiment, the at least one control unit comprises a plurality of control units and the at least one transform block comprises a plurality of transform blocks, each one of the plurality of control units being included in a respective one of the plurality of transform blocks.

In one embodiment, the at least one control unit comprises at least one first logic unit comprised in the effect block and at least one second logic unit comprised in the insite block.

In one embodiment, the at least one first logic unit and the at least one second logic unit comprise one of arithmetic logic units and logic gates.

In one embodiment, the at least one control unit further comprises a central unit included in the transform logic unit.

In one embodiment, the at least one control unit is connectable to an external memory.

In one embodiment, information about the input universe is stored on the external memory.

In one embodiment, the processing unit device further comprises an internal memory.

In one embodiment, information about the input universe is stored on the internal memory.

In one embodiment, information about the input universe is stored on at least one of some of the first storing units and some of the second storing units.

In one embodiment, the at least one first storing unit and the at least one second storing unit comprise registers.

In one embodiment, each one of the at least one transform block further comprises an outsite block comprising at least one third sorting unit for storing thereon information relative to an output site contained in an output universe.

In one embodiment, the at least one control unit comprises a plurality of control units and the output block comprises at least one the plurality of control units.

In one embodiment, each one of the at least one transform block further comprises:
- an insite scope block comprising at least one fourth sorting unit for storing thereon information relative to an input scope defining a subspace of the input universe; and
- an outsite scope block comprising at least one fifth sorting unit for storing thereon information relative to an output scope defining a subspace of the output universe.

According to a further broad aspect, there is provided a computer-implemented method for programming comprising: receiving a transform comprising at least an output site identifying a form contained in an output universe and an effect to be applied to the form; retrieving an output match with the output site from the output universe; applying the effect to the retrieved output match, thereby obtaining a modified output match; and outputting the modified output match.

In one embodiment, the step of outputting the modified output match comprises displaying a graphical presentation of the output universe and the modified output match within the output universe.

In one embodiment, the method further comprises displaying a user graphical interface comprising a first section for representing the output universe and a second section for displaying a graphical representation of the transform, said outputting the modified output match comprising displaying the modified output match within the first section of the user graphical interface.

In one embodiment, the transform further comprises transform data defining parameters for the transform, said applying the effect to the retrieved output match being performed using the transform data.

In one embodiment, the transform further comprises an input site, the method further comprising retrieving an input match with the input site from an input universe, said applying the effect to the retrieved output match being performed using information associated with the retrieved input match.

In one embodiment, the method further comprises displaying a user graphical interface comprising a first section for representing the output universe, a second section for defining the effect and a third section for representing the input universe.

In one embodiment, the method further comprises:
- displaying the input site into the third section of the graphical user interface;
- displaying a graphical representation of the effect into the second section of the graphical user interface; and
- displaying the output site into the first section of the graphical user interface.

In one embodiment, the method further comprises receiving at least one of an input scope and an output scope, the input scope defining a subspace of the input universe and the output scope defining a subspace of the output universe, the input match being selected from the subspace of the input universe and the output match being selected from the subspace of the output universe.

In one embodiment, the method further comprises displaying a user graphical interface comprising a first section for representing the output universe, a second section for defining the effect, a third section for representing the input universe, a fourth section for displaying the output scope and a fifth section for displaying the input scope.

In one embodiment, the method further comprises:
displaying the input site into the third section of the graphical user interface;
displaying a graphical representation of the effect into the second section of the graphical user interface;
displaying the output site into the first section of the graphical user interface;
displaying a graphical representation of the output scope in the fourth section of the graphical user interface; and
displaying a graphical representation of the input scope in the fifth section of the graphical user interface.

According to still another broad aspect, there is provided a system for programming, the system comprising communication means, a memory having stored statements and instructions and a processing unit configured for executing the steps of the above-described method.

According to still another broad aspect, there is provided a computer program product comprising a computer readable memory storing computer executable instructions thereon that when executed by a computer perform the steps of the above-described method.

According to still a further broad aspect, there is provided a computer-implemented method for programming comprising: receiving a transform comprising at least an input site identifying a form and an effect to be applied to the form; retrieving an input match with the input site from the input universe; modifying the effect using information associated with the input match, thereby obtaining a modified effect; and outputting the modified effect.

In one embodiment, the step of outputting the modified effect comprises displaying a graphical presentation of the modified effect.

In one embodiment, the method further comprises displaying a user graphical interface comprising a first section for representing the input universe and a second section for displaying a graphical representation of the transform, said outputting the modified effect comprising displaying the modified effect within the second section of the user graphical interface.

In one embodiment, the transform further comprises transform data defining parameters for the transform, said modifying the effect being performed using the transform data.

In one embodiment, the transform further comprises an output site contained within an output universe.

In one embodiment, the method further comprises displaying a user graphical interface comprising a first section for representing the output universe, a second section for representing the modified effect and a third section for representing the input universe.

In one embodiment, the method further comprises displaying the input site into the third section of the graphical user interface;
displaying a graphical representation of the modified effect into the second section of the graphical user interface; and
displaying the output site into the first section of the graphical user interface.

In one embodiment, the method further comprises receiving at least one of an input scope and an output scope, the input scope defining a subspace of the input universe and the output scope defining a subspace of the output universe, the input match being selected from the subspace of the input universe.

In one embodiment, the method further comprises displaying a user graphical interface comprising a first section for representing the output universe, a second section for representing the modified effect, a third section for representing the input universe, a fourth section for displaying the output scope and a fifth section for displaying the input scope.

In one embodiment, the method further comprises:
displaying the input site into the third section of the graphical user interface;
displaying a graphical representation of the modified effect into the second section of the graphical user interface;
displaying the output site into the first section of the graphical user interface;
displaying a graphical representation of the output scope in the fourth section of the graphical user interface; and
displaying a graphical representation of the input scope in the fifth section of the graphical user interface.

According to still another embodiment, there is provided a system for programming, the system comprising communication means, a memory having stored statements and instructions and a processing unit configured for executing the steps of the above-described method.

According to still another embodiment, there is provided a computer program product comprising a computer readable memory storing computer executable instructions thereon that when executed by a computer perform the method steps of the above-described method.

For the purpose of the present description, a form should be understood as an element or collection of elements that may be an object such as a 2D object or a 3D object, text, a mathematical equation, a transform, a collection of forms, a collection of transforms, a collection of forms and transforms, objects representations, a set, a collection of sets, animation sequence, etc. Examples of a form includes representations of a car, a biological organism cat, molecules and atoms, a collection of trees, a symbol, a transform, etc. It should be understood that a collection of forms is also a form. Other examples of forms include 3D meshes in a 3D or 4D coordinate system, multidimensional vectors, tensors, artificial neural networks, artificial neural networks presented in 2D or 3D, tables, arrays, a voxel in a 3D coordinate system, representations of continuous structures such as shapes and real line, physical objects, symbols, symbols composed of pixels, words, script, code, numbers, functions, algorithms, equations, neural networks, data of any type (ex.: graphical, visual, sound, digital, images, texts, distance, measure, time, . . . ), data structures, filenames, z-buffer content, storage content, storage addresses, topologies, memory addresses, form objects, form object names, tags or representations with variables, sets of form objects, transforms, transform name, representations with its variables and sets for transforms, etc.

An input universe should be understood as a collection of forms associated to an input site. An input site should be understood as at least one form to be selected in the input universe. An input scope should be understood as a subspace of the input universe where the transform can take data from, i.e., it restricts the extraction of information to a certain subset/portion of an input universe. This subset/portion of an input universe can be represented as forms, sets (with union, negation and intersection operators), collections, regions, intervals, inequations and equations. In the case of inequations and equations, it is understood that the collection of their solutions constitute a subset/portion of the input universe.

An output universe should be understood as a collection of forms associated to an output site. An output site should be understood as at least one form that needs to be selected in the output universe. The output site may be seen as an indication of where the effect associated with a transform should be applied in the output universe or an identification of the form(s) of the output universe that should be replaced, added to, added next to or modified. An output scope should be understood as a subspace of the output universe where the transform can apply, i.e. it restricts the application of a transform to a certain subset/portion of an output universe. This subset/portion of an output universe can be represented as forms, sets (with union, negation and intersection operators), collections, regions, intervals, inequations and equations. In the case of inequations and equations, it is understood that the collection of their solutions constitute a subset/portion of the input universe.

An effect should be understood as a whole new form or a form constituted of form(s) of input site(s), output site or parts of the input and output sites. For example, an effect may change a property of the form defined in the output site, such as changing the shape of the form. In another example, an effect may add a form to the form defined in the output site.

The transform data refer to a set of information/parameters (number of times, names, collections of forms, etc.) to be used for the effect associated with the transform.

A transform is constituted of at least an effect and an output site (which can optionally include an output scope) and/or an input site (which can optionally include an input scope).

A transform may further comprise transform data. In one embodiment, a transform is composed of six parts: an input scope, an input site, an effect, an output site, an output scope and transform data.

The input site is connected to the input universe and the output site is connected to the output universe. In one embodiment, the input universe may correspond to the output universe so that a single universe is present and the input site and the output site are both connected to the single universe.

In one embodiment, the present method and system may be used for creating dynamic models which are composed of forms on which sequences of transforms and/or parallel sequences of transforms are applied. A static or dynamic model can be seen as the result of the application of a sequence of transforms. It should be understood that any observed change in the world may be modeled using the present system and method.

A system should be understood as being a collection of forms. Most often, a system is more precisely a collection of forms with a collection of transforms applied to the forms. Moreover, systems are also considered to be forms.

In one embodiment, the system comprises a timeline, such that after an application of a transform, the system advances in the timeline. It should be understood that a timeline does not necessarily refer to time and can be also understood as steps taken in the application of the transforms. In one embodiment, the timeline may be synchronized with a real-world clock or a virtual clock.

The present transform processing unit device and its architecture which may be reproduced on a virtual machine allow for at least some of the below advantages in comparison to prior art processing devices such as Von Neumann processing devices. These advantages are related to processing speed, energy consumption, storage size, computation accuracy, precision, fidelity and/or scalability. Moreover, the present transform processing unit architecture brings novel solutions to multiple challenges in high-performance computing.

Interestingly, the present transform processing unit architecture based on transform blocks could be used to simulate a non-deterministic Turing Machine. For example, a modification to a transform block may trigger other multiple transform blocks (or branches) that in turn trigger other branches. This provides an example of how the present transform processing unit architecture can do multithreading and even split each thread further to other threads.

Because of its homogenous build (composed almost solely of transform blocks), a transform processing unit can be extended easily with multiple other transform processing units without facing interconnection issues related to disparate devices. In this transform processing unit architecture, extending the computation power of a computer amounts to connecting more transform processing units together.

In one embodiment, the transform blocks can be made to carry the idea of agent-based sub-processors where each transform block is understood to behave like an autonomous agent which acts and reacts based on its environment to contribute to global computational results.

In one embodiment, the present architecture of the transform processing unit device can be implemented with an internal clock.

In another embodiment such as in the case of an asynchronous processor, the present architecture of the transform processing unit device offers for clockless processing capabilities which in turn offer power efficiency, responsiveness and robustness.

The present architecture of the transform processing unit device can be used in the context of machine learning and artificial neural networks. It has been demonstrated in a virtual machine implementation of the present transform processing unit architecture that it is possible to create artificial neural networks and systems of neural networks that can be trained and used for inference. This means that machine learning algorithms can be designed and processed with transforms and forms, and thus can be deployed (or even trained) directly on the processor.

Artificial neural networks on the processor can be used to accomplish multiple internal optimization for speed and storage space. In particular, on processor auto-encoders can be used to compress data and pre-trained artificial neural networks trained to represent or approximate complex functions or operations can be deployed. Parts of the transform processing unit can be reserved for artificial neural networks or machine learning algorithms representation that can be used for processing and performing matching, or for accomplishing classification which dispatches operations to different computation pipelines that allow computation speedup. Moreover, this may also allow the transform processing unit to process external data at high speed through various machine learning algorithms not solely restricted to neural networks.

In one embodiment, systems of forms and transforms can be designed to create simulations. For example, the present transform processing unit device may be used to simulate a 3D beating heart by using the following transforms.

a transform that contracts a cell (effect: contracted cell, outsite: cell); and a transform that sends information to the neighbors of a cell (effect: contracted cell+contracted neighbor, outsite: contracted cell+neighbor).

After the contraction of a cell, the second transform will propagate contiguously the contraction to all the other connected cells resulting in a heartbeat. Encoding the 3D data produced from a heart magnetic resonance image onto the processor and running the processor with transforms encoded following the above principle provides a 3D heart simulation on a microchip.

The present transform may offer data heterogeneity solutions to some problems. Many modern microprocessors usually contain or one or many arithmetic logic units and floating-point units. They are geared towards efficiently performing arithmetic computations on numbers. The present transform processing unit allows performing computations on forms and other types of structured data directly on the processor and perform arithmetic operations in parallel or not. This may allow for handling structured data at processor speed and for users or software to define new data types that run directly on the processor.

Because of their dynamic and homogenous structure, transforms and forms, just-in-time and ahead-of-time compilations may be performed by the transform processing unit of embodiments of the present invention. In particular, ahead-of-time compilation of the transform-form instruction set allows creating machine code that can run natively on a target machine and thus bring faster execution speed, less disk space, etc. Ahead-of-time compilation of a dynamic language was found to bring significant speedup (16 times and more). Moreover, just-in-time compilation can perform optimization by compiling to machine code frequently used part of the code. Thanks to the universal structure of transforms and forms, such optimization opportunities may be frequent while executing transforms.

Since transforms and forms can represent models, methods and calculations in any domain, multiples different models from different domains can be converted into a single system of forms and transforms. Within this system, information between models (coming from different scientific domain for example) can be exchanged at high speed. If each model was implemented outside the present architecture, then before exchanging the information, a conversion step for converting the information is required each time information is exchanged between models, thereby significantly increasing the computation time. On the other, such a problem may be avoided while using the present transform processing unit architecture.

A main part of the execution time of a scientific program is usually spent processing loops. Loop transformations are known to improve execution speed of different types of loops. The present transform processing unit transforms can be used to represent loops. In comparison to other programming languages, the written code of transforms takes less space in memory or on disk. Furthermore, transforms can be themselves modified by other transforms and thus render the instruction set into a higher-order system. Therefore, transforms can be modified in a similar way as loop transformations, but with the advantage of allowing many new types of optimizations and providing a way to control them. This contrasts with the low amount of loop optimization that is usually offered by common modern compilers.

In one embodiment, transforms provide the opportunity to perform design by using local transforms and to design models based on direct observation of real-world systems. In other words, transforms allow to efficiently do agent-based simulation where global effect emerges from localized rules. This contrast with the way global equations are solved to determine solutions and local information and behavior.

For example, when designing a virtual heart, the present state-of-the-art techniques consists in using higher-order finite element methods and complex differential equations. Finding solutions to global differential equations and using finite element methods require expensive computations.

A cardiac muscle cell of the heart does not in reality rely on complex equation but only contract when the neighboring cells contract. As explained above, a set of transforms can be used to represent the contraction of a cell when neighbors contract, and thus allows to more accurately model reality and increase simulation precision and speed. Thus, transforms allow bypassing expansive computations and approximations related to solving global differential equations and applying finite element methods.

The transform blocks and their interaction with the forms data structures represent the main component of the present transform processing unit architecture. All processing of the data relies on transforms which can take, modify and move the data in a single command. With a single transform, large amount of data can be matched, computed on and brought to other places. Because a transform command naturally collects and processes data of homogenous data structure, this data can be easily processed in parallel on a GPU, multiple GPUs, multiple CPUs and processing cores in a virtual machine configuration. In particular, a transform marked to be applied n times can be made to be computed in one step in parallel. Transforms may be sent to a queue that processes the computations. Transforms that are independent can be each send to a different queue, thus allowing greater parallelization.

On a machine running the present architecture in the virtual machine configuration and since all heterogeneous data can be written as forms, data that is usually processed on a single thread can be processed in parallel with the use of transforms by embodiments of the transform processing unit herein. For example, on a computer with CPU and GPU while using the present architecture in the virtual machine configuration, data processed with transforms using the transform processing unit could be processed from 15 to 100 times faster than the same data processed through a classical architecture.

A transform collects matches with the input site and each match can be processed in parallel. Each match (which can be composed of multiple input site components) can then be used to compute the effect and the output site (each containing multiple sub-components). Then, the output site matches are collected and modified concurrently. Moreover, if a transform needs to be applied n times in parallel, then n identical transforms can be applied in parallel. Furthermore, multiple different transforms which can be applied in parallel will also be applied simultaneously.

Form data and transform commands that are written in a single way allow thus to transfer as much processing possible to the GPU, parallel device or the Zetane Machine, thus allowing speeds of up to 1000 times faster.

The present architecture allows for modularity. Each model written as forms and transforms can be saved/exported as a module. Modules can then be used and reused in other larger models, thus facilitating exchange of data and collaboration. Modules and models can be stored in memory and be accessed for processing by other modules by using memory addresses instead of data copies. This allows increasing the access and processing speed. The interconnection of the modules through their memory addresses allows reducing the usage of storage space and also reducing energy consumption of the machine.

In one embodiment, being able to represent concepts of any domains as forms and process forms (as machine code, in parallel or not in parallel) through transforms allows streamlining and accelerating design and computation.

Visual representations of forms and transforms provides greater insight in the data and makes it easier to build and design advanced models. Being able to have efficient representation of the transforms and the data allows users to interact more deeply and intuitively with the computations and data. In particular, having a "human-in-the-loop" can allow for important optimizations which could not have been discovered without the visual presentation of the transforms and forms.

BRIEF DESCRIPTION OF THE DRAWINGS

Further features and advantages of the present invention will become apparent from the following detailed description, taken in combination with the appended drawings, in which:

FIGS. 38a, 38b and 38c illustrate the addition of tetrahedrons on faces of a tetrahedron, in accordance with an example;

FIGS. 39, 40 and 41 illustrate a transform designed for replacing a segment by a triangle and its application, in accordance with an example;

It will be noted that throughout the appended drawings, like features are identified by like reference numerals.

DETAILED DESCRIPTION

Embodiments of the present invention are directed to a transform processing unit for processing heterogeneous data. In one embodiment, the present architecture allows for the implementation of a unified universal processor. Having the transform processing unit interacting directly with inputs and outputs and having storage directly in the transform blocks present some advantages. Registers are storage units with the fastest response time and can be accessed directly within the transform blocks. This allows streamlining a very performant computing pipeline where input data is also directly inserted in transform blocks that are processed at high speed by other transform blocks to finally output data almost directly to output devices.

In the following there is described a computer architecture for a transform processing unit that allows for visual programming and for high-performance computing and simulation. The computer architecture describes a processing unit device adequate for processing heterogeneous data at high speed.

Using the present transform processing unit device, a user may apply effects to forms present in a universe. In order to apply an effect to a form, a transform is created. A transform comprises at least an effect to be applied to a form, an output site defining where the effect should be applied and optionally transform data. Alternatively, a transform comprises at least an effect, an input site defining where the effect can take information from and optionally transform data. The below-described processing unit device having an architecture adapted to execute transforms is hereinafter referred to as a transform processing unit device.

Figure 1:
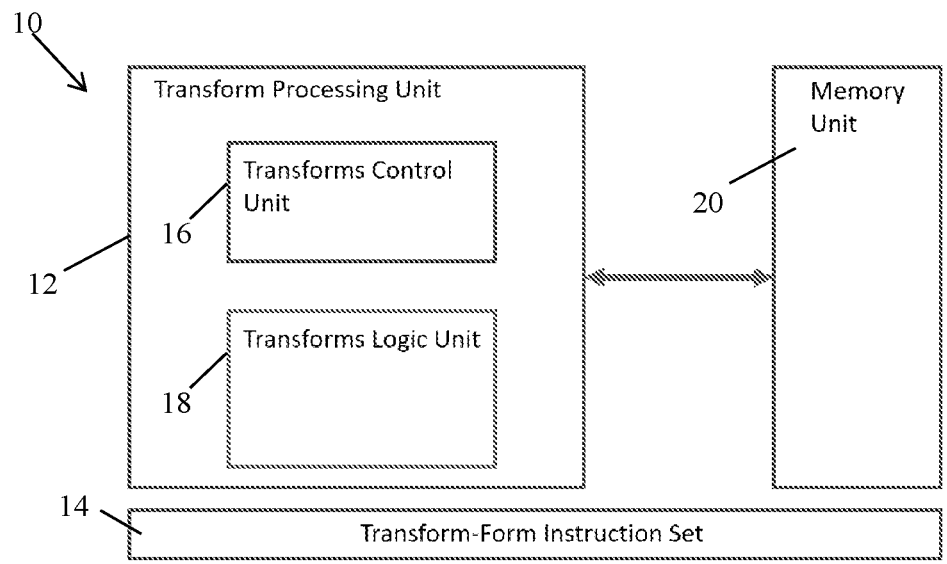
FIG. 1 is a block diagram illustrating a transform processing unit comprising a transform control unit and a transform logic unit and being connectable to an external memory, in accordance with an embodiment.

FIG. 1 illustrates one embodiment of a transform processing unit device 10 comprising a transform processing unit 12 and a transform-form instruction set 14. The transform processing unit device 10 is in communication with an external memory or storing unit 16 for storing data, statements and/or instructions. It should be understood that the transform processing unit 10 also comprises input and output mechanisms for receiving and transmitting data.

The transform processing unit 12 comprises a transform control unit 16 and a transform logic unit 18 connected together.

The transform control unit 16 is configured for coordinating the sequence of data movements into, out of, and between the components and sub-components of the transform processing unit device 10.

The transform logic unit 18 comprises instructions of a computer program by performing the basic arithmetic, logic, controlling, and input/output (I/O) operations specified by the instructions.

The transform logic unit 18 is configured for storing all information about the transforms. In one embodiment, the transform logic unit 18 comprises control electronic circuitry (i.e. control units) that directs the instructions related to transforms by performing basic arithmetic, logic, controlling, and input/output operations specified by the instructions.

The transform-form instruction set 14 comprises all transform related data stored thereon and may be accessed by the transform processing unit 12. The transform-form instruction set 14 comprises the instructions for data handling, transforms, control flow and complex operations. Some of the described operations are match, compare, transform application, substitution, take, copy, superpose, add, naming, parallel and serial sequences of transforms, order and application times of transforms, feed and interpolation. The transform-form instruction does not need to be separate from the transform processing unit 12, but can be encoded in reserved transform blocks, in dedicated registers, storage units, in memory or on disk. Moreover, it can also be built from electronic circuitry.

Figure 2:
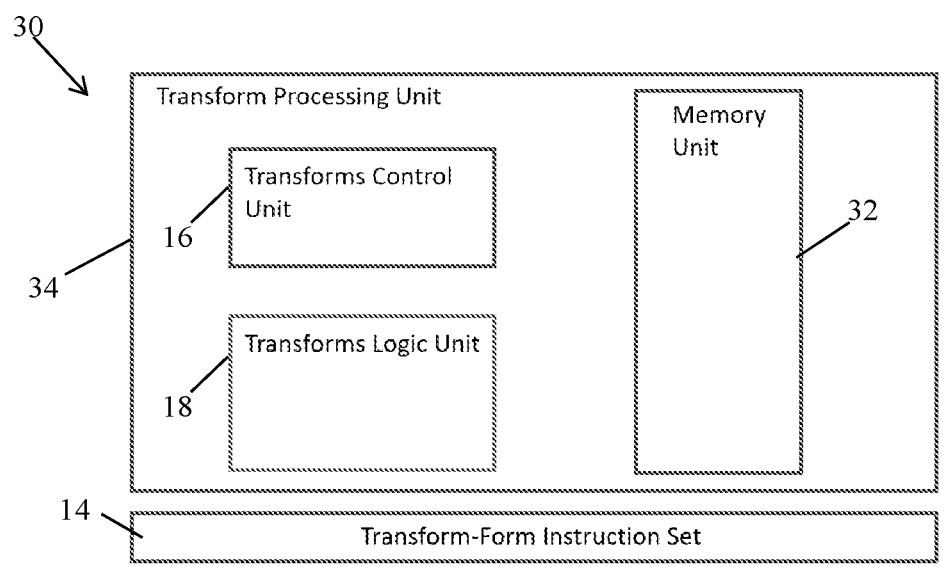
FIG. 2 is a block diagram illustrating a transform processing unit comprising a transform control unit, a transform logic unit an internal memory, in accordance with an embodiment.

While the transform processing unit device 10 is connectable to an external memory 20, FIG. 2 illustrates one embodiment of a transform processing unit device 30 comprising an internal memory 32. The transform processing unit device 30 comprises a transform processing unit 34 and a transform-form instructions set 14. The transform processing unit 34 comprises a transform control unit 16, a transforms logic unit 18 and the internal memory or storing unit 32 for storing data, statements and/or instructions.

As described below, the architecture of the transform logic unit 18 may vary as long as it comprises all information relative to transforms.

Figure 3:
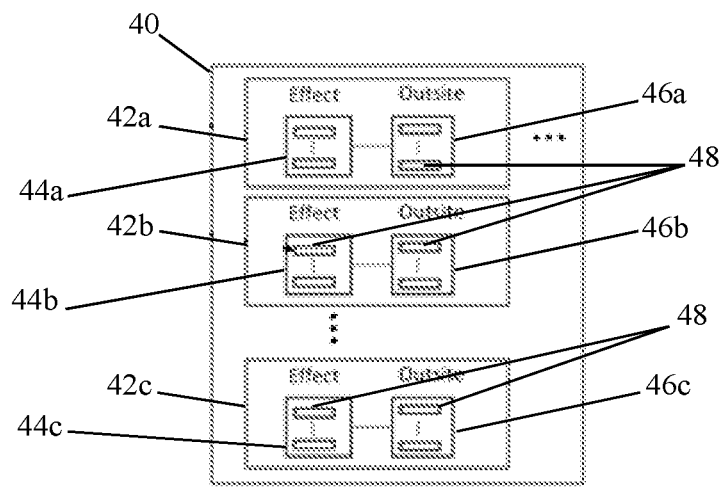
FIG. 3 is a block diagram illustrating a transform logic unit comprising a plurality of transform blocks, in accordance with an embodiment.

FIG. 3 illustrates one embodiment for the architecture of a transform logic unit 40. The transform logic unit 40 comprises a plurality of transform blocks 42a, 42b, ... 42n each for storing all information related to a respective transform.

In the illustrated embodiment, each transform block 42a, 42b, ... 42n comprises a respective effect block 44a, 44b, ... 44n and a respective outsite or output site block 46a, 46b, ... 46n. Each effect block 44a, 44b, ... 44n comprises a plurality of memory units or registers 48 for storing data relative of the respective effect associated with the effect block 44a, 44b, ... 44n and each outsite block 46a, 46b, ... 46n comprises a plurality of memory units or registers 48 for storing data relative of the respective output site associated with the outsite block 46a, 46b, ... 46n. It should be understood that the memory units 48 are configured for storing data and may be defined by a number of bits to be stored thereon.

In one embodiment, only some transform blocks 42a, 42b, ... 42n may communicate with only some of the other transform blocks 42a, 42b, ... 42n. In another embodiment, some transform blocks 42a, 42b, ... 42n are independent from one another and may not communicate with any other transform blocks 42a, 42b, ... 42n. In a further embodiment, the transform blocks 42a, 42b, ... 42n are all interconnected so that any transform block 42a, 42b, ... 42n may communicate with any other transform block 42a, 42b, ... 42n, as illustrated in FIG. 4.

Figure 4:
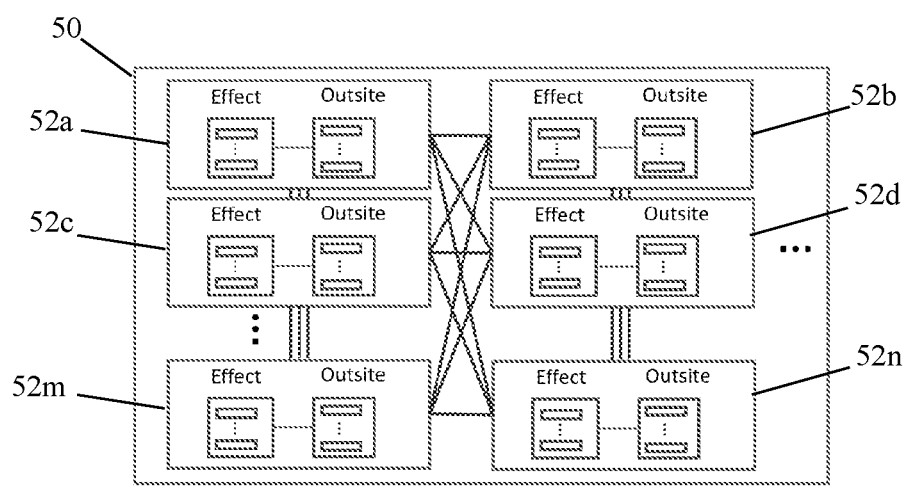
FIG. 4 is a block diagram illustrating a transform logic unit comprising a plurality of interconnected transform blocks, in accordance with an embodiment.

FIG. 4 illustrates a transform logic unit 50 which comprises a plurality transform blocks 52a, 52b, 52c, 52d, ... 52m, 52n which each comprise a respective effect block and a respective outsite block. Each transform block 52a, 52b, 52c, 52d, ... 52m, 52n is directly connected to all of the transform blocks 52a, 52b, 52c, 52d, ... 52m, 52n so that the output of any transform block 52a, 52b, 52c, 52d, ... 52m, 52n may be the input of any other transform block 52a, 52b, 52c, 52d, ... 52m, 52n.

Figure 5:
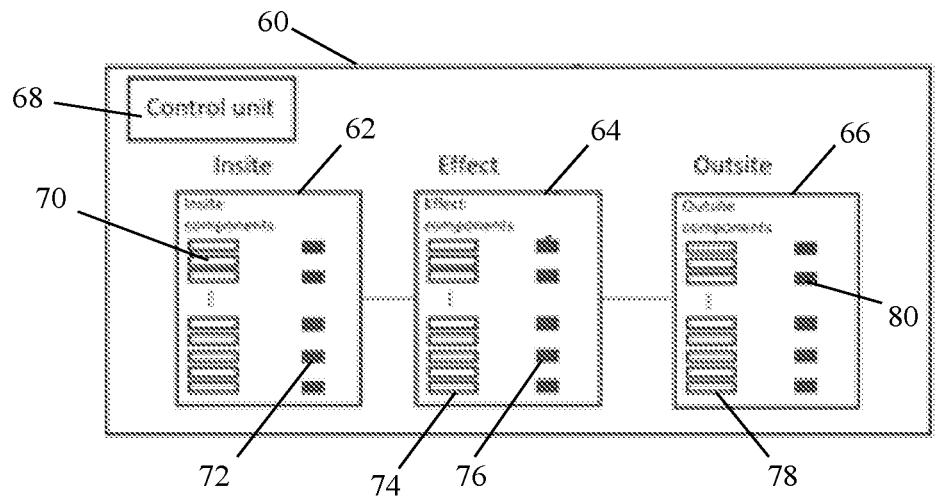
FIG. 5 is a block diagram illustrating a transform block comprising an insite block, an effect block and an outsite block, in accordance with an embodiment.

In one embodiment, a transform block may further comprise at least one control unit, as illustrated in FIG. 5.

FIG. 5 illustrates one embodiment of a transform block 60 which comprises an insite or input site block 62, an effect block 64, an outsite or output site block 66 and a control unit 68 which directs the operations based on the instructions. The insite block 62 comprises a plurality of memory units 70 and a plurality of logic units 72. The effect block 64 and the outsite block 66 have a similar architecture as that of the insite block 62: the effect block 64 comprises a plurality of memory units 74 and a plurality of logic units 76 and the outsite block 66 comprises a plurality of memory units 78 and a plurality of logic units 80. The logic unit 72, 76, 80 may be an arithmetic logic unit, a transform logic unit, a reference to another part of the transform logic unit or the like.

While the transform block 60 comprises both an insite block 62 and an outsite block 66, it should be understood that the insite block 62 may be omitted so that the transform block 60 may only comprise the effect block 64 and the outsite block 66. Similarly, the outsite block 66 may be omitted so that the transform block 60 may only comprise the effect block 64 and the insite block 62.

In one embodiment, the control unit 68 may be omitted. In the same of another embodiment, the logic units 72, 76 and 80 may be omitted.

While in the illustrated embodiment, the logic units 72, 76 and 80 are included in the insite block 62, the effect block 64 and the outsite block 66, respectively, the person in the art should understood that the logic units 72, 76 and 80 could located outside of the insite, effect and outsite blocks 62, 64 and 66 within transform block 60.

It should also be understood that at least one of the insite block 62, the effect block 64 and the outsite block 66 may comprise no logic unit while at least one of the insite block 62, the effect block 64 and the outsite block 66 comprises logic units.

Figure 6:
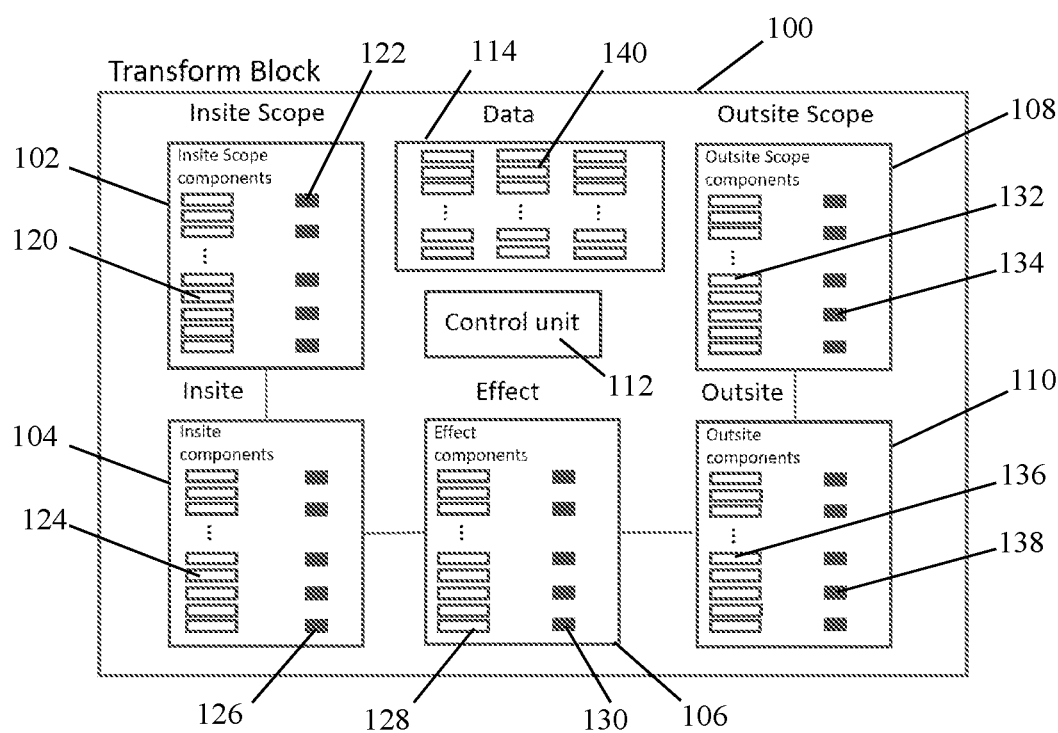
FIG. 6 is a block diagram illustrating a transform block comprising an insite block, an insite scope block, an effect block, an outsite scope block and an outsite block, in accordance with an embodiment.

FIG. 6 illustrates one embodiment of a transform block 100 which comprises and insite or input site scope block 102, an insite or input site block 104, an effect block 106, an outsite or output site scope block 108, an outsite or output site block 108, a control unit 112 which directs the operations based on the instructions and a memory 114. The insite scope block 102 comprises a plurality of memory units 120 and a plurality of logic units 122. The insite block 104 comprises a plurality of memory units 124 and a plurality of logic units 126. The effect block 106 comprises a plurality of memory units 128 and a plurality of logic units 130. The outsite scope block 108 comprises a plurality of memory units 132 and a plurality of logic units 134. The outsite block 110 comprises a plurality of memory units 136 and a plurality of logic units 138. The memory 114 comprises a plurality of storing units 140. It should be understood that the transform block 100 is adequate for executing a transform which comprises an input site, an input scope, an effect, and output site and an output scope.

The logic unit 72, 122, 126, 130, 134, 138 may be an arithmetic logic unit, a transform logic unit, a reference to another part of the transform logic unit or the like.

Referring back to FIGS. 1 and 2, the transform-form instruction set 14 stores thereon the transform data such as operations and complex instructions. For example, the transform-form instruction set 14 allows for data handling and memory operations such as reading, writing and copying data and addresses or data encoding. The transform-form instruction set 14 may further allow operations on transforms such as matching, comparing, transform application, substitution, taking, copying, superposing, adding, naming, etc. The transform-form instruction set 14 also allow for control flow operation such as parallel and serial transform application, transform application ordering, controlling the number of application times, transform sequencing, timelines creation, etc. The transform-form instruction set 14 is further in charge of complex instructions such as feed, interpolation, transform life span (which gives time or order where the transform start to be applied and stop from being applied), and/or the like.

In an embodiment in which transform blocks comprise registers or memory units such as memory units 48, the transform processing unit device may comprise no memory units outside of the transform logic unit. For example, the memory unit 32 illustrated in FIG. 2 could be omitted. In such an embodiment, the transform blocks themselves can be used to store data such as all data related to the input and output universe, and they may be used for fast access memory and storage. This approach could be used to have a transform logic unit that be composed solely of transform blocks in which the transform blocks may be used as storage units.

As stated above, the data may be stored on registers, on an external memory, on an internal memory, etc., and the data may be formatted and encoded in different ways. In one embodiment, the data is encoded as forms which are optimized for the transform processing unit device 10 and transforms. Forms may be used to express any type of data and may represent highly hierarchical structures. For example, a body containing a liver and heart, the heart is composed of cardiac muscle cells and cells contains DNA which is composed of molecules which themselves are composed of atoms. Along with the data that allows forms to be processed efficiently by transforms, forms can be made to represent accurately such hierarchical structures.

In an embodiment in which the transform-form processing unit comprises no memory, data such as forms is stored directly in the registers of the transform blocks. In this case, some transform blocks may be used for storage and have empty insite blocks and outsite block while the effect blocks may contain data such as forms. Alternatively, depending on access speed, the insite, outsite and effect block could each contain a copy of the form.

In one embodiment, keyboard, mouse and other input devices may be connected to reserved or pre-allocated transform blocks. Outputs such as monitor, VR headsets and other devices may also be connected to multiple transform blocks, and identification numbers or addresses of transform blocks.

In one embodiment, the control unit or part of the control unit may be composed of a set of reserved transform blocks. This allows the processor internal process to be modified for different types of optimizations.

It should be understood that the above-described transform processing unit device is configured for executing transforms, i.e. applying an effect to forms selected according to an outside site and using transform data, and optionally using information contained in an input site, an input scope and an output scope, as described in greater detail below.

FIGS. 7-11 illustrate an exemplary process for computing and processing data using a transform processing unit device 150 which only comprises a plurality of transform blocks 152a, 152b, 152c, 152d, . . . 152m, 152n. Each transform block 152a, 152b, 152c, 152d, . . . 152m, 152n is provided with a respective control unit 154a, 154b, 154c, 154d, . . . 154m, 154n, a respective effect block 156a, 156b, 156c, 156d, . . . 156m, 156n and a respective outsite block 158a, 158b, 158c, 158d, . . . 158m, 158n. The architecture of the transform processing unit device 150 is clockless so that the device 150 corresponds to an asynchronous processor device.

The transform blocks 152a, 152b, 152c, 152d, . . . 152m, 152n are all interconnected together so that each transform block 152a, 152b, 152c, 152d, . . . 152m, 152n may exchange data with any one of the other transform blocks 152a, 152b, 152c, 152d, . . . 152m, 152n.

Figure 7:
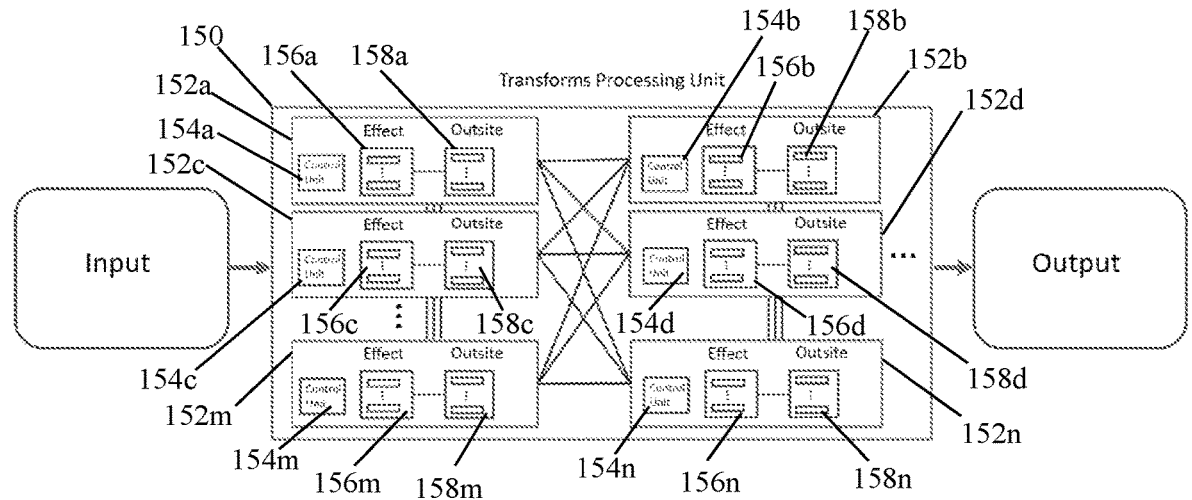
FIGS. 7-11 illustrate the processing of an input by a transform logic unit comprising a plurality of interconnected transform blocks, in accordance with an embodiment.

As illustrated in FIG. 7, the transform processing unit device 150 is configured for receiving an input signal and outputting an output signal. The input signal may be indicative of the depression of a key of a keyboard for example.

Figure 8:
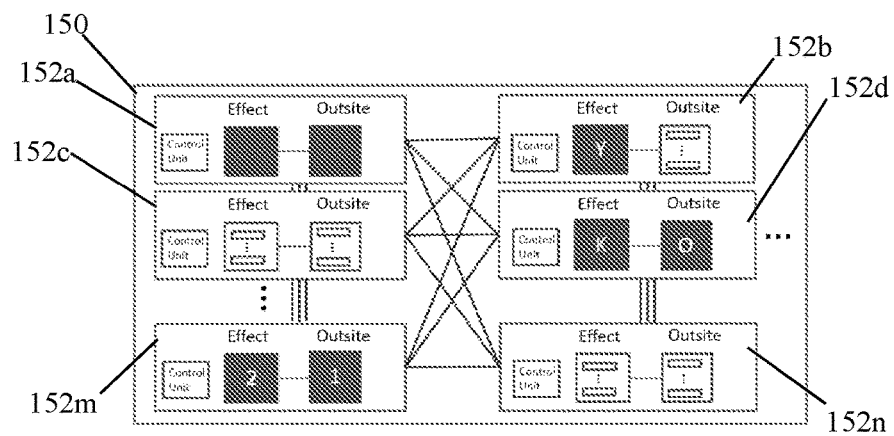

As illustrated in FIG. 8, some transforms blocks are empty such as transform block 152a while other transform blocks, such as transform blocks 152b, 152d and 152m, are predefined and contain information about some transforms.

Figure 9:
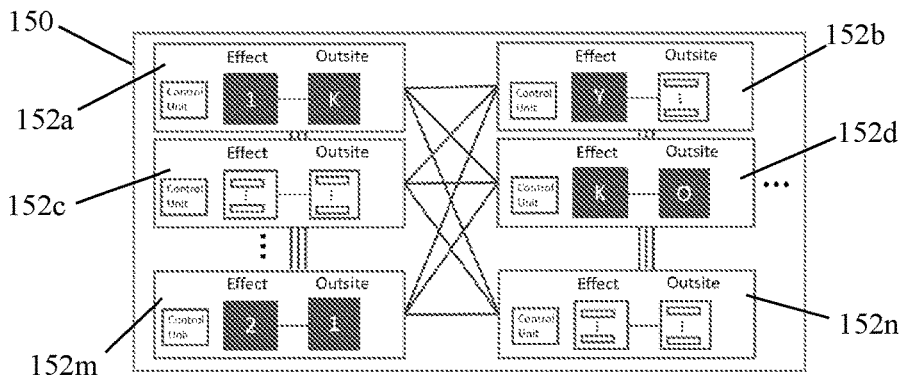
Figure 10:
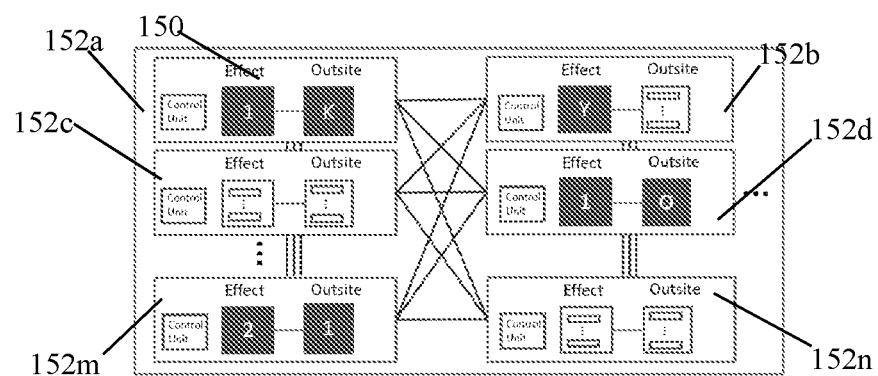
Figure 11:
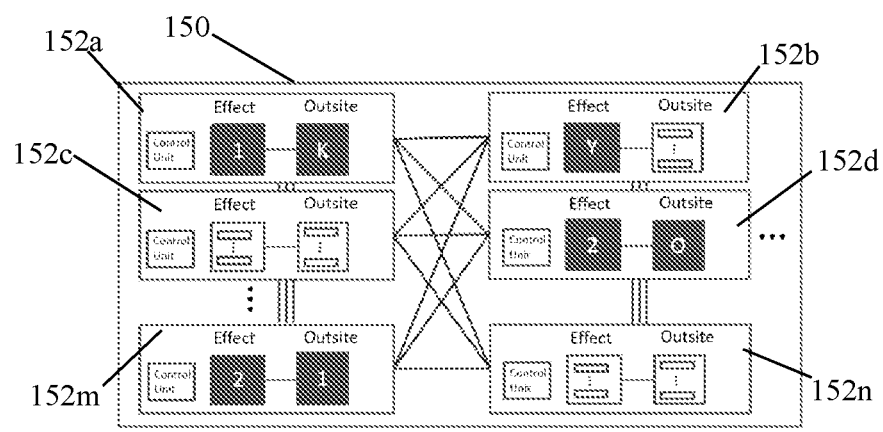

In the present example, the key 1 is pressed and the transform block 152a receives a signal that the key 1 has been pressed from the keyboard. The control unit 154a of the transform block 152a updates the effect block 156a and the outsite block 158a according to the received input signal. In the present example, the control unit 154a updates one of the registers of the effect block 156a with a binary number 1 and one of the registers of the outsite block 168a with a binary number representing the letter K, as illustrated in FIG. 9. The control unit 154a of the transform block 152a initiates a matching protocol by sending a signal encoding the values of the effect and output site to the other transform blocks 152b, . . . 152n. Upon reception of the signal from the transform block 152a, the control units 154b, . . . , 154n of the transform blocks 152b, . . . , 152n, initiate a comparison of the incoming signal of the outsite with its stored value and if there is a match, the stored value is changed to the incoming effect value. If there is no match, the stored value is not replaced or modified. In the present example, the value contained in the effect block 156d of the transform block 152d corresponds to the value contained in the outsite block 158d of the transform block 152a. Therefore, the value contained in the effect block 156d is changed to 1, as illustrated in FIG. 10. It should be noted that at the level of the digital circuit, matching can be accomplished with the use of a digital comparator composed of multiple logic gates and can be accomplished directly without a usual control unit, the logic gates corresponding to the control unit. Furthermore, sending data, receiving data and initiating instructions and operations can be done directly at the transform blocks level without the use of control units.

Then, the control unit 154d of the transform block 152d for which there was a match sends a signal indicative of its new effect value to the other transform blocks 152a, 152b, 152c, 152n, 152m which each try to match their outsite value (i.e. their output site value stored in their outsite block 158a, 158b, 158c, 158n, 158m) with the new effect value of the transform block 152d. In the present example, there is a match for transform block 152m which is associated with a transform with effect 2 (or 10 in binary format) and outsite 1. The transform block 152m then sends its effect value and its outsite value to the transform block 152d, replaces the recently updated value 1 by 2. The transform associated with the transform block 152d then corresponds to an effect having value 2 and O in the outsite. For example, the newly updated transform 152d may then send signals to multiple transforms that are responsible for updating monitor pixel values to show the number 2. In another example, the newly updated transform 152d may also trigger or be involved in additional internal processor computations.

While in the above example, only one match was possible at each matching attempt from a transform, it should be understood that multiple matches may occur at each matching attempt. If there are multiple matches, then each matched transform would be updated and would continue the computation process such as matching multiple other transformed data. This allows for the architecture of the transform processing unit device to be not only clockless, but also highly parallel in nature. Moreover, the number of matching instances can increase exponentially (5 matches trigger every 5 matches which themselves can match 5 other transforms, thus giving 5, 5*5, 5*5*5 simultaneous transforms events).

In one embodiment, the transform blocks may also include an insite scope (for storing an input scope) and/or an outsite scope (for storing an output scope). In this case and referring back to the above example, the matching protocol would not send a matching signal to all transforms blocks to attempt a match, but to only a subset of all transform blocks. For example, a signal from the transform block 152a provided with effect 1 and outsite K could only be sent to transform blocks 152*i* to 152*k*. This may be done if the outsite scope or insite scope of the transform block 152*a* contain a list of registers/transform blocks identification (or addresses of registers) to which a matching signal is to be sent. Such a configuration may allow the computer architecture (or user defining the transform blocks) to reduce the matching time or energy consumption by restricting the "scope" of the search for a match to a predefined set of transform blocks.

Furthermore, the insite and/or outsite scopes may provide a way to differentiate between similar transform blocks. In the above example, there could be more than one transform block that matches with the transform having effect 1 and outsite K. There could be a transform with [effect 1 and outsite O] and [effect K and outsite M], but the outsite scope could allow to restrict the match to only one of them, e.g. [effect 1 and outsite O] because its identification would be included in the outsite scope.

Sent signals or matching requests are not solely reserved to be sent for an outsite match, but can also be initiated from other transforms. For example, a transform block that has an insite could initiate a signal (or receive a signal). The insite match works in a similar way to the outsite by allowing insite matches for registers listed in the insite scope.

In one embodiment, the transform block can also have a data section containing registers with data (such as, but not restricted to any number of forms or references to registers) that can be read and written to by the control unit(s), the transform itself, any number of other transforms or possibly any external device. Examples of such data may include the number of times the transform block initiates matching protocols or the number of matches can be done with this transform block.

The above described architecture of the transform processing unit device may also be reproduced on a virtual machine. It is possible to approximate in whole or parts the architecture on a virtual machine using one or many GPUs, cores, CPUs, processing devices, computing devices and/or field-programmable gate arrays (FPGAs) along with Cuda™, OpenCL™, OpenMP™, OpenCV™, Compute Shaders™, multithreading libraries, parallel computing libraries and/or other types of libraries.

The results presented below were accomplished using the above-described architecture implemented on a virtual machine with a CPU and GPUs. The thus-obtained virtual machine was used among other multiple to train artificial neural networks in 3D, systems of neural networks, simulate DNA replication and create cloud simulations.

In the following, methods of applying transforms allowed by the above-described architecture are described.

Figure 12:
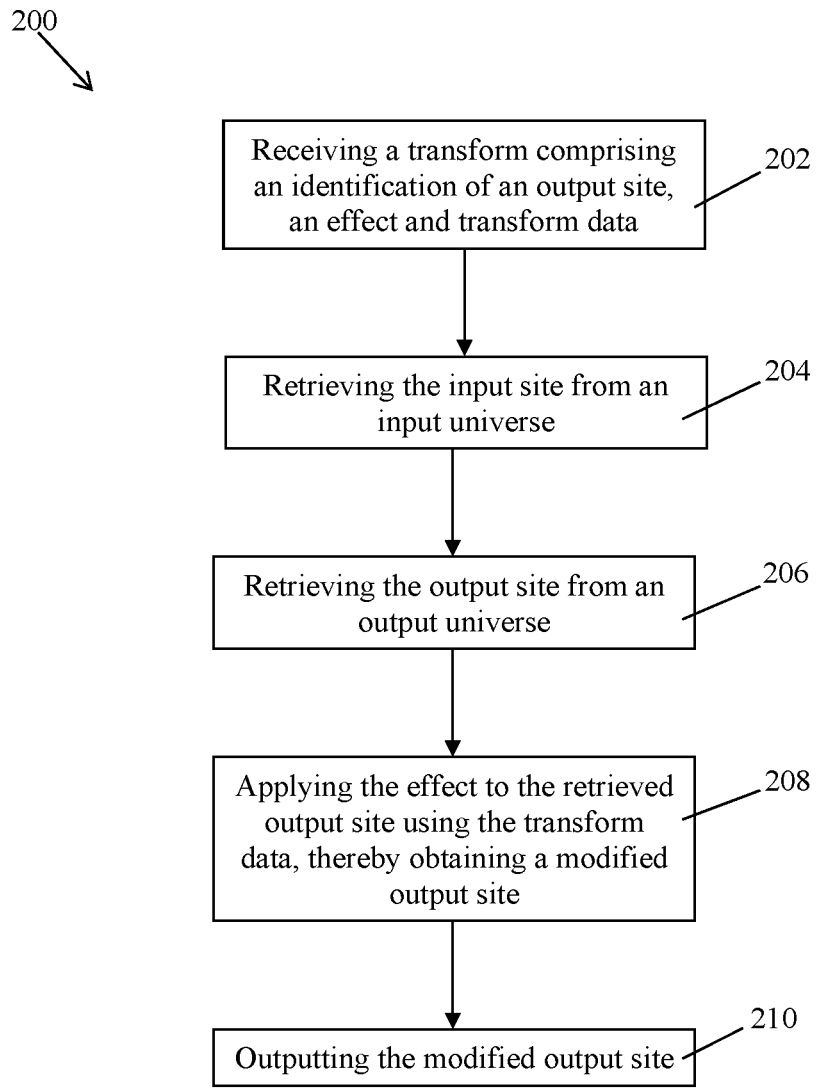
FIG. 12 is a flow chart illustrating a method for executing a transform, in accordance with an embodiment.

FIG. 12 illustrates one embodiment of a method 200 for visual programming. The method 200 can be executed by the above-described transform processing design implemented either in hardware or on a virtual machine.

At step 202, a transform is received. In the present case, the transform comprises at least an identification of an input site, an identification of an output site, an effect and transform data. However, as mentioned above, the transform could only include an effect and an input site or an input and an output site, the transform data being optional.

At step 204, the input site is retrieved from an input universe. The input site identifies at least one form from the input universe from which information relevant to the transform is to be retrieved. At step 206, the output site is retrieved from an output universe. In one embodiment, the output site is retrieved from an output universe using information retrieved from the input site. The output site defines the subspace of the output universe (i.e. given forms contained in the output universe) to which the effect associated with the transform is to be applied.

At step 208, the effect defined in the transform is applied to the retrieved output site using the transform data and the information retrieved from the input site, thereby obtaining a modified output site.

At step 210, the modified output site is outputted. In one embodiment, the modified output site is stored in memory. In the same or another embodiment, a graphical presentation of the modified output site is displayed in a representation of the output universe, as explained below. In still another embodiment, the modified output site may be used as an input for a second transform to be executed. For example, referring to FIGS. 8 to 11, the modified output site could be transmitted from its associated transform block 152*a*, 152*b*, 152*c*, 152*d*, . . . 152*m*, 152*n* to at least another transform block 152*a*, 152*b*, 152*c*, 152*d*, . . . 152*m*, 152*n*.

In one embodiment, the input site can be used to modify any part of the transform. For example, the input site data can be used to instantiate, update, compute or modify any part of the output site, transform data, output scope and effect.

In one embodiment, the transform comprises no identification of an input site and/or no transform data. In this case, the step 204 of retrieving the input site from the input universe is omitted and/or the step of retrieving the transformed data is omitted, and the effect is applied to the output site without taking into account the information about the input site and/or the transform data.

In another embodiment, the transform comprises no identification of an output site and/or no transform data. In this case, the step 206 of retrieving the output site from the output universe is omitted and/or the step of retrieving the transformed data is omitted, and the effect is applied without taking into account the information about the output site and/or the transform data.

In an embodiment in which the reception of the output site and the transformed data is omitted, the step 202 comprises receiving the effect only. Then only the effect and the input site are received. The step 206 then consists in retrieving the received input site within the input universe, i.e. finding a match for the received input universe into the input universe, and retrieving information associated with the retrieved input site. The step 208 consists of modifying the effect using retrieved information associated with the input match to obtain a modified effect. The modified effect is then output at step 210. The modified effect may be stored in memory such as in an effect block and/or outputted such to be displayed.

In one embodiment, the step 204 further comprises retrieving an input scope associated with the input site and/or retrieving an output scope associated with the output site. In this case, the effect is applied using information associated with the retrieved input scope and/or information associated with the retrieved output scope.

In one embodiment, the method 200 further comprises displaying a user graphical interface comprising a first section for representing the output universe and a second section for displaying a graphical representation of the transform. In one embodiment, the second section comprises a first window for defining the input site, a second window for defining the effect, a third window for defining the output site and a fourth window for inputting the transform data. It should be understood that the user interface may vary as along as a visual representation of the output universe and a visual presentation of the transform may be displayed to a user on a display.

In one embodiment, the input site is displayed in the first window and the effect is displayed in the second window while the output site is displayed in the third window.

As explained in further details below, a user may draw and edit the content of any window.

The above-described method 200 may be implemented as a computer program product comprising a computer readable memory storing computer executable instructions thereon that when executed by a computer perform the above-described steps.

Figure 13:
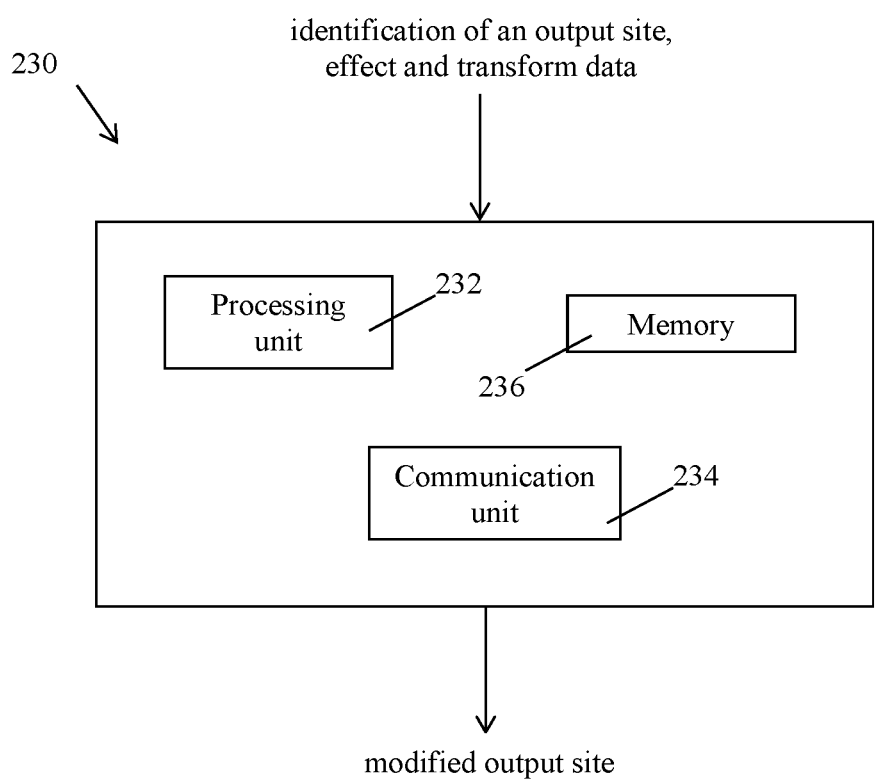
FIG. 13 is a block diagram of a system for executing the method of FIG. 12, in accordance with an embodiment.

FIG. 13 illustrates one embodiment of a system 230 for visual programming. The system 230 comprises at least a processing unit 232 such as at least one CPU and/or at least one GPU, a communication unit 234 and a memory 236 on which instructions and data are stored. The processing unit 232 is configured for executing the above-described steps of the method 200. In one embodiment, the system 230 corresponds to a virtual machine configured for reproducing the above-described transform processing unit architecture.

As described above, a transform may be composed of an effect, an input site and/or an output site and optionally transform data, an input scope and/or an output scope. As a simple example, the output site can be thought of as what form is changing in the output universe and the effect shows the same form but in a new state such as in a new position or having a new shape for example. One can think of a sheet of paper (or a representation of a sheet of paper) in the output site and the sheet of paper crumbled as a ball is the effect. Here the effect of the transform corresponds to the act of crumbling sheets of paper in balls. One could apply this transform 100 times to stack of 100 sheets to obtain 100 crumpled balls of paper.

When present, the input site is used to extract information from a subspace of the input universe, i.e. from at least one form selected in the input universe. The effect of the transform is then applied based on the information of the selected form(s) and optionally transform data which includes information such as, but not limited to, the number of applications for the transform, style and type of transform, etc.

It should be understood that any adequate method for selecting an input or output site may be used. For example, an input or output form can be inserted by copying a selected form from the system, using a drag and drop function, importing other systems or parts of other systems, importing files from other software or devices, directly creating the form with the software functionalities such as a drawing tool, transforms, graphical user interface buttons, graphical user interface buttons connected to transforms, graphical user interface buttons defined by forms and transforms, etc.

In one embodiment, when inserting a form in a part of a transform, automatically or by request of the user, a copy of the form may automatically appear in other parts of the transform. In one embodiment, the automatically generated copy can be identical to the inserted form. In another embodiment, the automatically generated copy may be different from the inserted form. For example, the automatically generated copy may have a different transparency. A user can then decide what elements of the copy to keep, remove, replace, edit or modify. This allows for rapid construction of the transforms and systems. A system should be understood to be a form, a transform, a collection of forms, a collection of transforms or a collection of forms and transforms.

Figure 14:
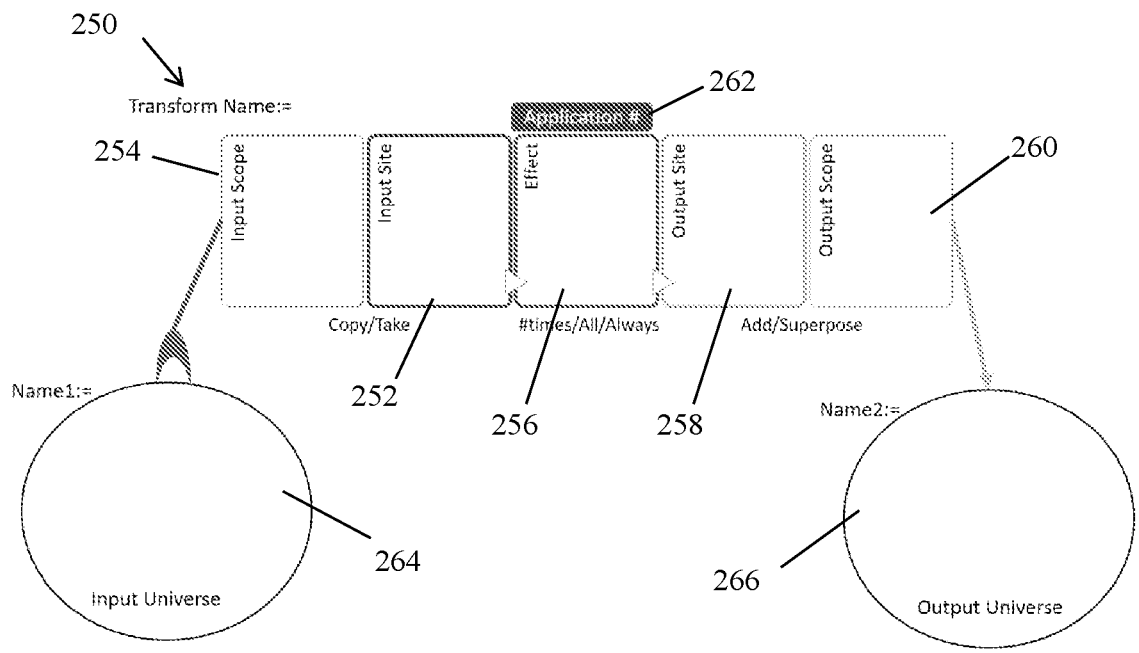
FIG. 14 illustrates a transform comprising an input site, an input scope, an effect, an output site, an output scope and transform data, in accordance with an embodiment.

FIG. 14 is an exemplary graphical representation 250 of a transform comprising an input site 252, an input scope 254, an effect 256, an output site 258, an output scope 260 and transform data 262. The input scope allows selecting a portion of the input universe 264 from which the input site match may be selected while the output scope allows defining a portion of the output scope into which the effect may be applied to the output sites of the output universe 266 present therein.

In one embodiment, the following commands/language may be used to define a transform.

The symbol ":=" or a text input section may be used to give a name to a form, transform or a universe.

"Copy/Take" may be used to specify whether the input site, i.e., a form selected in the input universe, will remains in the input universe after the application of the effect (Copy) or will disappear (Take) from the input universe after the transform is applied.

"Add/Replace" may be used to specify whether the output site, i.e., the form selected in the output universe, will remain (Add) or will be replaced (Replace) in the output universe after the transform is applied. In some cases, forms will be superposed on top of each other, thus allowing multiple copies of the same form at the same place.

"#times" may be used to indicate the number of times a transform will be applied.

"All" may be used to indicate that the transform will modify once each of the forms satisfying the transform input and output sites at that moment or present position in the timeline.

"Always" may be used to indicate whether the transform is always there ready to be applied or can be applied an infinite number of times (in some cases, as long as the input and output conditions are satisfied).

"Application #" may be used to indicate the order in which different transforms are to be applied. When several transforms are present in a system, the transform having the lowest number assigned thereto is the transform that will be applied next.

"Lifespan parameters" (not shown) may be used to indicate in how many steps the transform may be applied and for how many steps the transform may be applied. These parameters can refer to a global step counter and indicate the steps (as integer or intervals) for which the transform can be applied.

Other types of transform data (not shown) may include data such as, but not restricted to, an indication as to whether the transform stays or disappears after being applied, the group to which a transform belongs, an indication as to whether transforms should be applied in parallel, sequentially or concurrently, the type of transform, the style of the transform, the name of the transform, restrictions, global or local axis, etc.

Activation and Process of a Transform

In one embodiment, when a transform comprises an input site and the input site has a match in the input universe, then the transform is activated and can be executed. If there are inequalities or condition to be satisfied in the input site, the transform will not be applied even if the output site has a match in the output universe until the inequalities be satisfied.

In one embodiment, the process of execution of a transform is as follows.

First, a match between the form defined in the input site with forms in the input universe is searched. When a match is found, the identified forms are selected in the input universe.

Then, it is determined whether the inequalities, conditions or equations defined in the input site or the input scope, if any, are satisfied based on the information associated with forms selected in the input universe. In one embodiment, the inequalities and equations to be satisfied may be included in the input scope or the output scope, if any.

The effect output site and transform data are updated with the selected information by replacing the proper variables (or *) with the information or modified information. In this case, the transform is said to have been activated and the values are said to have been initialized.

Then, the forms contained in the output universe that match the form defined in the output site are selected.

The transform then replaces the form selected in the output universe with the forms defined in the effect of the transform. In one embodiment, the form defined in the effect may be superposed to the form selected in the output universe.

In one embodiment, when the input site is always connected or matched with a given form of the input universe, a change to the given form in the input universe triggers the execution of the above described process. In this case, a transform may not comprise any output site, and therefore any output scope. An example of an always connected form corresponds to a scenario in which there is one form in the input universe and that the same form is defined in the input site such that the transform is set to copy and not take. In this case, a transform is automatically executed upon detection of a change made to a form present in the input universe and defined in the input site.

Transform Application

When it comprises an input scope and an output scope, a transform may be applied as follows. The input scope and output scope can be the whole system, empty, a form, a form type, a subsystem of the system, a multidimensional space of the system or a multidimensional space around forms of the system (for example: a volume around an edge of a 3D mesh), or the like. The input scope provides the information about as to where the transform is allowed to extract information from, i.e. the input scope defines a subspace of the input universe from which forms identified in the input site may be selected. The input site defines the forms that can be selected from the input scope. The effect is composed of forms relying on the information of the selected form of the input scope. The output scope provides the information about as to where the transform can be applied in the output universe. The transform is applied by selecting a form similar or equal to the output site from the output scope. Then, the selected forms of the system are modified, added to, added next to, added to a hierarchical position nearby or replaced with corresponding forms from the effect. Correspondences between the forms of the output site and the effect can be indicated in different ways, for example by showing lines between them or with data displayed in different places.

A transform provided with an input site and an effect can be understood as picking forms from a collection of forms in an input universe and using them to build an object called "effect". The chosen forms are removed or left unchanged from the input universe. A transform with an output site and an effect can be understood as selecting forms from the output universe and then adding to, replacing and modifying the selected forms. Forms from the output site can be present in the effect, especially in the case when an element is added to the selected forms. A transform can have both an input and output forms. Thus, an effect can be created from inputs and then applied to modify forms from a system.

In one embodiment, the selected form can be the name or type tag of an object. The transform data may comprise an indication as to whether the tag itself or the content of the tag is to be selected. For example, this allows selecting the tag "molecule" and using the molecule associated to the tag "molecule" to be used or replaced. This can be extended to objects that are different from tags or names by using a notation (symbol or color) that indicates that anything that is attached to a certain form should be selected or modified. Moreover, one may define a notation (symbols or colors) to be selected to modify all forms that do not have a predefined structure identified by the notation. For example, one may define a transform that selects a form with the tag molecule, but which does not have a carbon atom (C).

Transform Data

The manner in which the transform extracts information, is built, is applied and behaves in the system may be regulated by the transform data. Examples of such transform data comprise the number of times (finite or infinite) that a transform is to be applied, the order in which transforms are to be applied, an indication as to whether the transform is removed or stays when it can no longer be applied, an indication as to whether the transform is applied to all objects of a certain type, an indication as to whether it represents interpolation steps, the way it scales or rotates objects, an indication as to whether it behaves in an absolute or relative manner, an indication of how it affects coordinates systems, the name of the transform, the names of systems in which the transform is used, the name of the creator of the transform and editors, comments related to its use, local and remote repository, rating and/or the like. Transform data can be assigned to the whole transform, but also, different sets of data can be assigned to different collections of parts of the transform. For example, data can be assigned to the couple composed of the input site and effect or the couple composed of the output site and effect. This can be used to create an effect based on a large number of forms of a certain type and then apply the transform to modify a single object, for example.

Figure 15A:
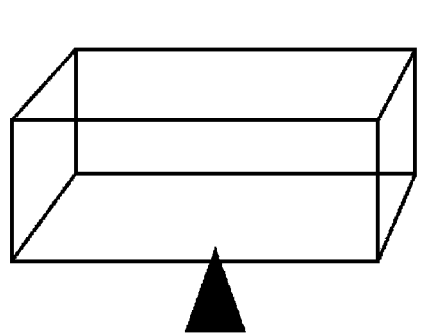
FIGS. 15a and 15b illustrate a rectangular box following an oriented triangle in a 3D environment, in accordance with an embodiment.
Figure 15B:
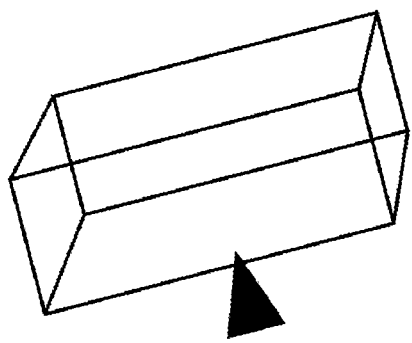
Figure 16:
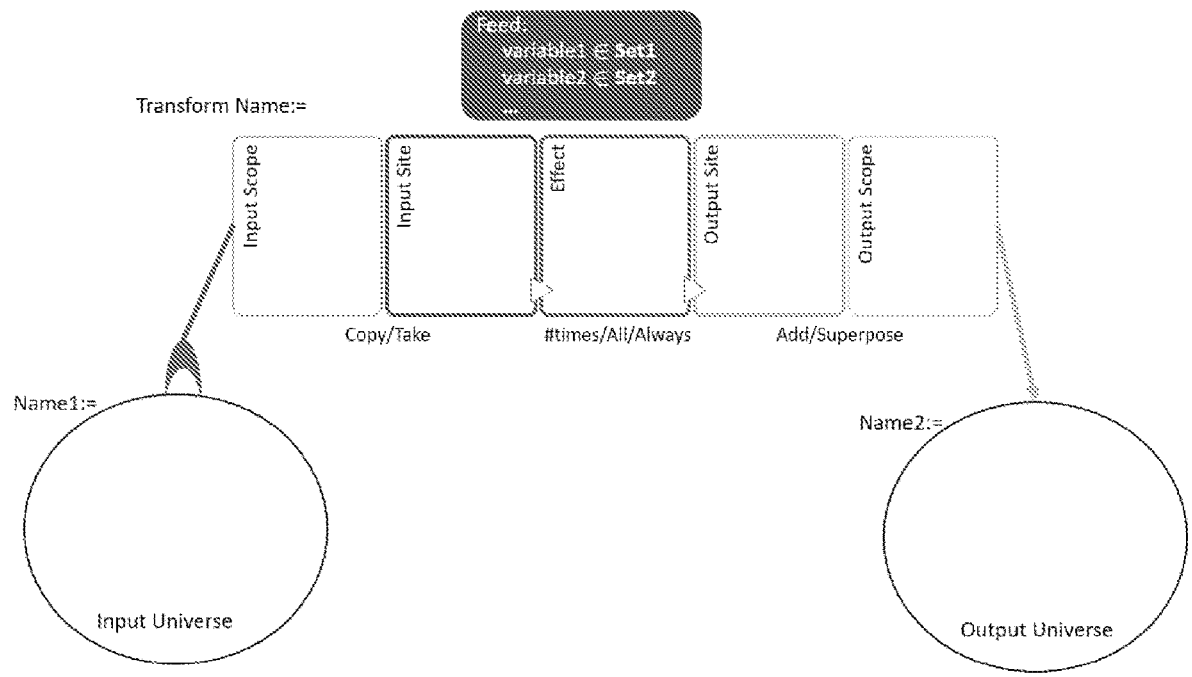
FIG. 16 is an exemplary graphical representation of a transform provided with a feed in its associated transform data.

In one embodiment, useful types of transform data are called "post" and "pre". Assigning "post" to a transform indicates that this transform will be applied after each application of a non-post transform. This may be used in 3D animation to have a mesh of points follow a certain form, as illustrated in FIGS. 15a and 15b. For example, with a post-transform that adds a 3D mesh above a triangle, a 3D mesh (or rectangular box) can be made to follow the position and orientation of a triangle. After moving the triangle, since there is a post-transform, the ship is updated to a position following the triangle.

In one embodiment, a form can be inserted as a subset of another form such that the subset form interpretation depends on the parent form it is into. For example, a 3D mesh can be inserted as a subset of a triangle and when the triangle moves, the mesh follows it since the mesh is interpreted based on the position of the triangle.

Concurrent and Sequences of Transforms

Sequences of transforms may be constructed and it should be understood that in this case, the transforms are to be applied sequentially such that a next transform cannot be applied until the previous transform is still present. Sequences themselves, since they are also forms, can be assigned a collection of data. In one embodiment, the order numbers of the transforms indicate which transform is to be applied next. Multiple concurrent sequences without numbers or equal order numbers in transform data may be applied concurrently or one after the other depending on their respective priority. Alternatively, the order of execution be determined using probabilities assigned to each transform, be based on the transformed data information and from random functions of the framework. The order number can be given by functions and operations. For example, applications can be made to alternate between two or more transforms. In one embodiment, a sequence can have the property of being active and the transforms it contains will be applied at some or every timeline step. In one embodiment, changes in the universe or events trigger the retrieval of sequences that will be processed by executing the transforms they contain.

Self and Higher-Order Transforms

It should be understood that there may be no restriction on where transforms may extract information from or may apply to. For example, a transform may be applied to modify any part of any other transform, the data of a system or the data associated with a transform. A transform may even extract information or modify a given one of its own parts. These capabilities offer an opportunity to higher order systems and the incorporation of recurrences in a model.

Timeline Access

At each step or each time the system changes, the previous state it was in can be recorded in a memory to build a timeline for the system. The timeline may be seen as the history of the system. Similarly, a timeline of each element or form of the system can be recorded. For example, the positions in which an edge of a mesh was may be recorded to be subsequently accessed. In this case, a part of a transform such as an effect or an output site may comprise not only a form but also the previous states of the form as recorded in the timeline. This may be useful to create modeling related to differential calculus. For example, one can build a transform that will remove an edge if it is in a certain position and further was at a specific position in the past. It is also possible to use the future of the timeline, but this would require running the system multiple times or doing multiple passes. For example, an edge may be removed now if it is in a given actual position and will be in a specific position in the future. In this case, this assumes that the future was determined after running the system once without removing the edge.

The following presents a more precise example related to the access of the future timeline. A transform can apply in the system at the present step $S_0$, if a certain future form is present (or is in the required state) in the system at a future step. When such a transform can be applied, the system continues running the system without applying the transform and check if the future form is in the system at the specified step. If the form is present, the system goes back to step $S_0$, applies the transform and lets the system run. If the form is not there in the future step, the system continues running from there. This technique can be used to optimize systems or avoid negative outcomes in the system.

Transforms requiring access to the timeline may access multiple past, present and future steps of many different forms at the same time.

Hidden/Shown, Private/Public and Interfaces

Each system, transform or form may be shown or hidden and/or be chosen to be public or private. This helps hiding underlying data that does not need to be seen when running the system. For example, a 3D mesh could only show the faces but not the vertices or edges. But in the case where the edges are left public, it should be understood that transforms will still be applied to forms that are hidden. Based on the hide/show and private/public capabilities of the framework, interfaces where only some information is exposed and can be edited may be created. For example, one could have a system composed of n equilateral triangles of color c and side of length d. An interface that would look like Triangle [n,c,d] may be created. In this case, Triangle[6,green,½] would represent 6 green equilateral triangles with sides of length ½. This capacity to create interfaces can also be included as a native function of the system.

GUI Capabilities of the Framework

In one embodiment, the system may comprise a graphical user interface (GUI) comprising buttons which may themselves be created within the framework or may be added with the use of the framework itself. When clicking on an GUI button, the keyboard button, mouse button or initiating an input, transformations may be applied on the system. This allows for full customization of the user interface by the user. Although, an initial GUI could come with the framework, the user may add buttons that initiate different transforms or run different systems. Interestingly, this allows users or developers to create a 3D GUI for virtual reality and augmented reality applications. The present transform processing unit and method may be used to create interactive 3D websites which may be navigated with software acting in a way similar to web browsers.

Incoming and Outgoing Data

The present system may be connected with other software or hardware with special forms referred to as incoming and outgoing forms in real-time or not. This type of form may be public or private data accessible by another software or hardware. Here is an example of outgoing data. After building a 3D mesh model of a moving robot within the present system, the arm joint angles may be selected as outgoing form data. The hardware of a real-world robot may access the outgoing form data to update the angles of the servomotor angle. Similarly, data coming from different sensors on a user's body could be used to update a human virtual biological model containing incoming form data. This model could then have the same heart or breathing rate as the user.

Since forms can be collections of many forms, outgoing data could be used to serve systems or system data after requests coming from incoming data forms. This may be a useful component for the "network of projects" described below.

In one embodiment, the framework can import different types of files such as 3D meshes in different formats, data from databases and table or codes in languages such as HTML/CSS, C++™, Java™ and Python™. This can be a native feature of the software or an interpreter built as a system or form within the form and transforms framework where transforms are applied to text or computer files for translation between languages.

Multiscale

The present transform processing unit device may allow multiscale (space and time) navigation and processes. For example, in the model of a heart, one can click on a cell to zoom on the cell internal system. One can also zoom progressively towards a cell and the internal system will be revealed by making the cell membrane transparent to reveal the interior model of the cell. When importing another system in the main system, different parameters of the system data related to the inclusion of this system can be specified. Examples of such data include the size scale and time scale. For example, when importing a cardiac muscle cell in the system of a heart, one must specify the size of the cell relative to the heart and the time scale. Transforms in the cell are to be applied much more often than transforms at the level of the heart. Transforms in the cell are at the scale of nanoseconds while the heart beating is at the scale of seconds.

In one embodiment, each system or form has a tick number value (integer, float, double, rational or real) associated thereto and the tick number value may be updated and modified. The tick number value helps indicating which transforms in the systems can be applied next. This may be used to regulate the speed and time passing in systems and subsystems.

Interpolation

Between two applications of transforms, at least one in-between transform may be added. This is referred to as an interpolation between two transforms. Also, a transform may be replaced by multiple transforms. This is referred to as an interpolation of a transform. This may be done manually with the system, by inserting a sequence of transforms or using the system's native interpolation function. For example, a transform moving a point 1 unit in the z-direction can be changed to a sequence of transforms with the interpolation function such that each transform of the sequence moves a point 0.01 unit in the z-direction. This may increase the degree of precision of a system.

When doing an interpolation of a transform or between two transforms, the number of transforms used to generate the interpolation may be finite. Alternatively, this number may be infinite or continuous. This allows for the introduction and use of the more abstract concept of continuous transform in the framework. This is related to the classical mathematical concepts of the real line, real numbers, continuity and continuous functions. Interpolations may be accomplished with the help of a below described feed.

Feed of a Transform

In the following, the feed of a transform is described with reference to FIGS. 16 to 31. The feed of a transform is a part of the transform data associated with a transform.

A feed is composed of variables and its associated ordered set of forms. The feed can be understood as a list of numbers (or objects) that are sequentially pushed in a transform to create instances of this transform that are to be applied. The associated set can be any type of set such as a finite set of numbers, an infinite set of numbers, real intervals, set of forms, set of transforms, sequences of objects, sets of symbols, data or the like.

The following present examples of sets: [0,1], [0, infinity]; ]2,5]; [n]={1,2,3,4, . . . }; [0,1] U [4,12]; M×N; {abd,a,cc,c,e,t,%}; {1,2,3,4,5, . . . }; {1,2,3,4,5,12.2, −15.2}; {1,2,2,2,2,1,1,10, 0.5, e}; Set of real numbers, complex numbers, rational numbers and/or integers; {transform1, form1, form2, a, 4.3, 6, pi}; etc.

In one embodiment, the feed is composed of multiple variables and their respective sets. There can be an order in which a variable is used first. There can also be restrictions in the feed that variables need to satisfy. In some embodiment, the restrictions appear in the input site of a transform.

In some embodiments, a feed allows a transform to:
Extend transform to be continuous and not only discrete;
Create continuous shapes;
Do interpolations between discrete transforms and give perfect control over the interpolations;
Access the concepts of continuity and the strength of real numbers;
Do differential calculus;
Generalize the concept of number applications of a transform;
Be used as a for-loop or while-loop;
Represent vectors and multidimensional arrays and even tensors;
Act like loop instantiating multiple transforms which is similar to loops for instantiation of multiple objects in object-oriented languages; and/or
Transform with the feed.

Feed in Action

In one embodiment, a transform may be composed of an input site, an effect, and output site and a feed of one variable with its respective ordered set. The variable can appear in the transform anywhere and any number of times (zero, finite number or infinite number of times) in the input site, the output site, the effect and even in the data of the transform which includes the feed itself.

In order to apply the transforms, the instances of the variable contained in the transforms are replaced by the first element of the ordered set. When the transform is applied, the variable is replaced by the second variable by the second element of the set, the second transform is then applied, and the process keeps going until all of the transforms have been applied once for each element of the set of the variable.

Figure 17:
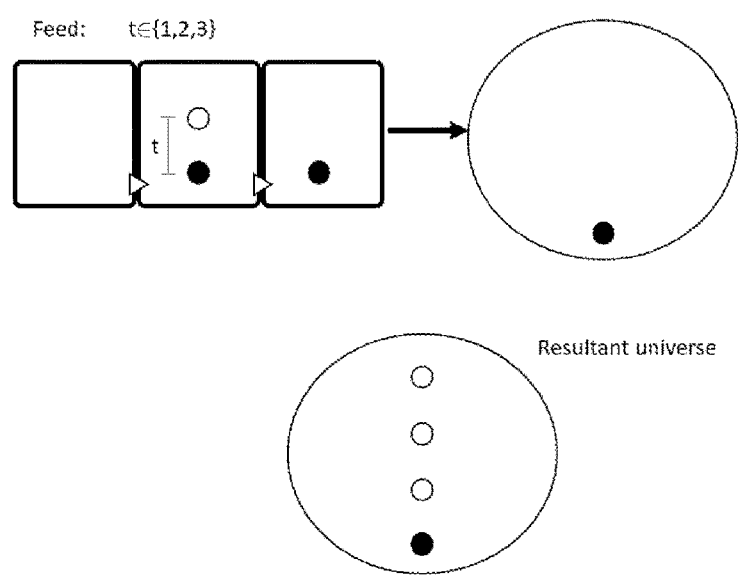
FIG. 17 illustrates an exemplary transform for creating three points.

FIG. 17 illustrates a first example in which a transform is to be applied 3 times for the values 1, 2 and 3. The variable t is replaced by 1, and the transform is applied and thus adds a white point at a distance of 1 unit from the black point. Then, t is replaced by 2, and the transform is applied and thus adds a white point at a distance of 2 units from the black point. Finally, t is replaced by 3, and the transform is applied and thus adds a white point at a distance of 3 units from the black point.

Figure 18:
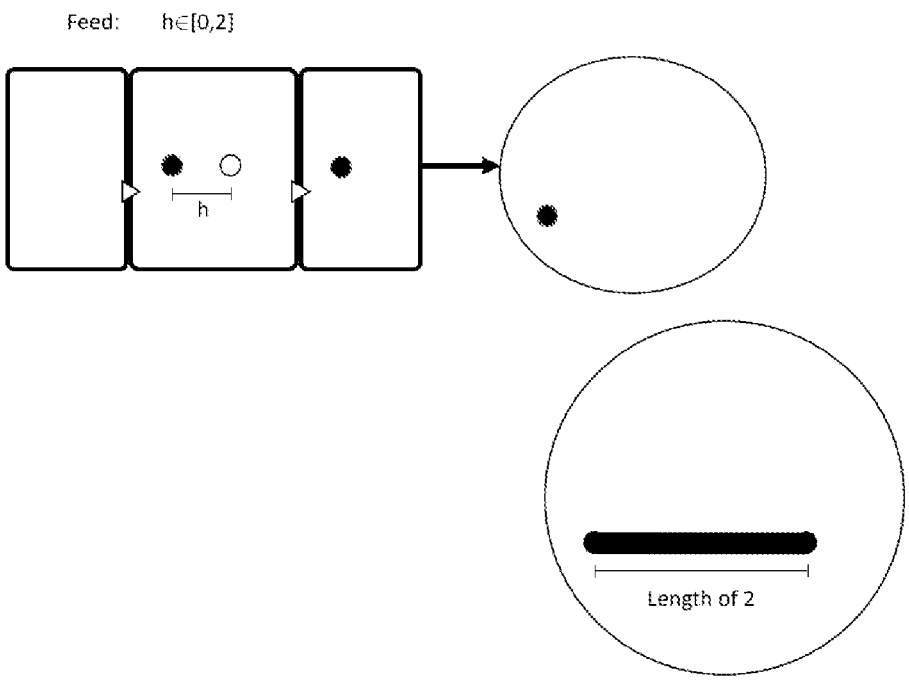
FIG. 18 illustrates an exemplary transform for creating a continuous line.

FIG. 18 illustrates an example of a transform configured for creating a continuous line. Similarly to the example of FIG. 17, a line of length 2 is created by feeding sequentially the transform with all the elements of the interval [0,2].

It should be understood that only a finite number of points will be displayed on a display unit. However, the hidden real points may be accessed if needed such as if the intersection between two real lines or collision points between objects needs to be determined.

Figure 19:
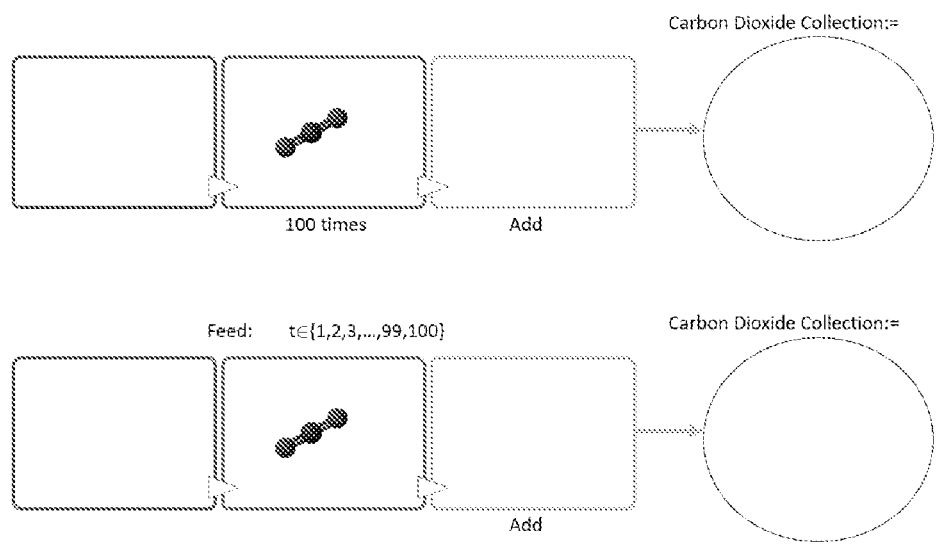
FIG. 19 illustrates an exemplary of a generalization of a number of applications of a transform.

FIG. 19 illustrates the generalization of the number of applications. In this example, the variable t does not appear in the transform. In practice, one may write 100 times instead of defining the feed. Note that as long as there is no occurrence of the variable t in the transform and that there are 100 elements in the associated set, the type of symbols in the set is not important. In particular, a set containing 100 times the symbol "@" would act as 100 applications of the transform.

Figure 20:
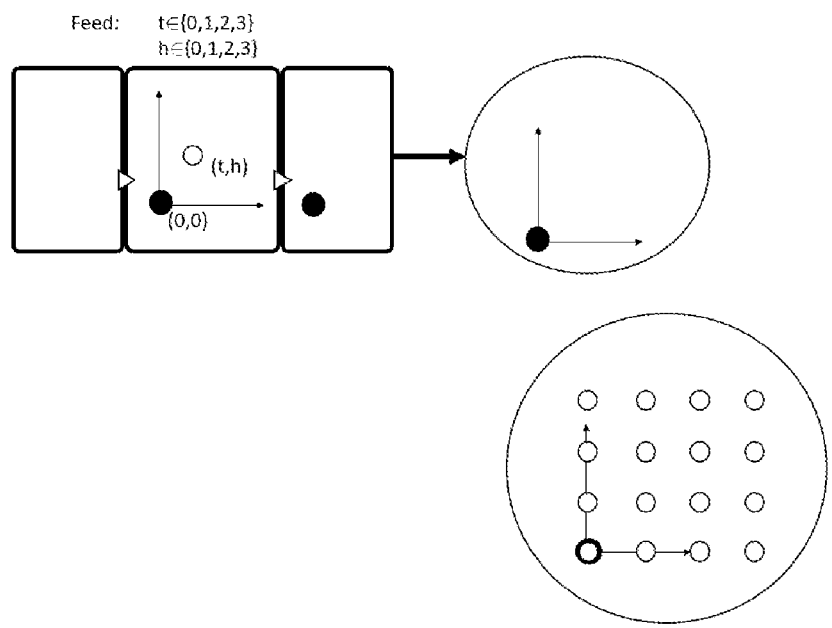
FIG. 20 illustrates an exemplary transform provided with multiple variables present in a feed.

FIG. 20 illustrates an example of multiple variables in a feed. Having two variables in the feed allows the generation of grids of elements. In one embodiment, there is no limit on the number of variables in the feed and multidimensional arrays, matrices and objects similar to tensor coefficients may be created. In the present example, it should be understood that, t=1 is chosen, and then h=1 is chosen. After, t=1 stays and h=2 is chosen and then t=1 stays and h=3 is chosen. Then, the process starts again by taking t=1 and h=1 until all possible combinations have been taken. It should be understood that the same process is followed for more than two variables. In one embodiment, the order in which the elements are chosen can be indicated in detail in the data of the transform.

Figure 21:
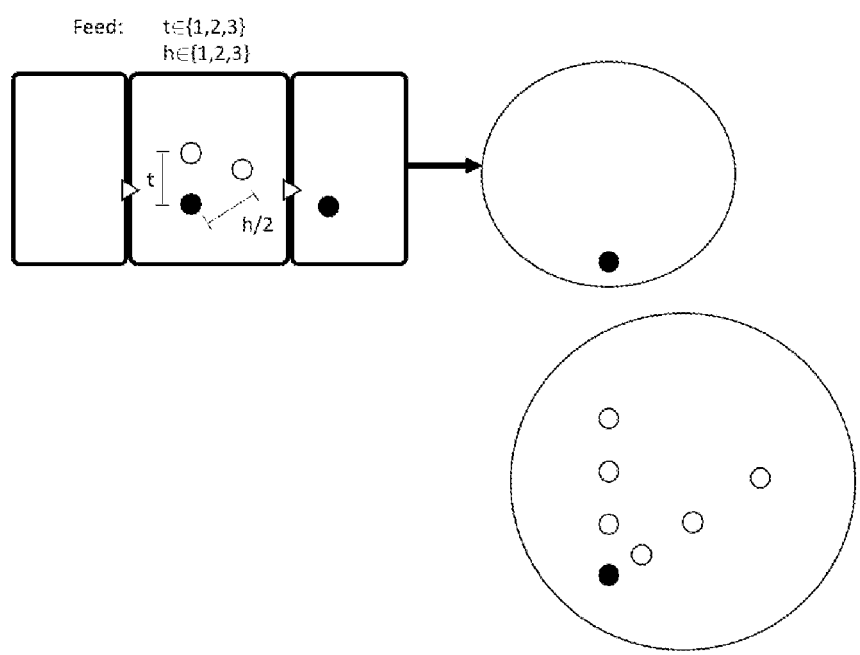
FIG. 21 illustrates an exemplary transform designed for stacking points the ones on the others.

FIG. 21 illustrates an example in which multiple points are stacked on one another.

Figure 22:
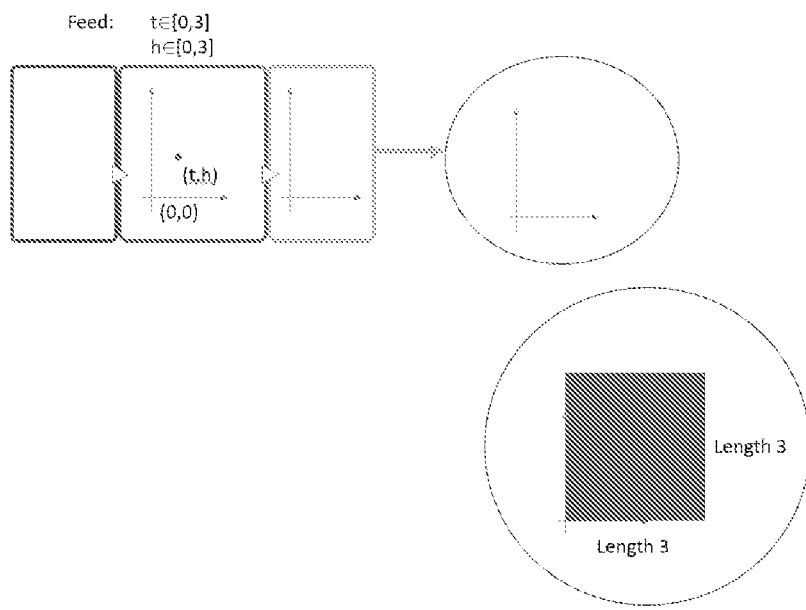
FIG. 22 illustrates an exemplary transform designed for creating a continuous square.
Figure 23:
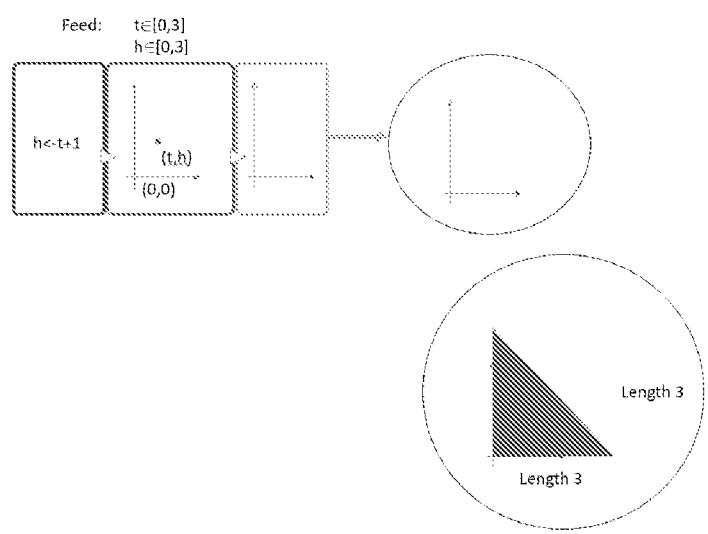
FIG. 23 illustrates an exemplary transform designed for creating a continuous triangle.

FIG. 22 illustrates an exemplary transform of which the feed contains continuous sets for creating a plain or continuous square while FIG. 23 illustrates an exemplary transform of which the feed contains continuous sets for creating a plain or continuous triangle.

In the case of the description of the triangle, before the transform is applied, it needs to satisfy the condition in the input site of the transforms. This restriction indicates that only points under the line y=−x+1 will be added to the universe.

Figure 24:
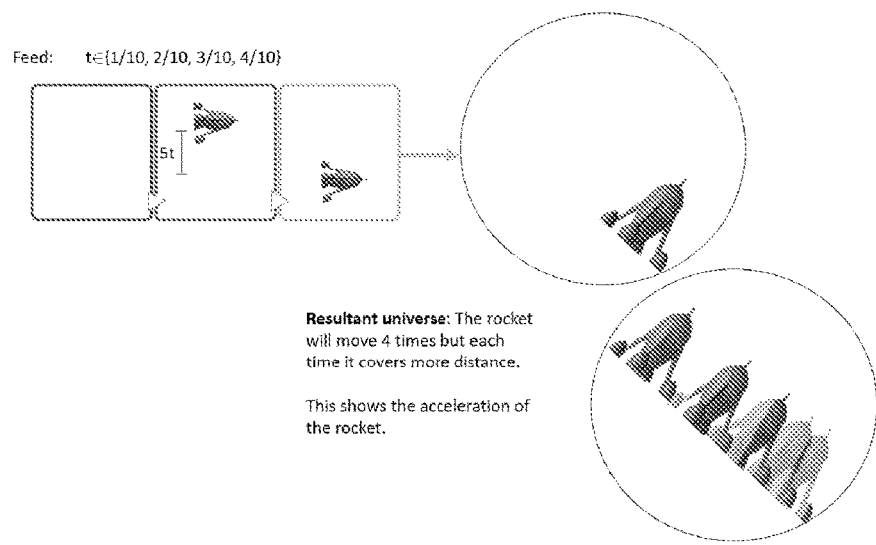
FIG. 24 illustrates an exemplary transform designed for creating an accelerating rocket.

FIG. 24 illustrates an exemplary transform for having a rocket accelerate. The acceleration of the rocket depending on the numbers in the feed. It should be understood that 5t could also be chosen to be any type of function f(t).

Figure 25:
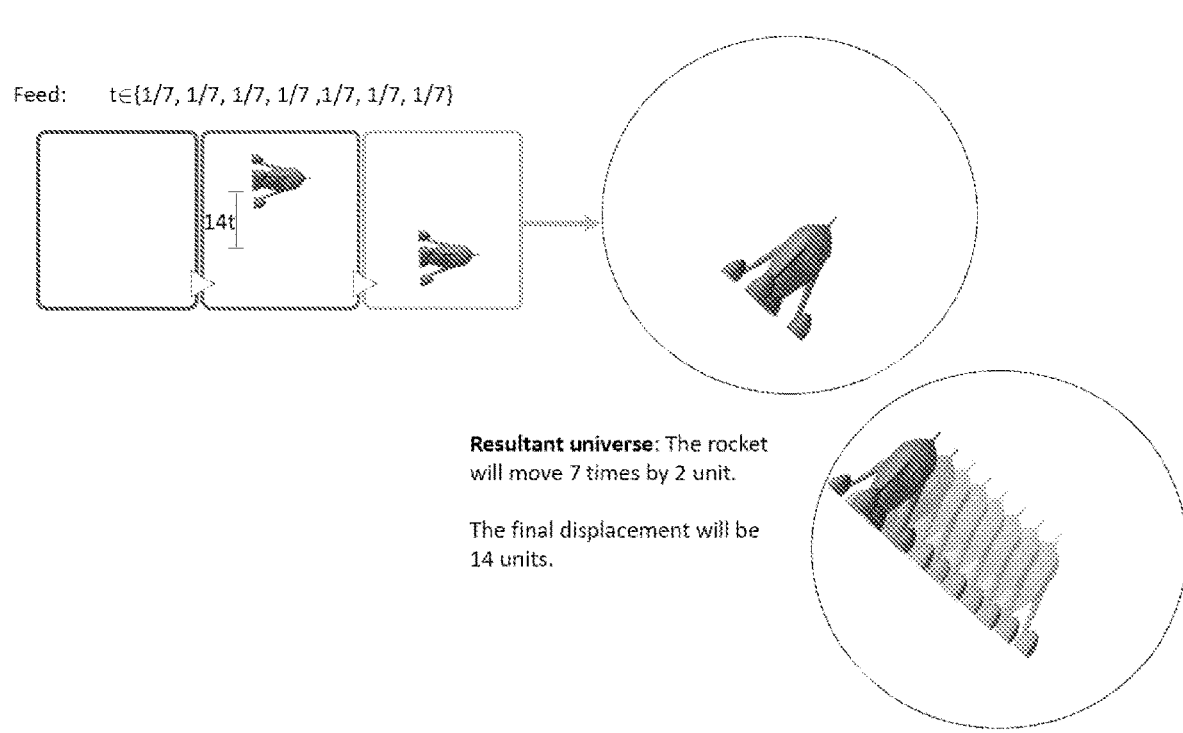
FIG. 25 illustrates an exemplary transform designed for relative displacement of a rocket.

FIG. 25 illustrates an exemplary relative displacement of a rocket. In this example, a relative displacement of the rocket is defined based on feed values ½ and the function 2t.

Figure 26:
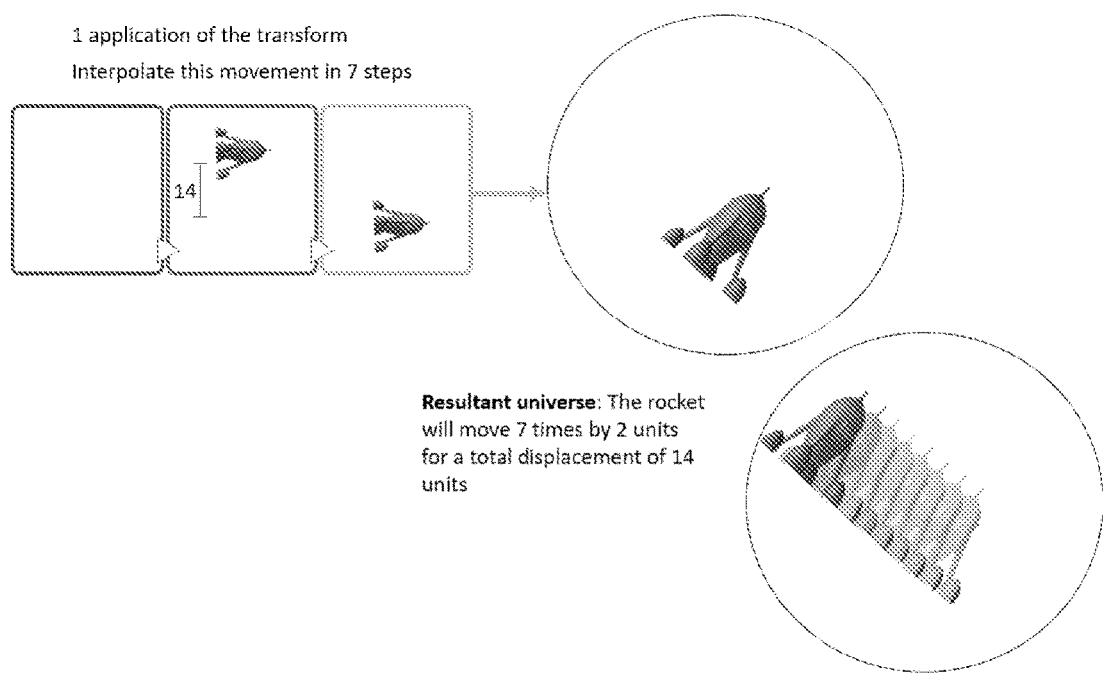
FIG. 26 illustrates an exemplary transform designed for moving seven times a rocket.
Figure 27:
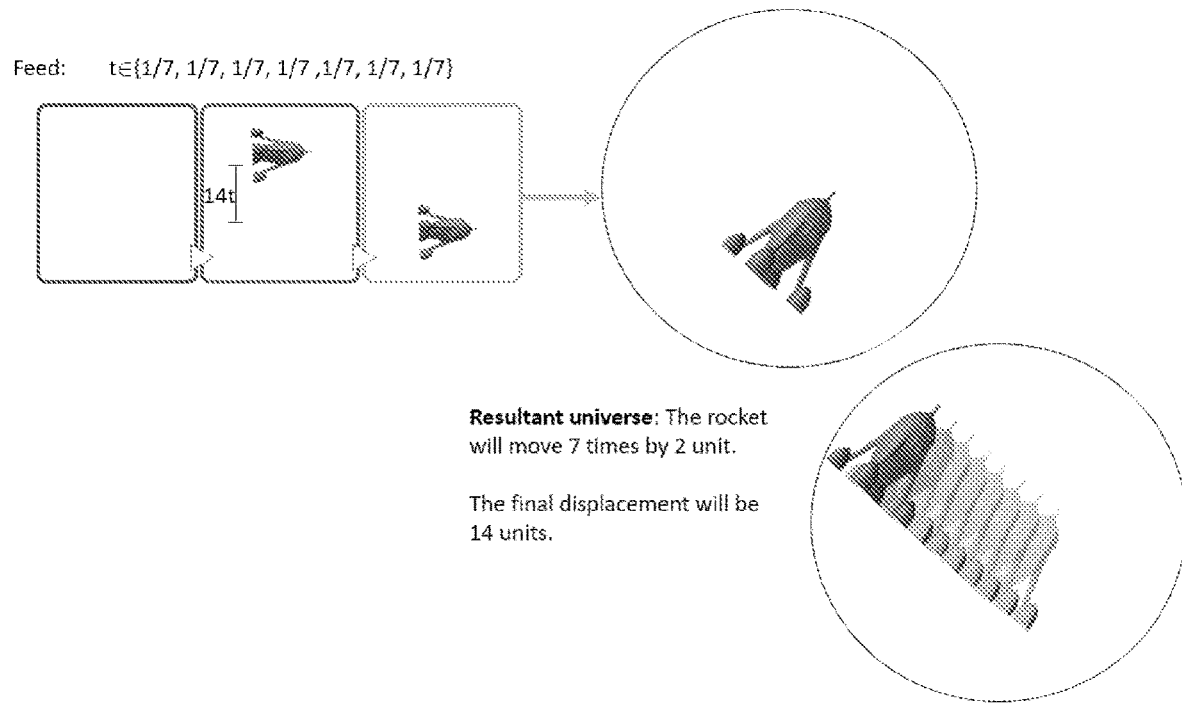
FIG. 27 illustrates an exemplary transform designed for moving seven times a rocket with interpolation.

In FIG. 26, the transform asks to move the rocket by 14 units, but to interpolate it in 7 steps. The interpolation may be represented with the feed described in FIG. 27.

Figure 28:
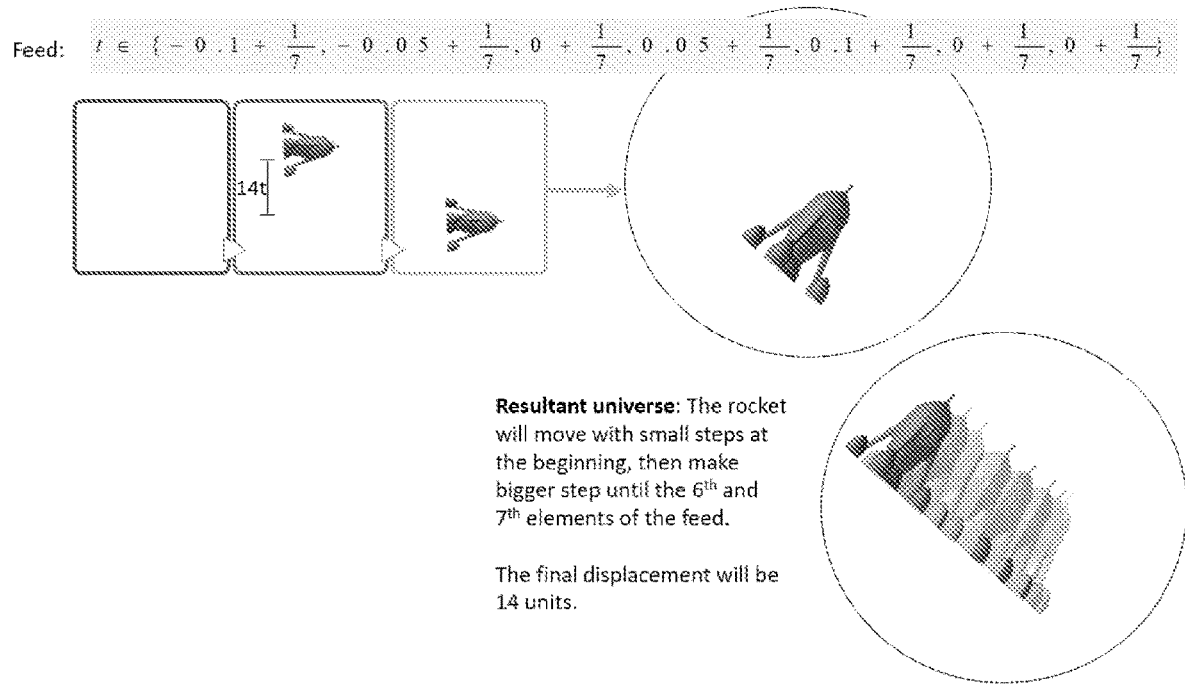
FIG. 28 illustrates an exemplary customization of a manner in which interpolations are created.

FIG. 28 illustrates that the manner in which the interpolations are executed may be customized to reflect behaviors such as acceleration.

Figure 29:
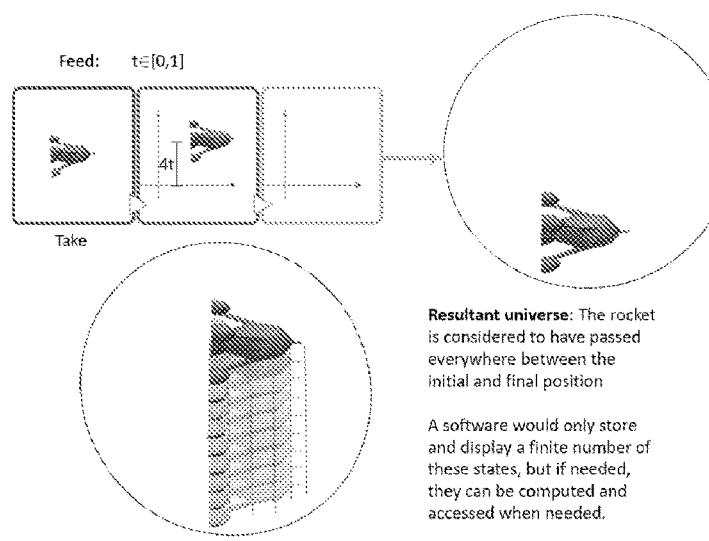
FIG. 29 illustrates an exemplary continuous transform for absolute position.

FIG. 29 illustrates an exemplary continuous transform for absolute position in which, when a rocket is removed, then another rocket is inserted at a new position relative to the global axis.

Figure 30:
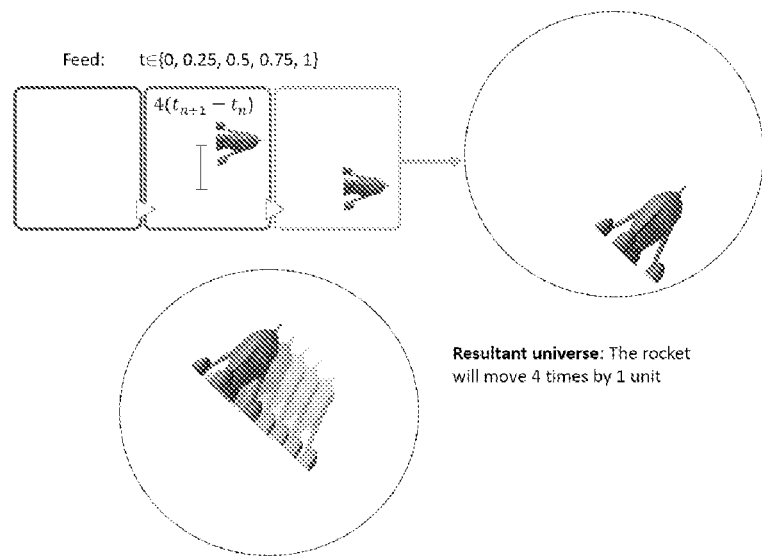
FIG. 30 illustrates an exemplary continuous transform for relative position.

FIG. 30 illustrates an exemplary continuous transform for relative position. In this example, the transform is applied in a relative manner. Access to more than one value at a time is provided in the set. In the present case, t1=0, t2=0.25, t3=5, t4=0.75 and t5=1. This allows computing the differences to generate displacements of 1 unit increments.

Figure 31:
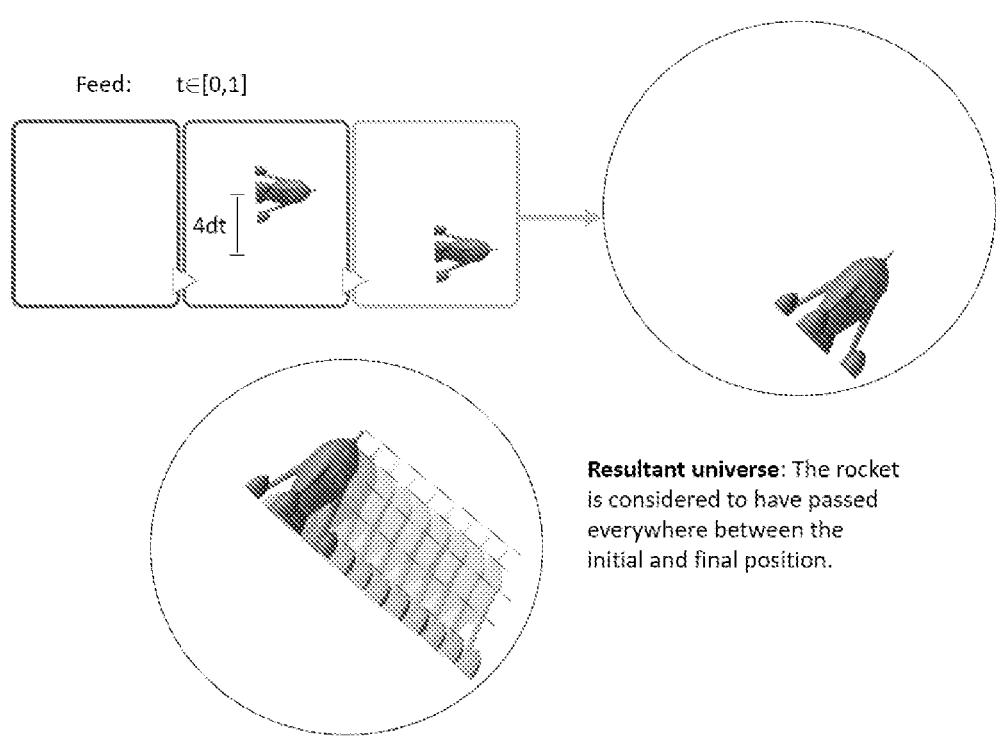
FIG. 31 illustrates an exemplary transform for creating continuous relative displacement of a rocket.

A continuous relative displacement can be done by using dt which takes the place of the delta t, as illustrated in FIG. 31.

Figure 32:
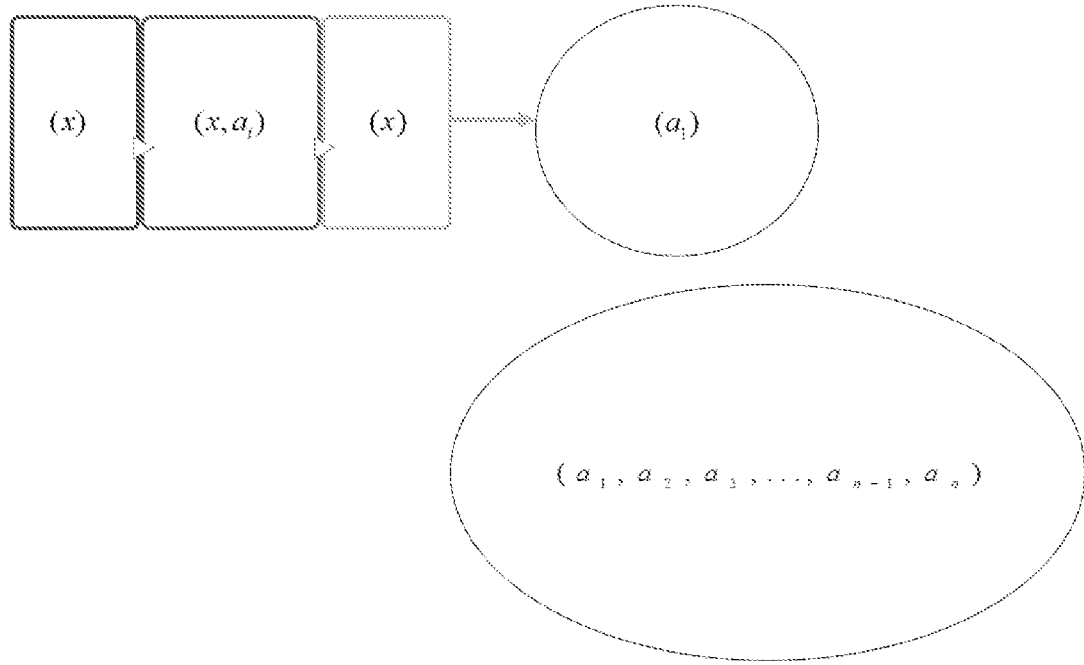
FIG. 32 illustrates an exemplary transform for creating vectors of n elements.
Figure 33:
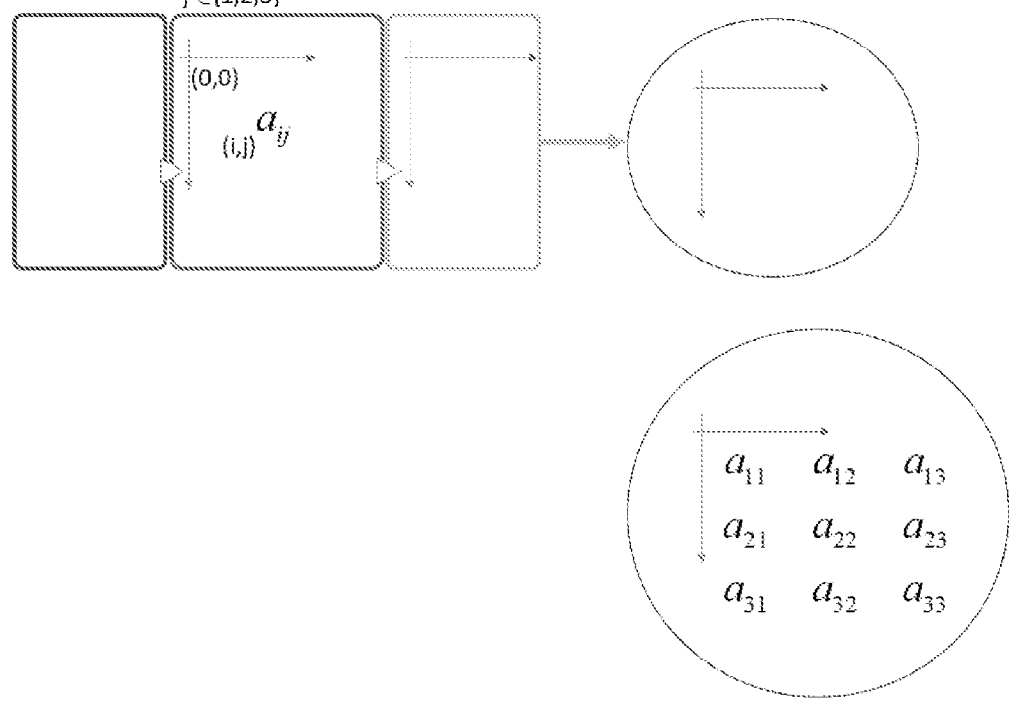
FIG. 33 illustrates an exemplary transform for creating a 3 by 3 matrix.

FIG. 32 illustrates an exemplary transform for creating vectors of n elements. For example, a 3 by 3 matrix may be created as illustrated in FIG. 33.

Solving

Variables can be added in a system by adding a variable symbol or indicating that a form is a variable. Usually one needs to indicate what is desired for the system to become or perform when the variable is to be solved. This is similar to solving for x in classical algebraic equations with the equality symbol "=". For example, taking a cancerous cell that keeps duplicating, one can take a variable transform T that applies to the cancerous cell and indicate that it is desired for the system to become a cell that will no longer duplicate. The system is then used to solve this for T. One could also solve for T by using solver systems created within the framework, using incoming and outgoing data forms, using external solvers or manually inputting potential transforms. The result is a set of different possible forms for T that stop the duplication of the cancerous cell. Since multiple types of mathematical and programming techniques can be modelled and implemented directly in the framework, one can simultaneously use multiple powerful tools to solve difficult systems. Examples of tools which can be implemented in the framework are artificial neural networks, equation solving, mathematical optimization and different machine learning algorithm, and the like.

Network of Projects

When creating a project or system, the system is in a repository and can be made public or private. On a web platform, private local servers or peer-to-peer based networks, a new project P can be initiated with a description of what needs to be achieved. Users can submit systems in that project or improve systems submitted in this project by others. Users can vote for the best systems or systems closest to the requirement of the project.

Other project systems can be fully imported in the system (or project) and adapted for it. For example, instead of importing a whole system Sub in the system Sys, one can ask to send information from Sys to Sub and let Sub calculate return values for Sys. This allows for distributed computing and less duplication of projects and systems. Some projects can be private or public. This allows for the creation of a large network of projects where a great number of users can develop and create large and useful projects. Each of these projects can be composed of multiple other projects who themselves rely on other projects. Each included project can be seen as similar to a library from script-based programming languages such as C++.

In one embodiment, the effect defined in a transform may comprise multiple parts to help the representation. For example, the effect may comprise two parts. When the input site is selected and the value is used in the effect and the output site, then the output site form selected by the output site will be modified with the form in the output part of the effect, and the input site form selected by the input site will be modified with the form in the input part of the effect.

Figure 34:
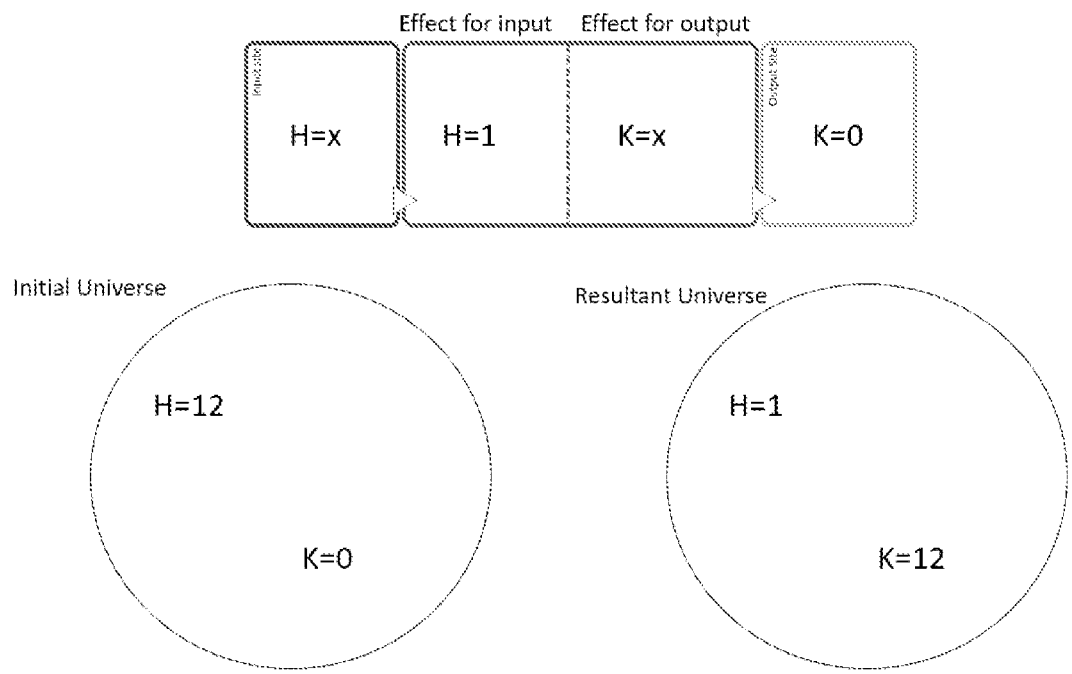
FIG. 34 illustrates a transform comprising a two-part effect, in accordance with a first example.

FIG. 34 illustrates an exemplary transform having a two-part effect. Here, the value 12 of the initial universe is imported in the transform so that K=12. Then, K=0 is replaced by K=12 and H=12 is replaced by H=1.

Figure 35:
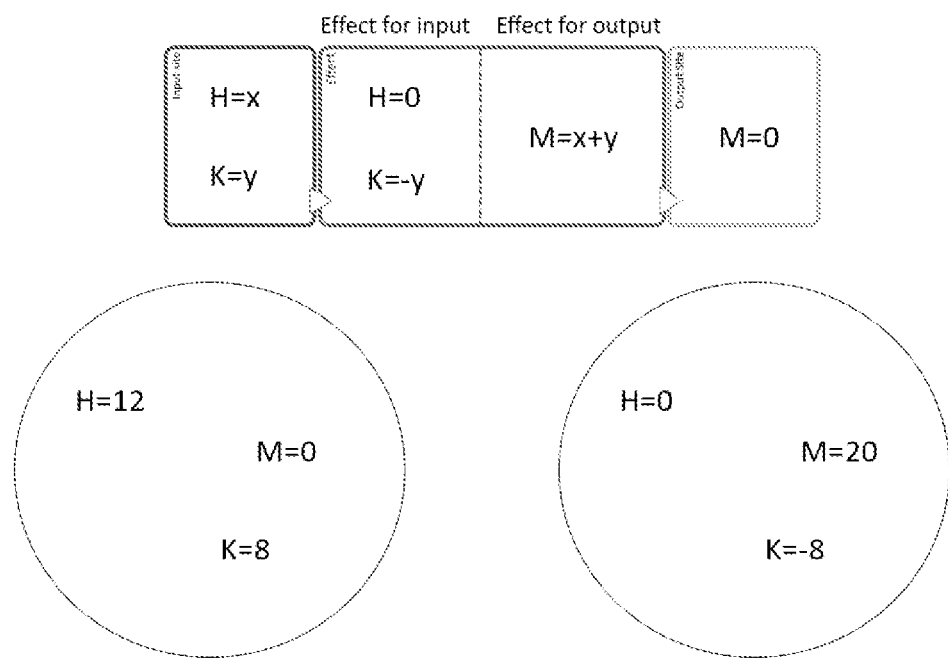
FIG. 35 illustrates a transform comprising a two-part effect, in accordance with a second example.

FIG. 35 illustrates a further example of a transform having a two-part effect. In this example, the values 12 and 9 from the initial universe are imported in the transform so that M=12+8=20. Then, H=12 is replaced by H=0, K=8 is replaced by K=−8 and M=0 is replaced by M=20. Then, K=0 is replaced by K=12 and H=12 is replaced by H=1.

Figure 36:
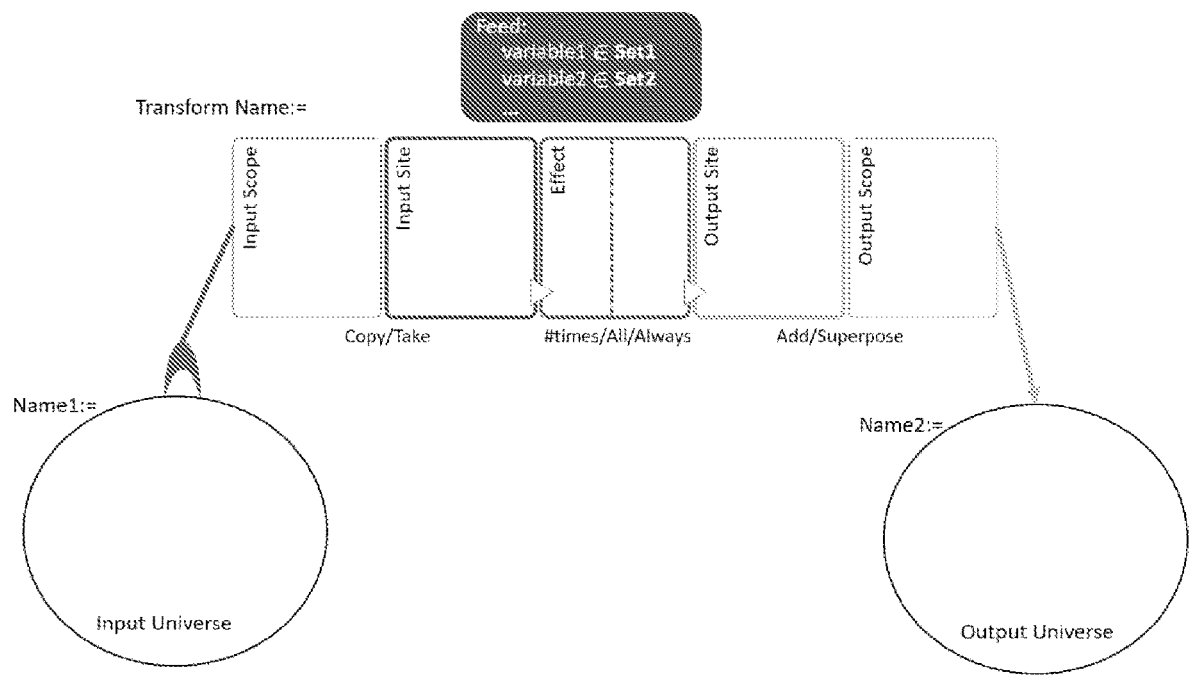
FIG. 36 illustrates an exemplary transform comprising a feed and a two-part effect.

FIG. 36 illustrates an exemplary transform comprising a feed and a two-part effect.

Figure 37:
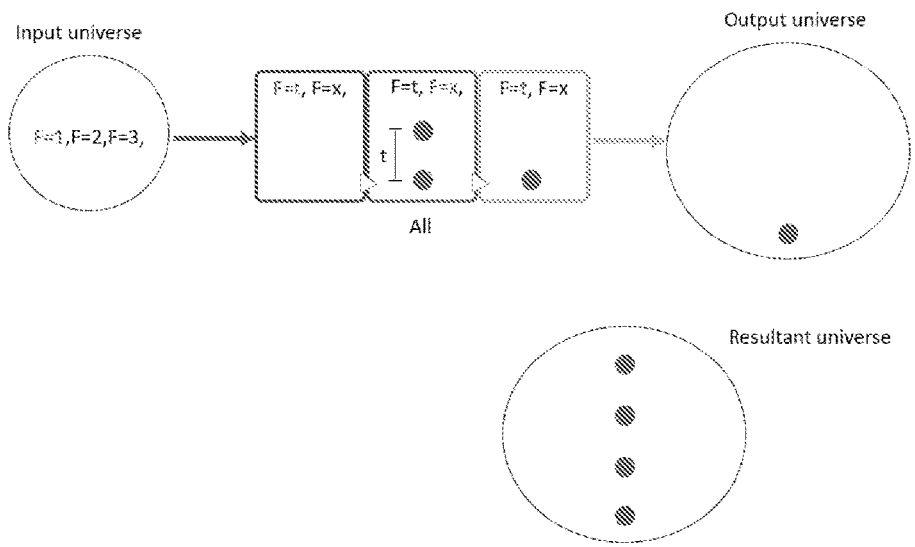
FIG. 37 illustrates an exemplary discrete transform.

It should be understood that a feed can be emulated for discrete feed with only the components of the three-parts transform without a feed. The discrete transform illustrated in FIG. 37 takes the values for t from an input universe containing the ordered elements 1,2,3. After an application of the transform, the left element is shifted to the right. This will allow selecting the second element of the ordered set on the next application of the transform. When the feed is an interval of real numbers or an infinite set, a new procedure would need to be defined to extract elements from continuous ordered sets. In one embodiment, a definition of the feed may be added to the system which is well suited to deal with intervals and has many other applications.

In the following further examples of transforms are described.

In a first example and in order to create a transform, a user selects a face of the tetrahedron present in the output universe (see FIG. 38a), sends or drag-and-drops it in the output site of the transform (see FIG. 38b). Automatically, the triangle face will appear in the effect and the output site. The user can then edit the effect by adding a mesh on the face or scaling down the triangle. If the user adds a smaller tetrahedron on the face (see FIG. 38b) and adjusts the transform data by putting a 3 on the number of times the transforms is to be applied. When running the system, smaller tetrahedrons will be added one after the other on the faces until 3 faces have a small tetrahedron on them (see FIG. 38c).

The user may also create another transform where a small cube is added on the triangle. When the two transformations are placed concurrently with another transform on the system's tetrahedron and the system runs, only one of the two will be applied. In this case, the user could decide to put 80% chance of applying the transforms with the cube and 20% for the other transform.

In another example, a user imports a molecule in the system, selects it and sends it to the output site. The user adds a D in the input site and can also add it to the effect. Moving the effect molecule to the right opens a place where values or functions can be inserted. Drag-and-dropping the D from the effect or typing a D into that space connects it to the D of the input site. The user then applies a function to the D by writing 1/D. Now, when the transform is applied to the molecule, the displacement of the molecule will depend on the value of D which comes from somewhere else in the system or even from incoming data. Before the transform is applied, the value of D is read to determine the displacement of the molecule. In the present case, if D=100, then the molecule will be moved to the left by 7 times $1/100$ unit when this transformation is applied 7 times to a molecule.

All previous positions of the molecule may be saved in the timeline so that a transform can use and access the timeline. To measure the average speed from 5 steps ago and now, for example, the user may write or choose in the input site the global positions of the molecule now (P0) and form 5 steps ago (P5). In the effect, the user writes S=(P0−P5)/5. Now, each time this transform is applied to the molecule, an average speed is calculated. This transform can be left in the corner of the system and applied after each change in the system. By hiding the input site of that transform, only the speed data will be displayed in the corner.

FIG. 39 illustrates an exemplary transform comprising an input site, an effect and an output site (the transform data being omitted). The application of the transform is performed as follows. First a form in the input universe is selected. The selected form that matches with the input site where the star (*) can be anything as long as the surrounding forms around the star are matching.

In the present example, A=3 is selected since 'A=' is matching and because the star symbol can select anything, so the number 3 is selected.

Then the information of the input site that also appears in the rest of the transform is identified and each occurrence of the identified information is replaced by the information from the associated selected form.

Figure 40:
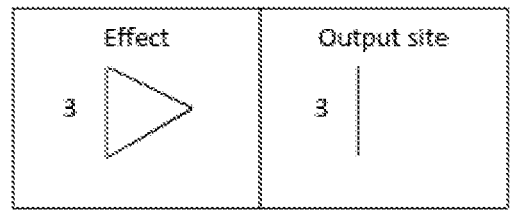

In the present example, the star symbol appears in the effect and in the output site of the transform. The information from the selected form that is associated to the star is '3'. Therefore, the stars in the effect and output site are replaced by 3 as illustrated in FIG. 40. It should be understood that the replacement of the stars with the number 3 may not be permanent in the effect and output site since it may only be done for the application of the transform.

The form in the output universe that matches with the output site is then selected and replaced it by the effect.

Figure 41:
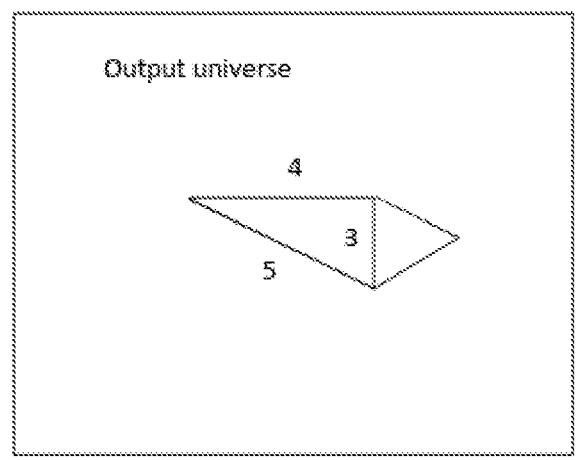

In the present example, the side of length 3 of the triangle in the output universe is selected and is replaced by the same side but with the added two lines which creates another triangle, as illustrated in FIG. 41.

Relative Position Between Parts of the Transforms

In one embodiment, the relative position of the forms inside the input site, effect and output site may influence the transform. For example, for two objects to be in the same position in their respective rectangle for output site and effect may mean that they are connected together. For example, it an object E of the effect is in the same place as an object O of the output site, then O will be replaced by E. If the positions of the objects is different, a different result may be obtained as illustrated in the following example.

Figure 42:
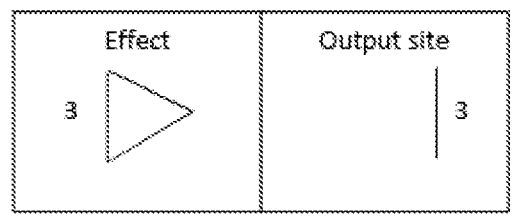
FIGS. 42 and 43 illustrate the application of a transform designed for replacing a segment by a triangle, in accordance with a second example.
Figure 43:
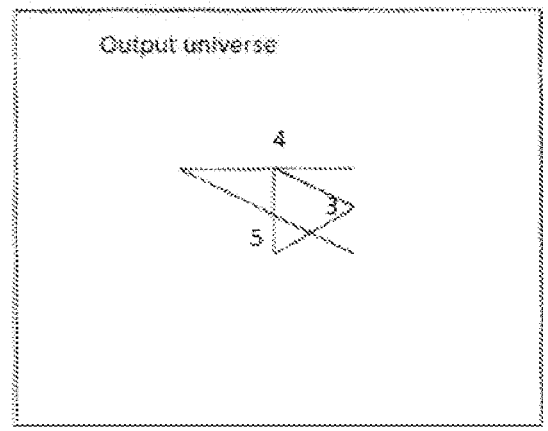

For example, replacing the transform illustrated in FIG. 40 with the one illustrated in FIG. 42 results in the form illustrated in FIG. 43 instead of the form of FIG. 30.

Neuron Firing

Figure 44:
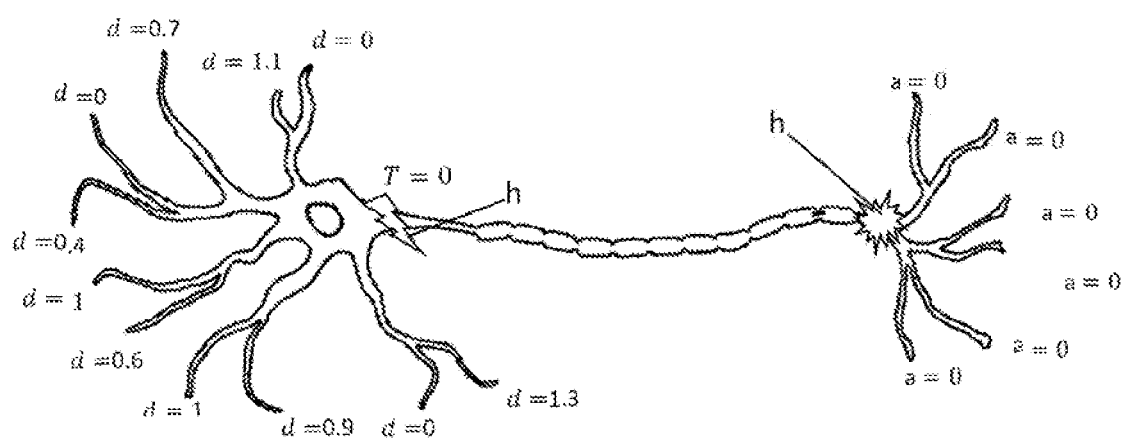
FIG. 44 illustrates the universe of a transform representing two interconnected neurons, in accordance with an embodiment.

For this example, the input and output universe are the same and the unique universe is illustrated in FIG. 44.

Figure 45:
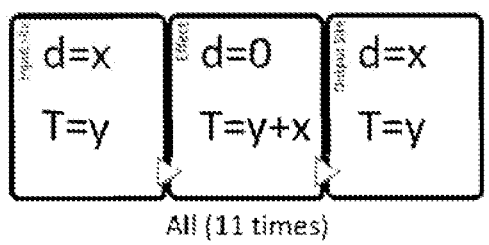
FIG. 45 illustrates a first exemplary transform to be applied within the universe illustrated in FIG. 44.

A first transform illustrated in FIG. 45 selects a dendrite d=x and the threshold variable T and its value y, as input site. The effect is created by adding the value x to the y, so that the contribution of this dendrite is added to the threshold value. Then, the d=x and T=y, when selected by the output site, are replaced respectively with d=0 and T=y+x.

The "All" indicates that the transform will be applied to the all d=x until each dendrite contributed only once, in this case 11 times. Similar symbols in a transform are considered to be the same object. Thus, one would understand that the d=x and T=y of the input and output sites to be the same.

Figure 46:
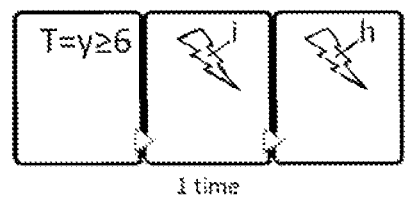
FIG. 46 illustrates a second exemplary transform to be applied within the universe illustrated in FIG. 44.

The next transform illustrated in FIG. 46 makes the neuron fire when the threshold value is greater or equal to 6 (here, 6 is the threshold limit value of this neuron). The inequality defined in the input site indicates that when this inequality is satisfied the transform is applied by changing the h labelled lightning to a i labelled lightning.

Figure 47:
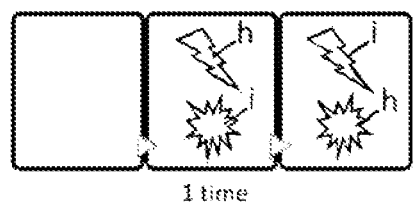
FIGS. 47-49 illustrates a third exemplary transform to be applied within the universe illustrated in FIG. 44.

The next transform illustrated in FIG. 47 allows the action potential to move towards the axon terminals. In this case, the input site is empty, which means that "there are no condition" to be satisfied before applying the transform. The only condition that is required for applying the transform is for the lightning symbol to be i labelled and the rugged circle to become h labelled in the output universe.

Figure 48:
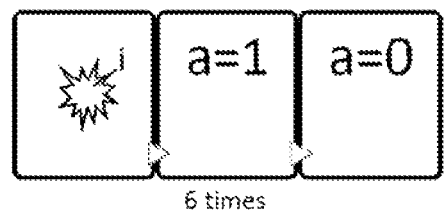

Since the action potential is now close to the axons, the value of each axon a=0 is changed to the value a=1, as illustrated by the transform of FIG. 48.

Figure 49:
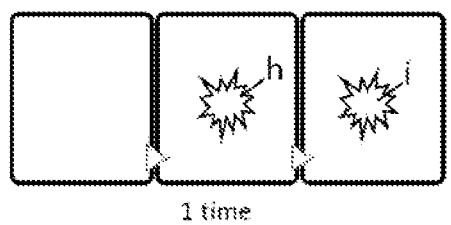

Then, after each value associated to the axons becomes 1, the symbol representing the action potential becomes h labelled, as illustrated by the transform of FIG. 49.

Figure 50:
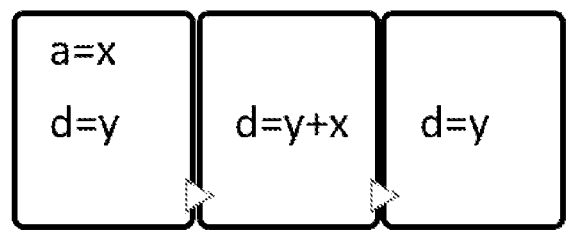
FIG. 50 illustrates a fourth exemplary transform to be applied within the universe illustrated in FIG. 44.

A network of neurons can be created by connecting the axons of this neuron to the dendrites of other neurons network. A coarse way to transmit the value of an axon a=x to the value of its associated dendrite d=y can be done with the transform illustrated in FIG. 50.

Synaptic Cleft

Figure 51:
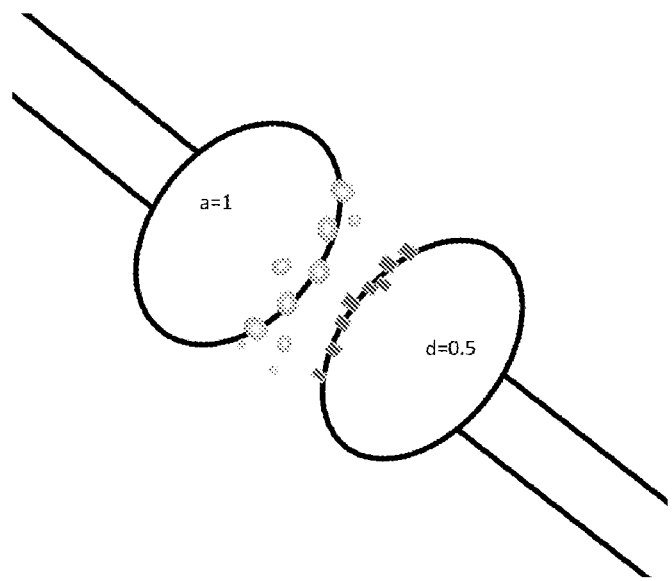
FIG. 51 illustrates an exemplary model of a synaptic cleft.

FIG. 51 illustrates a model of a synaptic cleft.

Figure 52:
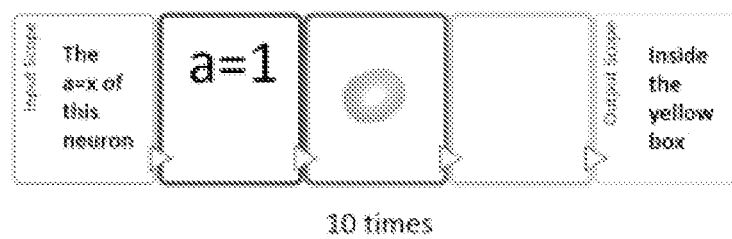
FIG. 52 illustrates an exemplary transform for modelling the release of 10 neurotransmitters in the synaptic cleft of FIG. 51.

The transform illustrated in FIG. 52 allows modelling the release of 10 neurotransmitters in the synaptic cleft near the axon.

Figure 53:
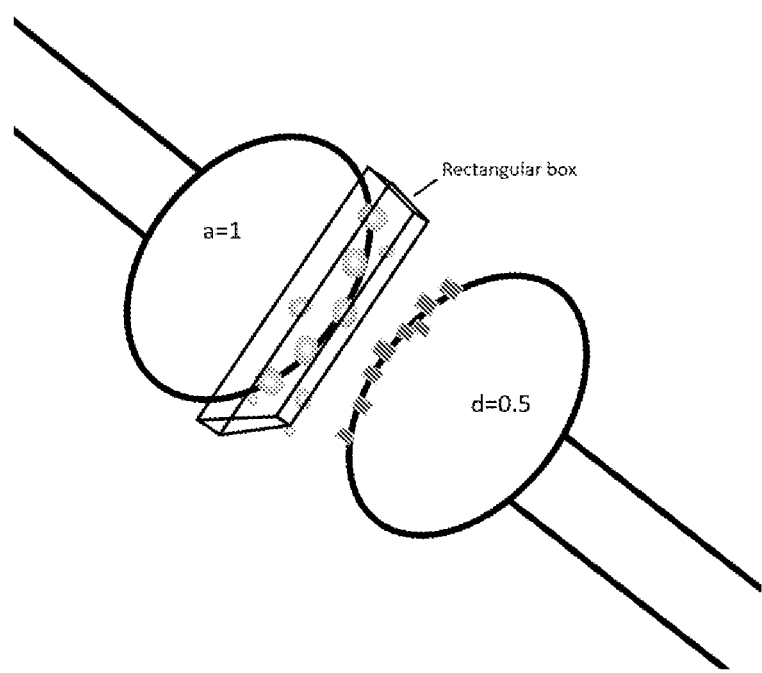
FIG. 53 illustrates the model of the synaptic cleft of FIG. 51 provided with a rectangular box visually representing an output scope, in accordance with an embodiment.

The input scope is the a=x of this neuron. When a=1, then a random position in the output scope is selected and a circular neurotransmitter is inserted at this position. The blank output site does not specify a particular position; thus, it is interpreted as a random position in the output scope. The output scope defines a region delimited by a rectangular box illustrated in FIG. 53.

Figure 54:
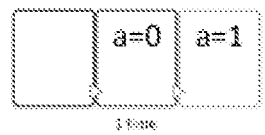
FIGS. 54 to 57 illustrate the release of neurotransmitters in the synaptic cleft and their absorption by the neuroreceptors.

After the neurotransmitters are released, then a=1 is brought to 0 using the transform of FIG. 54.

Figure 55:
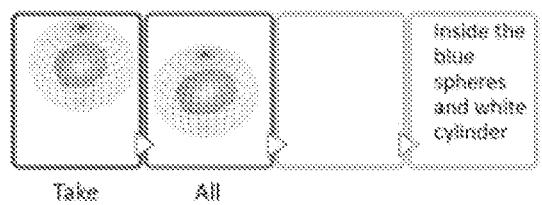
Figure 56:
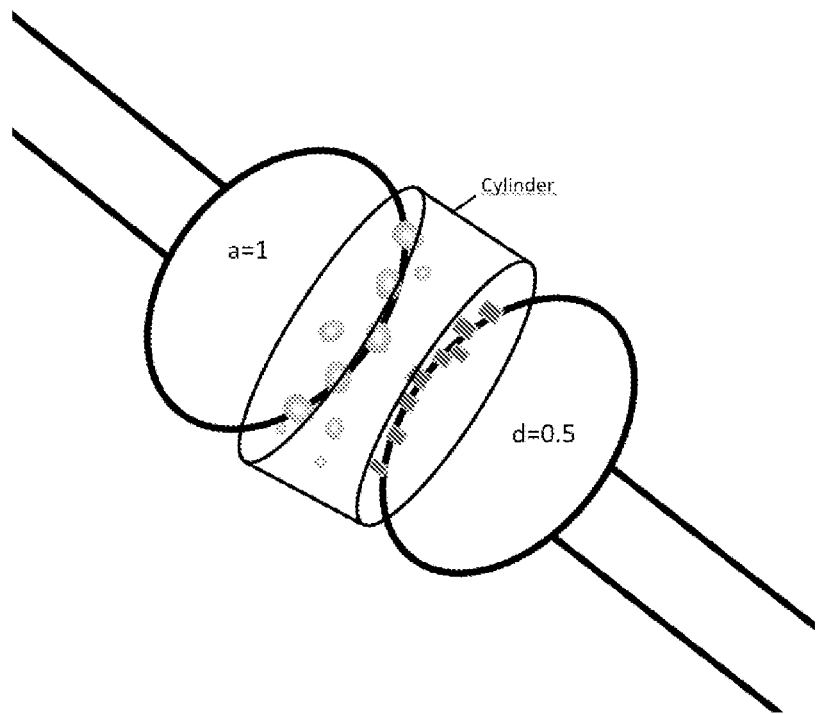

The transform of FIG. 55 allows for the neurotransmitter to be moved in the synaptic cleft delimited by a cylinder illustrated in FIG. 56. It takes a neurotransmitter and a bounding sphere of space around it. Then it puts back the neurotransmitter at a random place in its bounding sphere as long as the place in the bounding sphere is not outside of the synaptic cleft delimited by the cylinder.

Figure 57:
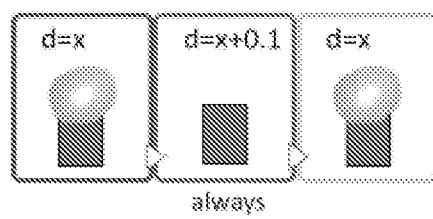
Figure 58:
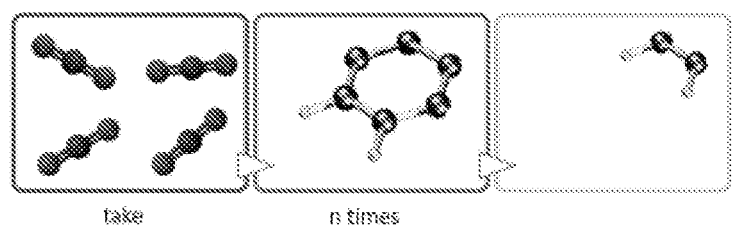
FIGS. 58 and 59 illustrate a transform for creating a graphene sheet and the result of the application of the transform, respectively, in accordance with an embodiment.
Figure 59:
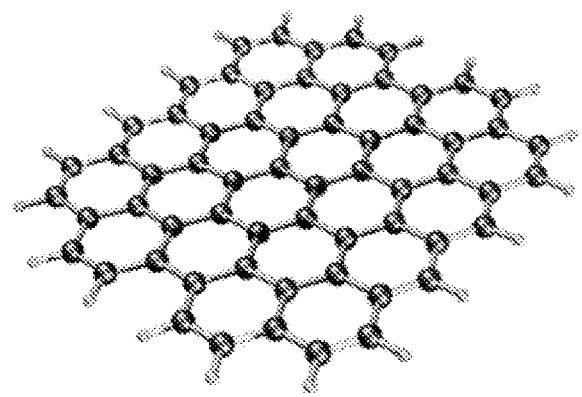

Finally, when a neurotransmitter binds on a neuroreceptor, then its contribution is added to the dendrite value d=y as expressed by the transform of FIG. 57. This transform is always present and will act when the condition is satisfied, i.e. when a neurotransmitter binds with one of the neuroreceptors.

Building a Graphene Sheet

The transform of FIG. 47 represents one of the rules needed to assemble a graphene sheet. This transform takes four $CO_2$ molecules and adds it to a graphene sheet illustrated in FIG. 48.

CO2 Collector

Figure 60:
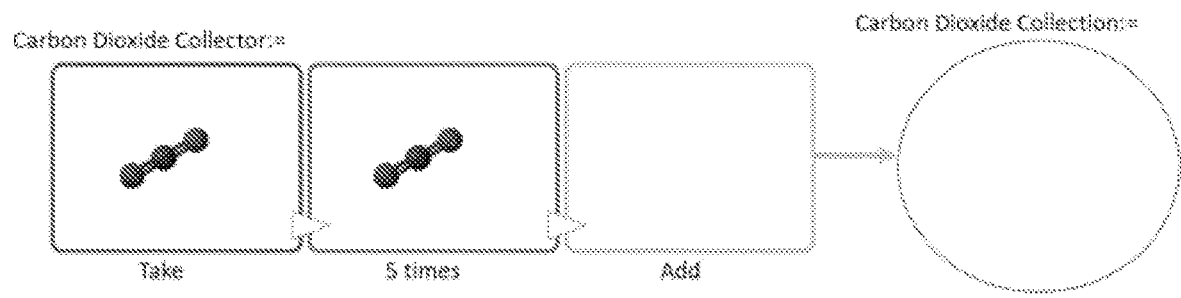
FIGS. 60, 61 and 62 illustrate the use of a transform to create a $CO_2$ collector, in accordance with an embodiment.

The transform illustrated in FIG. 60 acts as a collector by using the functions 'take' and 'add'. In this example, $CO_2$ molecules are collected and added to a $CO_2$ collection. Literally, it takes $CO_2$ molecules from the input universe and move them in a group called Carbon Dioxide Collection. The input universe is considered to be a container containing a large number of $CO_2$ molecules.

Figure 61:
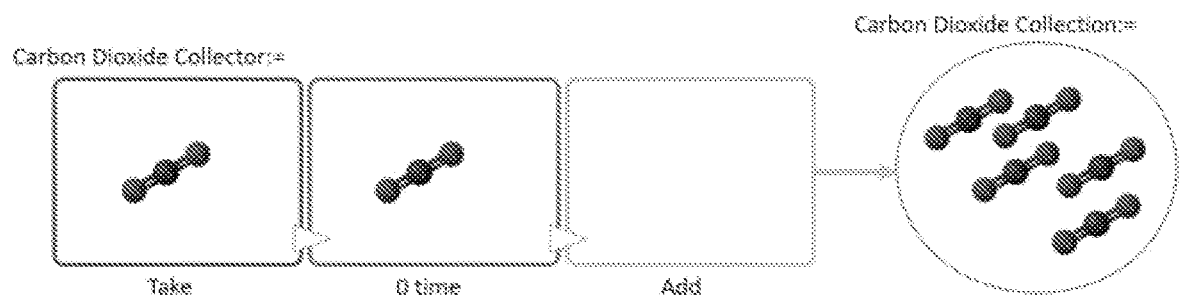

After collecting 5 molecules, the scenario illustrated in FIG. 61 is obtained.

Figure 62:
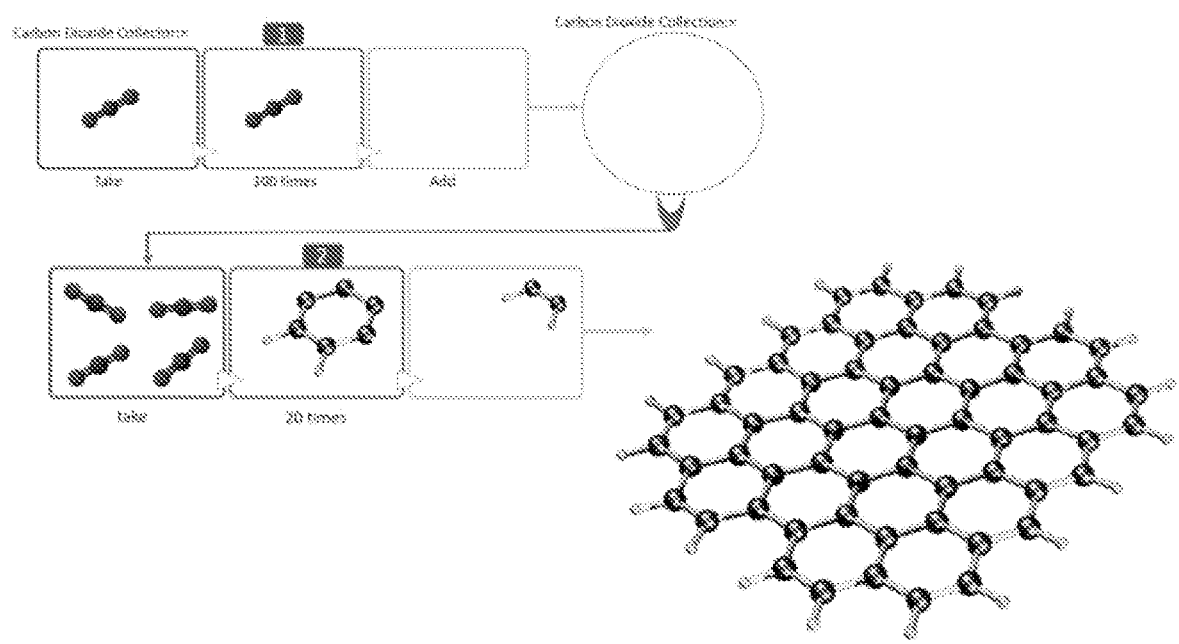

A more elaborate system which collects $CO_2$ molecules to build some parts of a graphene sheet is illustrated in FIG. 62. The number in the red boxes give the order of application of the transforms. First the $CO_2$ is collected, then the graphene sheet is expanded.

Satellite Rotations

Transforms can be used to move and rotate objects such as 3D meshes.

Manual Rotation

Figure 63:
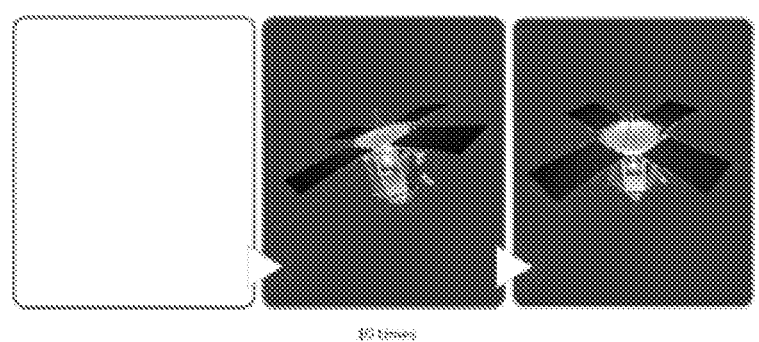
FIGS. 63 and 64 illustrate a manual rotation of a satellite, in accordance with an embodiment.

The transform illustrated in FIG. 63 allows rotating a 3D satellite.

Figure 64:
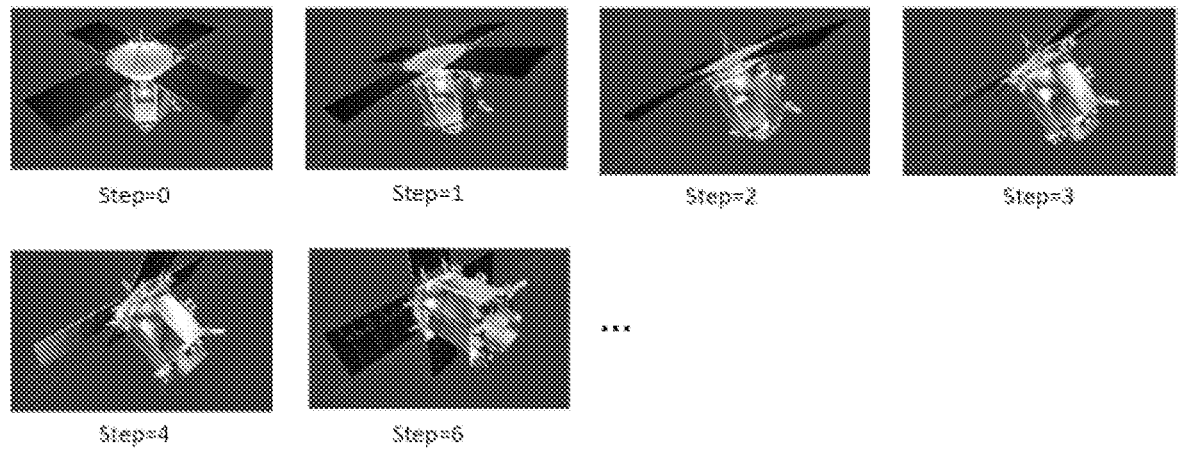

Applying this transform multiple times to the 3D model of a satellite provides the series of states of the output universe illustrated in FIG. 64.

Automatic Signal Finder Transforms

Figure 65:
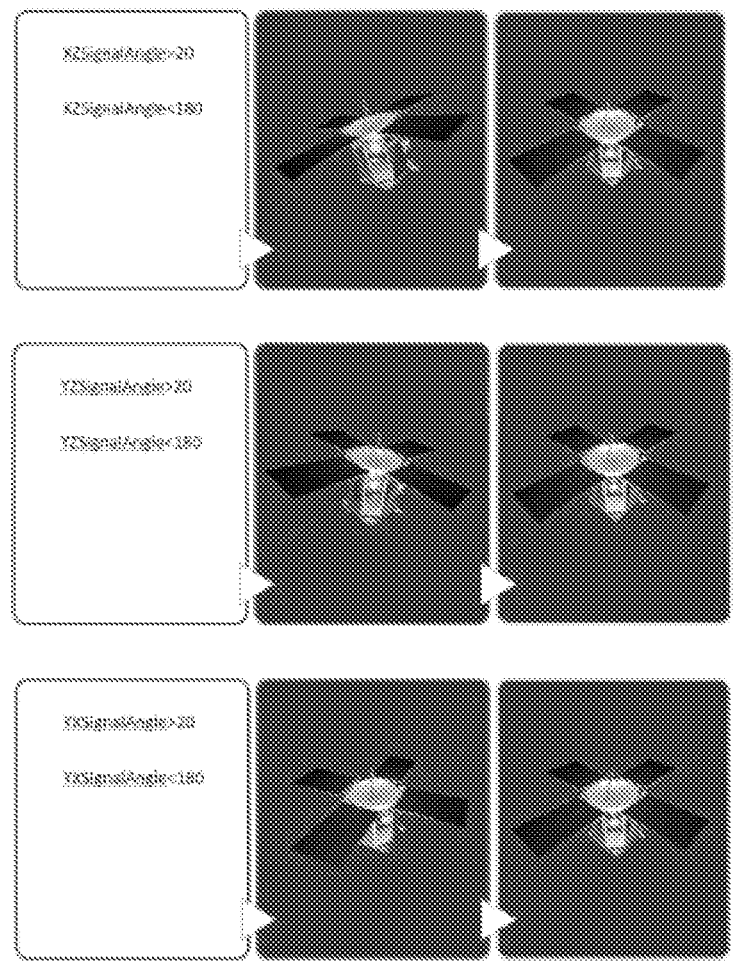
FIG. 65 illustrate an exemplary automatic signal finder transform.

If one wants a satellite that orients itself automatically toward a certain signal, one can use the set of transforms illustrated in FIG. 65 which rotates the satellite in their respective planes when the angle between the central z-axis of the satellite differs by more than 20 degrees from the source of the signal in their respective plane.

Adding to this set of transforms, rotation in the other direction when the angles are greater or equal to 180 will give us a set of transforms that allows the satellite to autonomously orient its dish towards the signal. Greater precision could be achieved by using a 1 degree threshold instead of the 20 degrees threshold to activate a rotation and make the satellite rotation increment also 1 degree.

Keyboard Activated Rotation

Figure 66:
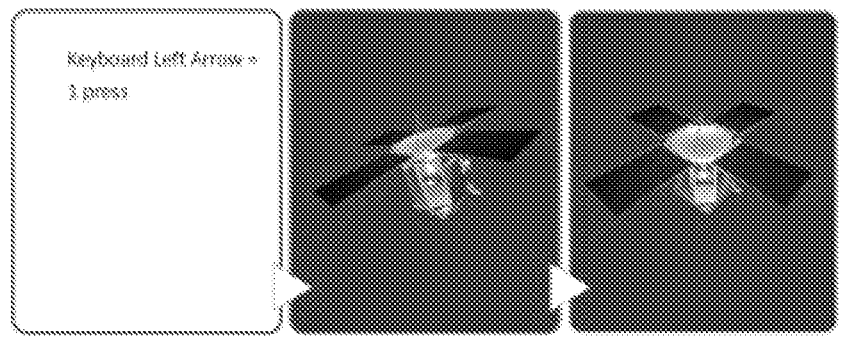
FIG. 66 illustrates an exemplary keyboard activated rotation of a satellite.

The application of a rotation could be triggered by a keyboard arrow press as illustrated in FIG. 66.

User Interface or Real Physical Button to Rotate the Satellite

Figure 67:
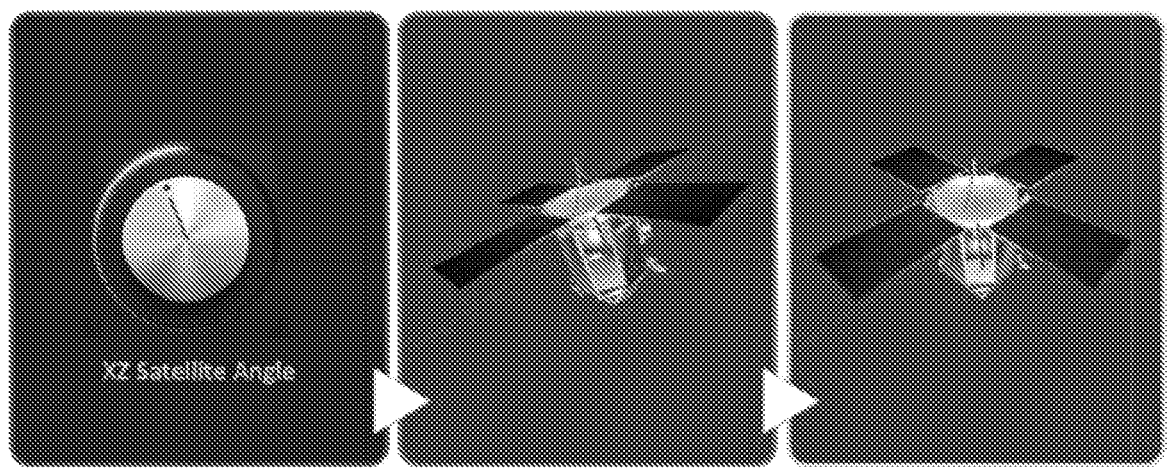
FIG. 67 illustrates an exemplary rotation of a satellite performed via a button.

The lines illustrated in the input site of the transform of FIG. 67 is connected to the line in the YZ plane. Note that the satellite in the effect is considered to be in absolute position and will be replaced in this direction regardless of where the satellite was previously oriented.

Car and Timeline

At each step or at each time the system changes, the state of the system can be recorded and stored in memory. This builds the timeline of the system as explained above.

As transforms are applied, the step number of the system increases. In the present example, it is assumed that every time a transform is applied in the system, the step number increases by 1. It should be understood that the step numbers are not necessarily integers, but they can also be real numbers that increase by real number increments. An example of real numbers steps, is for describing the passage of time as steps. Moreover, in an embodiment of the invention, transforms can be applied in a continuous way instead of in a discrete way.

Figure 68:
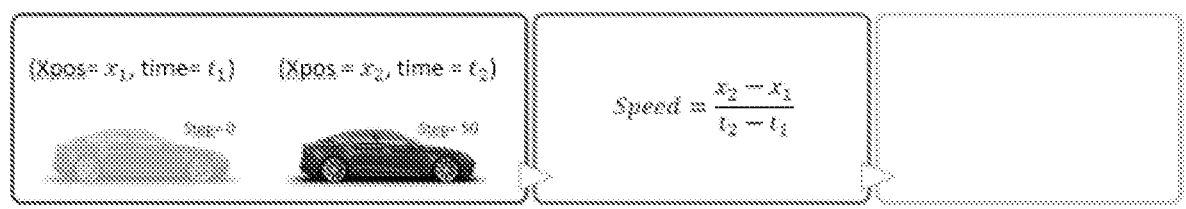
FIG. 68 illustrates a first exemplary transform for moving a car.

The system describes a car that moves according to different types of transforms. With the transform illustrated in FIG. 68, the average speed of the car in the x-direction can be calculated between step 0 and step 50. In the input site, the information about the state of the car at step 0 and at step 50 is accessed. Transparency of the car is used to signify that the car is from an earlier step.

Accessing a timeline with the transforms allows finding speeds, accelerations, derivatives and modeling many other concepts.

Figure 69:
FIG. 69 illustrates a second exemplary transform for moving a car.
Figure 70:
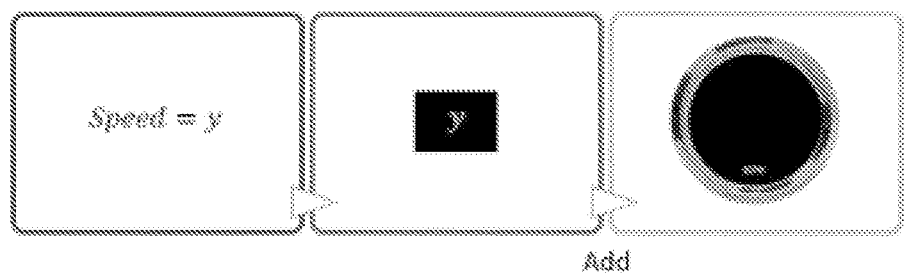
FIGS. 70 and 71 illustrate the creation of an odometer, in accordance with an embodiment.
Figure 71:
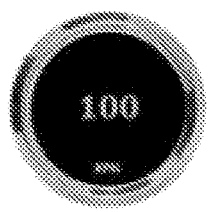

Modeling the measurement of the actual speed of the car and project it on an odometer would be done with the transforms illustrated in FIGS. 69 and 70. In the present case, 'actual' means the value of the step at the moment when this transform is about to be applied. Note that to get the present speed, the average speed of the last five steps is calculated. The transform of FIG. 69 allows inserting the Present Speed in the output universe.

The transform of FIG. 70 takes the Present Speed from previous output universe and writes number of the speed in blue on a black square. Then, it will superpose the blue number and square on the image of an odometer as illustrated in FIG. 60. Note that the word 'add' means that the odometer is not replaced, but the black square with number is added to the image of the odometer.

Transform Notation

It should be understood that the above-described transform notation is exemplary only.

For example, a transform could also be written as two-parts composed of the effect and output site. If this is the case, the forms that will act as input should be identified. This is because they need to be used to initialize the effect, output site and data of the transform.

Figure 72:
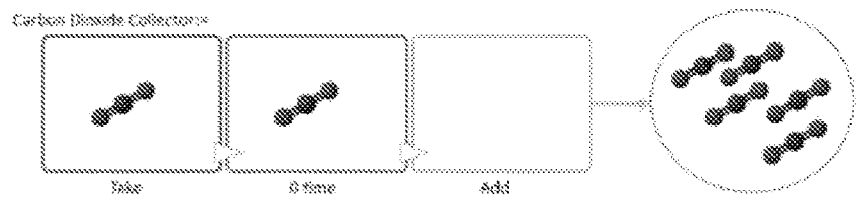
FIGS. 72 and 73 illustrate two different visual representations of a same transform, in accordance with an embodiment.
Figure 73:
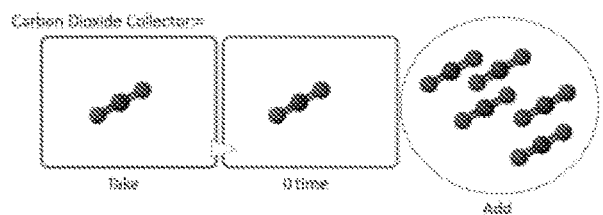

It should also be understood that transforms and structures can be presented differently depending on the needs and modelling contexts. For example, the transform of FIG. 72 may be replaced by the one illustrated in FIG. 73 presenting a more compact writing.

Orientation and Matching

When a transform matches the input site with a form of the input universe, in some embodiment of the invention, a match can be literal or allow rotations and translations.

In the simple system described above, the match in the output universe was literal.

In the carbon dioxide collector above, the match in the input universe would not be literal. It could select molecules that are facing in different directions.

Interconnections

An input site can be connected to multiple different effects. Effects can be connected to multiple output sites. Input sites can be connected to multiple input universes. Output sites can be connected to multiple output universes.

An output universe can be a transform and an input universe can also be a transform.

Moreover, a lone input sites can be connected to a full transform composed of its input site, effect, output site and data. An input sites can also be connected to set of transforms or even universe. In the same way, one can connect a lone output site to a 3-parts transform, set of transforms or universe.

Graphical User Interface (GUI)

Figure 74:
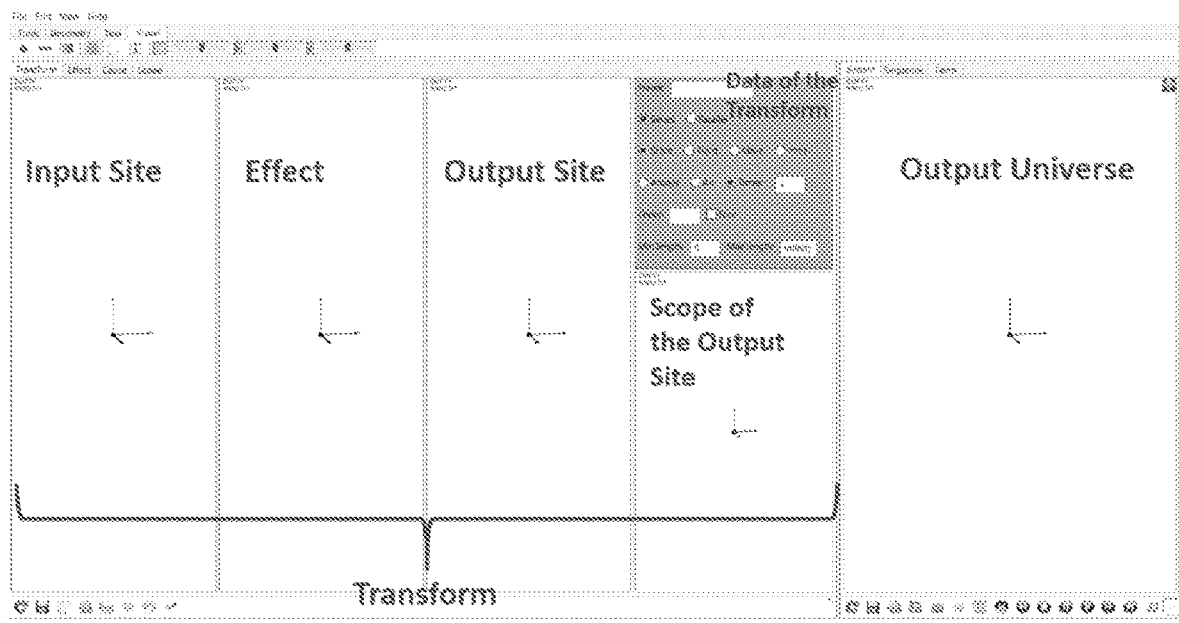
FIG. 74 illustrates a graphical user interface for creating transforms, in accordance with an embodiment.

The following presents a Graphical User Interface (GUI) that can be used to define transforms. As illustrated in FIG. 74, the GUI comprises a first portion in which the transform may be visually created and a second portion in which the output universe may be represented.

The first portion of the GUI comprises five windows. In the first window, the input site may be visually or graphically represented. The second window is used for visually defining the effect while the third window is used for visually representing the form contained in the output site. The fourth window is used for visually representing the output scope and the fifth window is used for inputting the transform data.

Figure 88:
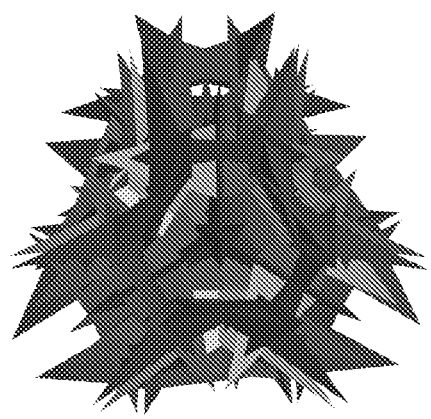

In one embodiment, as shown in FIG. 88, the transform without the scopes are displayed on the left and the universe is displayed on the left.

In one embodiment, the GUI may comprise a third portion for visually representing the input universe.

In one embodiment, the transforms and sequences of transforms can be represented directly in a universe.

In one embodiment, the sequence of transforms can be grouped together under a single representation.

In one embodiment, the sequences of transform can be represented in 2D or with lines, arrows (or other shapes) between the transforms representations to indicate how they will be applied.

In one embodiment, the sequences of transform can be placed in a 3D space with lines, 3D arrows (or other shapes) between the transforms representations to indicate how they will be applied.

In one embodiment, the fourth window for representing the output scope may be omitted. In the same or another embodiment, the first portion of the GUI may comprise a window for visually representing the input scope.

Figure 75:
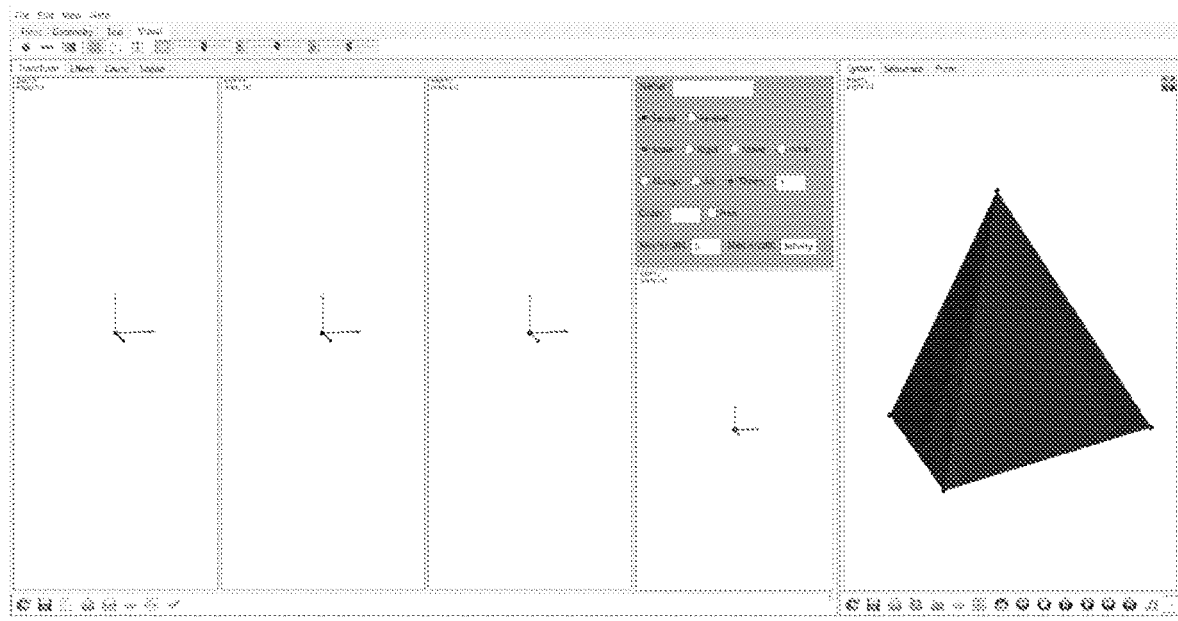
FIGS. 75-79 illustrates the use of the graphical user interface of FIG. 74 for creating a tetrahedron, in accordance with an embodiment.

In order to create a transform, a user first imports a form such as 3D model in the output universe from a library or creates a basic 3D model by using elements of the "Geometry tab" located at the top left of the GUI. In this example, the user creates a tetrahedron in the universe as illustrated in FIG. 75.

Figure 76:
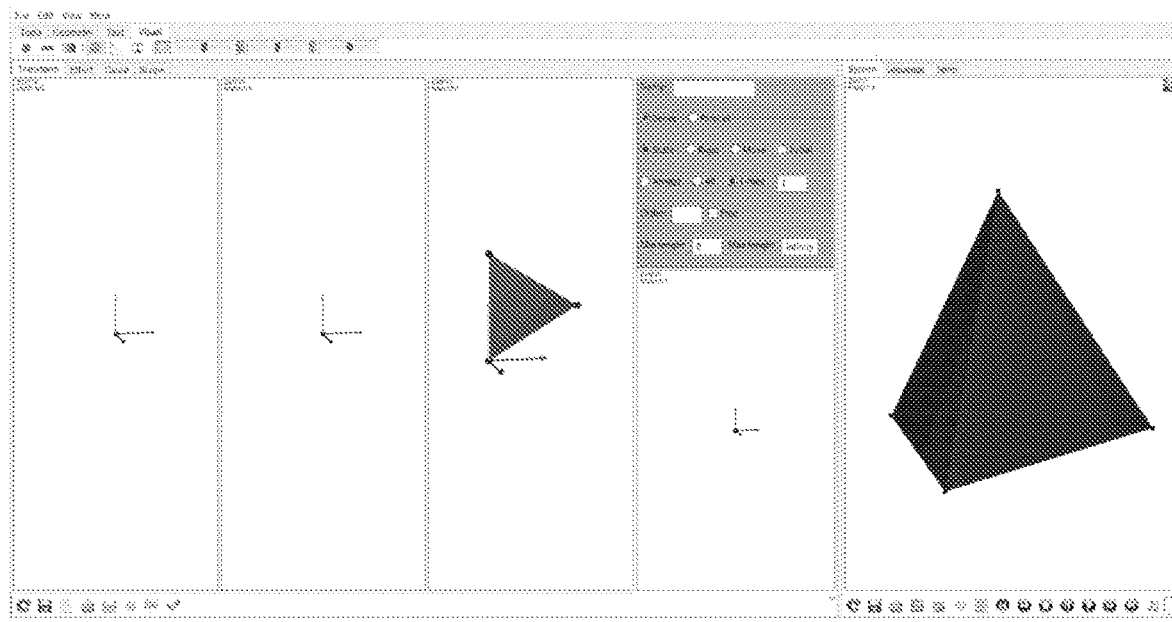

Then the user selects a face from the tetrahedron, then drag-and-drop it in the output-site of the transforms as illustrated in FIG. 76.

Figure 77:
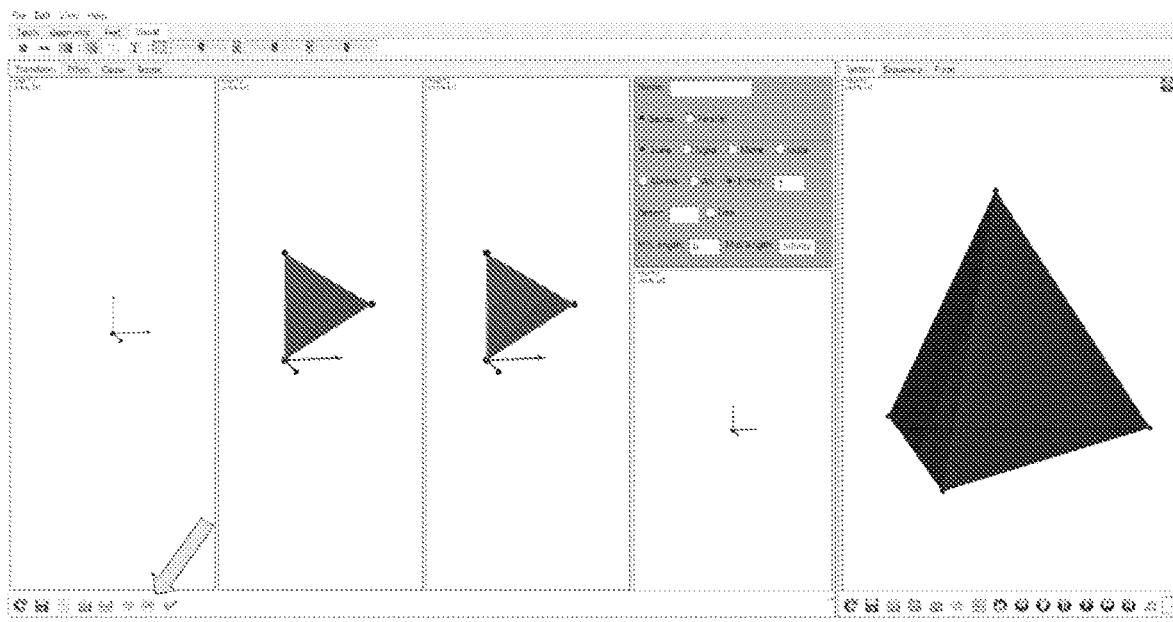

As illustrated in FIG. 77, the user copies the whole content of the output-site into the effect.

Figure 78:
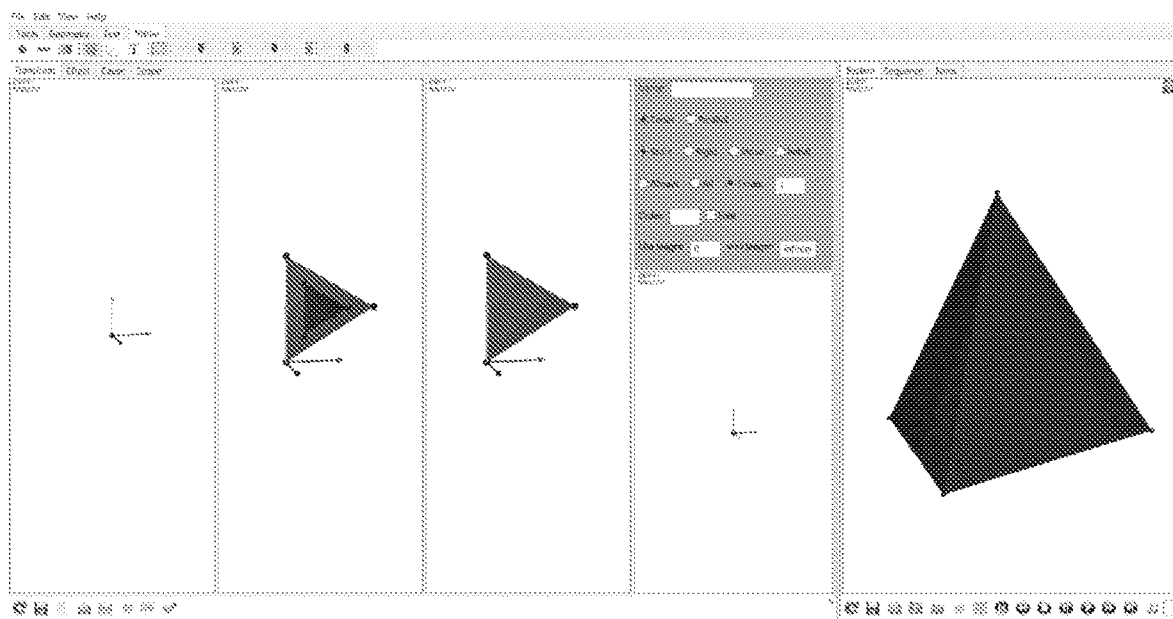

Then, the user creates the effect in the effect window by adding a form or modifying the geometry of the form contained in the effect window by using the elements of the geometry tab or by manually modifying the 3D model. Alternatively, the user may import a 3D model from a library. In this example, a smaller tetrahedron is added on the triangle, as illustrated in FIG. 78.

Figure 79:
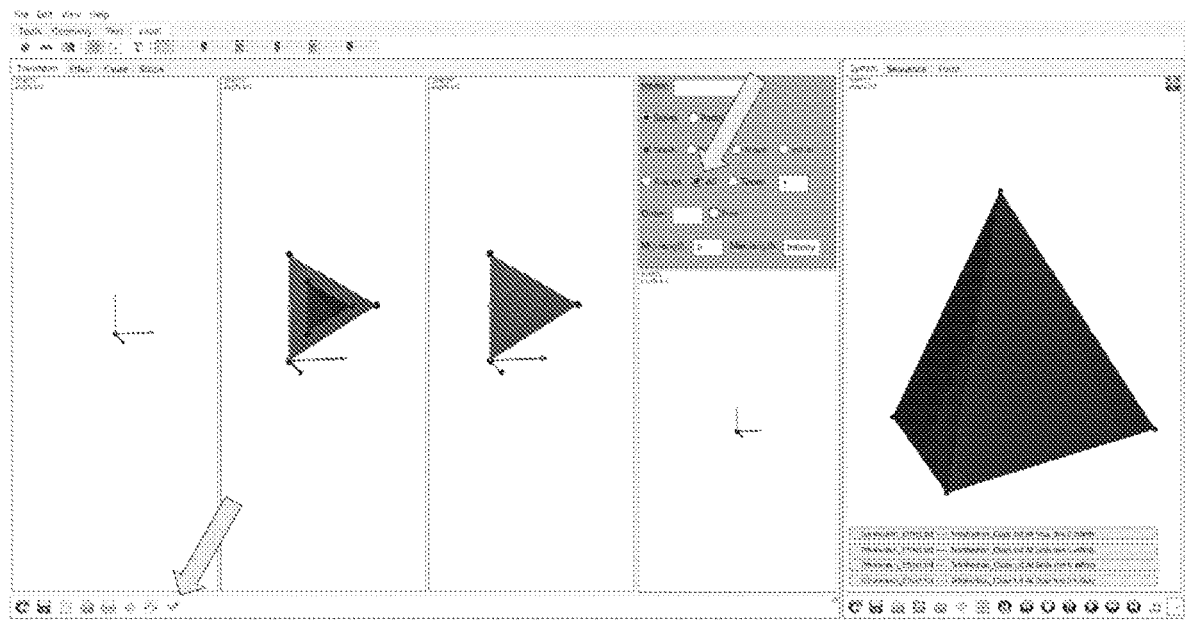

As illustrated in FIG. 79, the user then inputs the transform data. For example, the user may click the radio button "All" in the data of the transform, then click four times on the "check mark" to inject this transform in the universe. The "All" button indicates that the transform will be applied to all the triangles of the universe which match with the triangle of the output-site.

Figure 80:
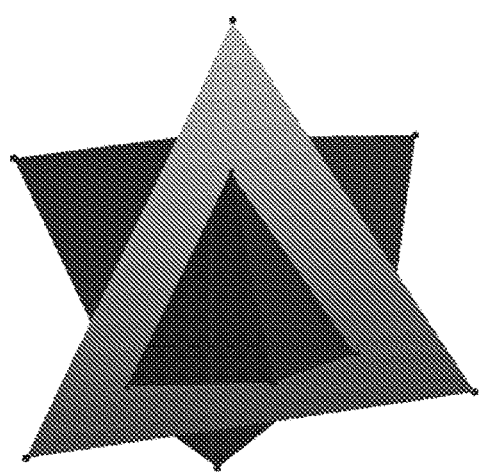
FIG. 80 illustrates the tetrahedron obtained following the steps illustrated in FIGS. 75-79, in accordance with an embodiment.

When the user presses the "Step" button, the transform is applied once. Each triangle of the tetrahedron is replaced by a triangle with a smaller tetrahedron on it. The resulting form is illustrated in FIG. 80.

Figure 81:
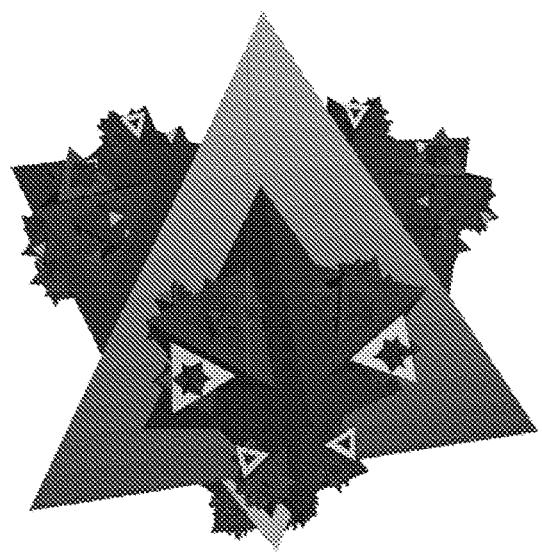
FIG. 81 illustrates a complex fractal obtained following the steps illustrated in FIGS. 75-79, in accordance with an embodiment.

When the user pressed "Play", the three other transforms are successively applied to give the following complex fractal to obtain the form illustrated in FIG. 81.

Use of the Input-Site, Output-Site and Effect of a Transform

Figure 82:
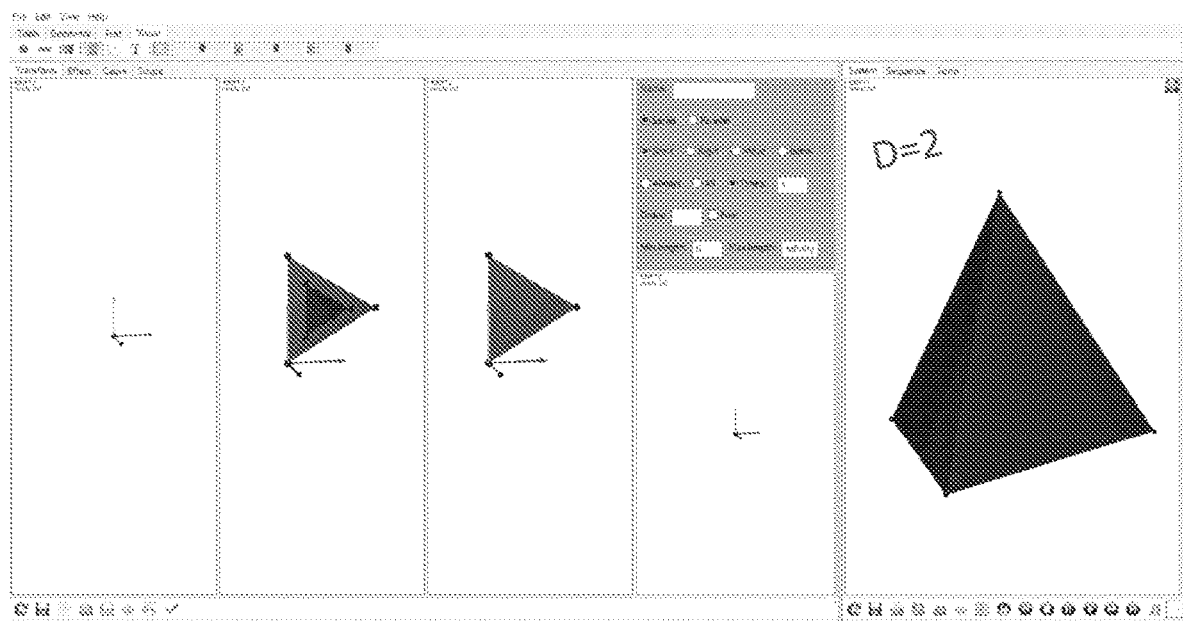
FIGS. 82 to 84 illustrates the use of transform provided with an input site, an effect and an output site, in accordance with an embodiment.

The same example is now described while using a transform having an input site. In this case, texts, values, 3D models or data can be added to the universe. In the present example, the text "D=2" is added to the universe as illustrated in FIG. 82.

Figure 83:
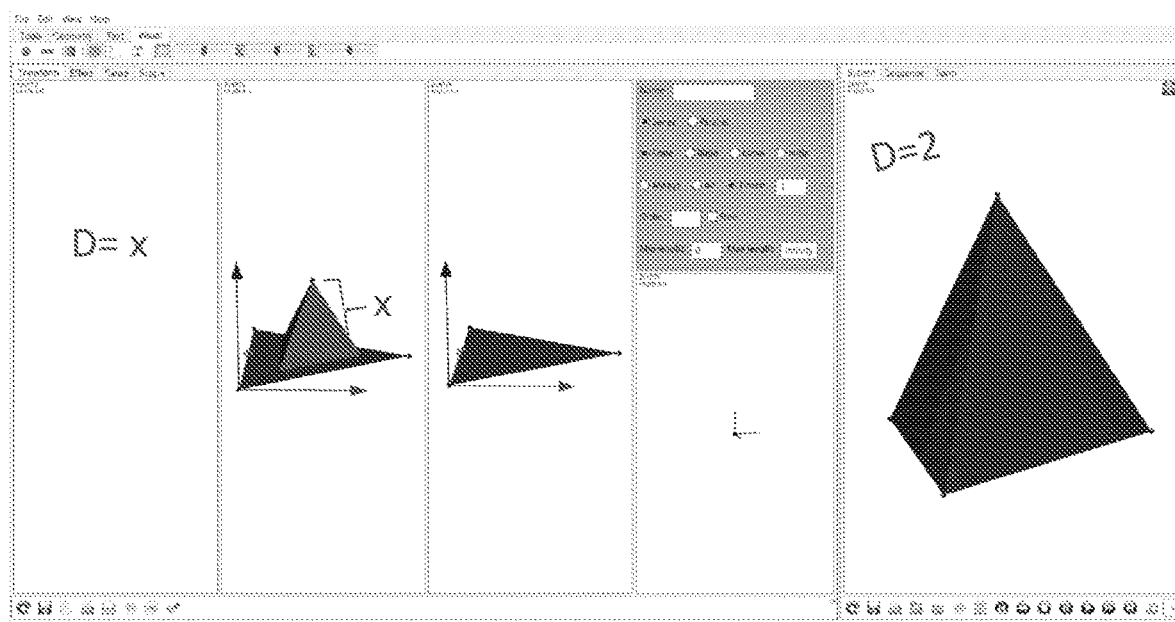

The user adds the text "D=x" in the input-site, as illustrated in FIG. 83. The "x" indicates that the output-site will match objects of the form "D=x" where "x" can be anything. Then, the user indicates in the effect (or optionality the output-site) where that value "x" will be used. In this example, the value "x" will be assigned to the height of the triangle's smaller tetrahedron.

Figure 84:
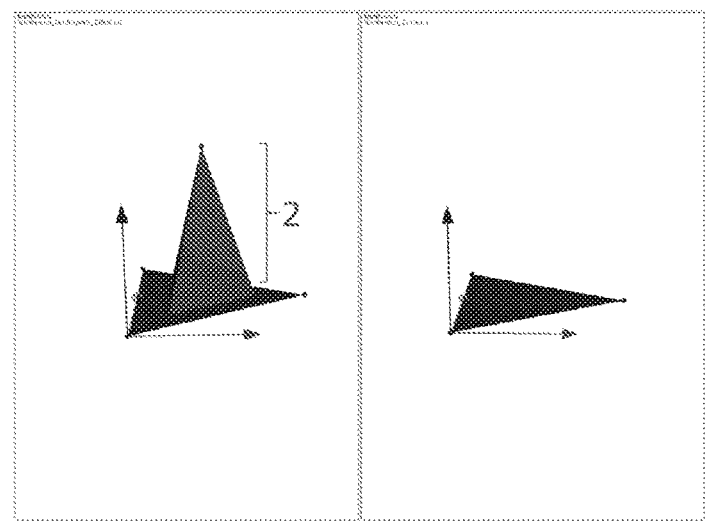
Figure 85:
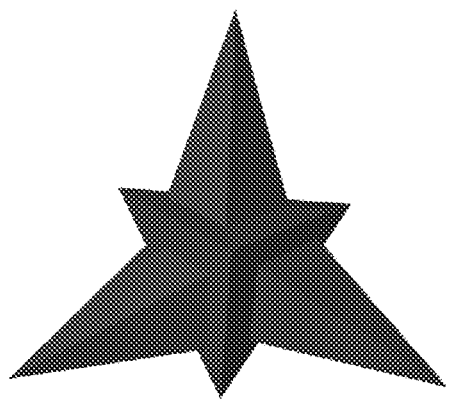
FIGS. 85 to 88 illustrates a model obtained after successively applying the transform depicted in FIG. 83, in accordance with an embodiment.
Figure 86:
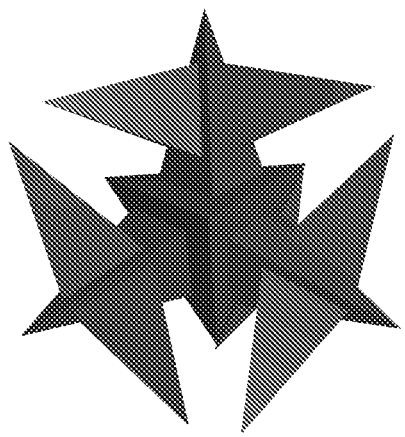
Figure 87:
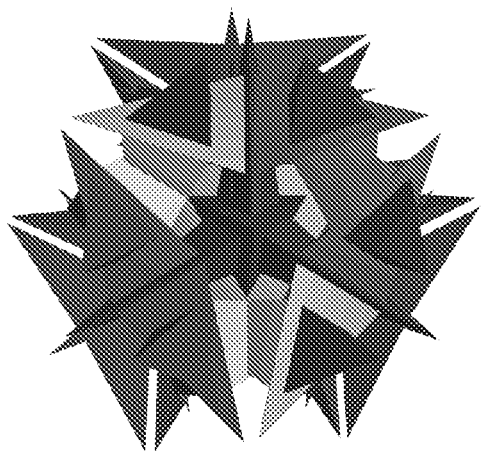

After injecting and applying the transform with the radio button "All" selected, the transform matches the input site with the text "D=2" from the universe. Then, the value "2" will replace the "x" in the effect as illustrated in FIG. 84. The effect and output-site of the transform to be applied will be computed.

The resultant universe after the application of the transform four times is illustrated in FIGS. 85-88.

Dynamic Input

In the previous example, the text "D=2" is always the same in the universe. A more dynamic and changing input can be used.

Figure 89:
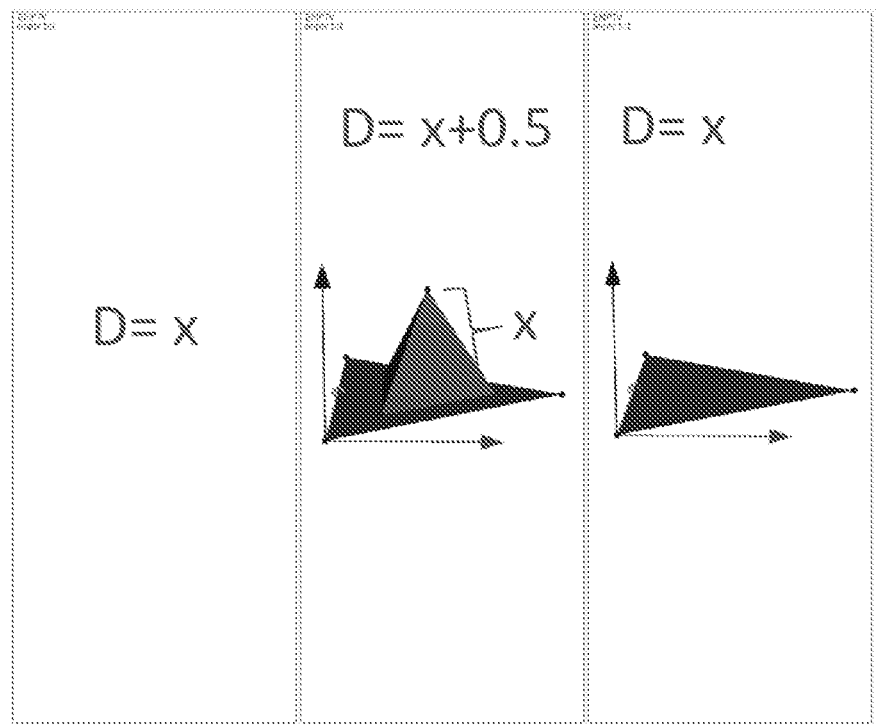
FIG. 89 illustrates a transform that dynamically changes the input site match, in accordance with an embodiment.

I) The transform could change the value "D=2" to some greater values after each application of the transform. For example, the transform may add a tetrahedron to the triangles while changing "D=2" to "D=2.5" which was computed by "D=x+0.5", as illustrated in FIG. 89.

The first application of the transform will give a height of 2 to the added tetrahedrons, the second height of 2.5, the third a height of 3 and so on. In other words, the height in the transform depends on the initial value of "D" in the universe and the number of times this transform was applied.

II) The input can be extracted from other shapes in the universe that are themselves modified as the universe changes under the applications of multiple other transforms. For example, the "x" could come from the distance between two points between objects.

Figure 90:
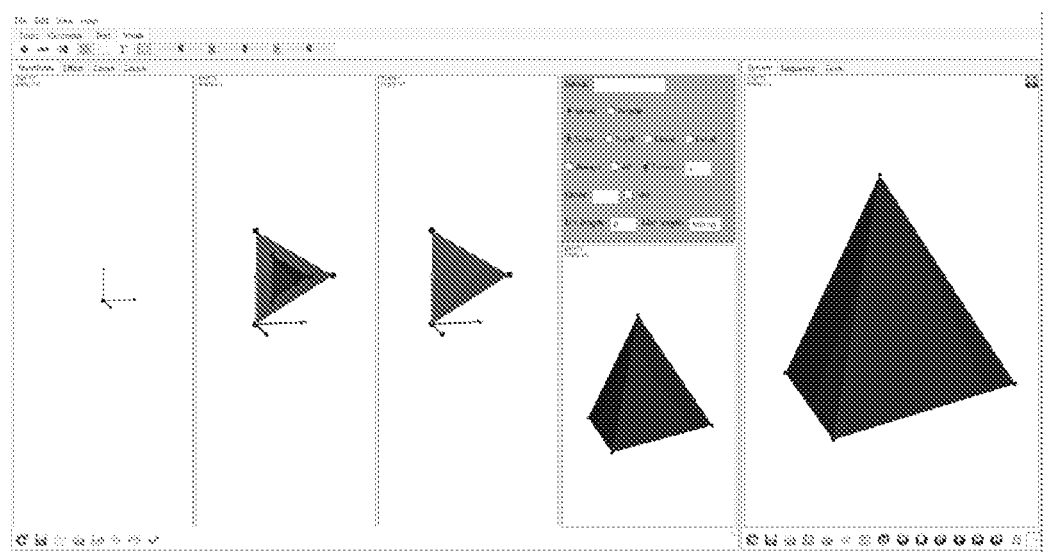
FIGS. 90 to 91 illustrate exemplary transforms provided with different scopes.
Figure 91:
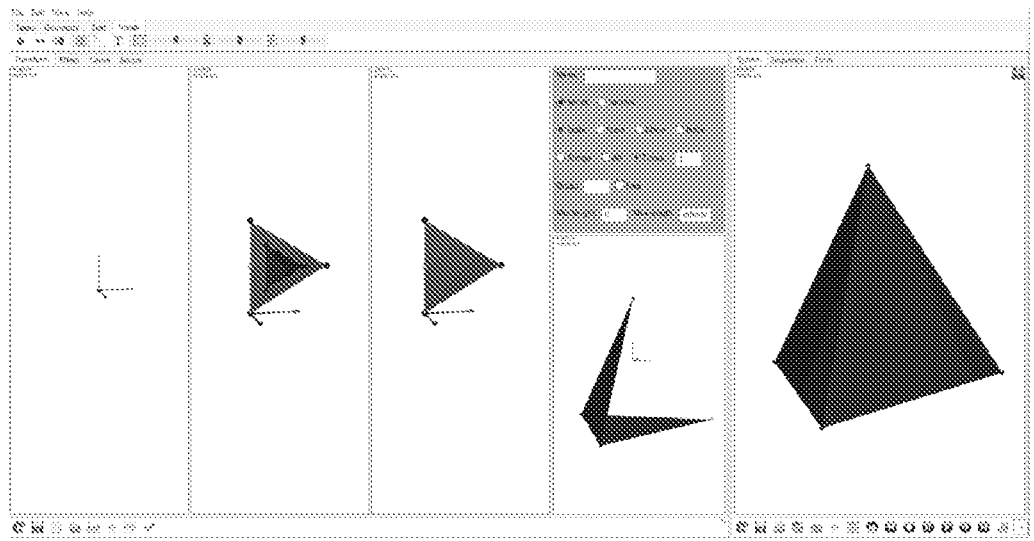

The Scope of a Transform a) After executing the above-described steps, the user may decide to use the output scope of the transform by clicking on the appropriate button in the lower right menu to transform to copy all the data of the universe in the output-scope of the transform, as illustrated in FIG. 90.

b) The user may select some of the faces of the tetrahedron of the scope. By pressing the delete button, the selected faces are removed. In the example illustrated in FIG. 91, only two faces are kept. This means that the transform will only be applied to the faces of the tetrahedron of the universe that correspond to the faces still present in the scope.

Figure 92:
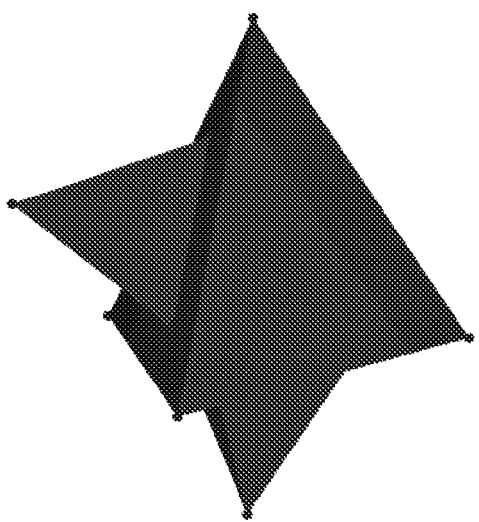
FIG. 92 illustrate a tetrahedron obtained by applying the transform of FIG. 91, in accordance with an embodiment.

In this example, the resultant universe will contain after one application of the transform, a tetrahedron with the left side and bottom side with a smaller tetrahedron on it as illustrated in FIG. 92.

Recording of a Transform

The manual changes made in the universe may be recorded as a transform.

Figure 93:
FIG. 93 illustrates a line segment, in accordance with an embodiment.

For example, the user may add to the universe a line segment with a dot on one of its ends, as illustrated in FIG. 93. This may be done by using the "geometry tab" components.

The user presses the "record" button at the bottom of the user interface. Until the record button is unpressed, a transform will be created and recorded for manual modifications to be done by the user in the universe.

Figure 94:
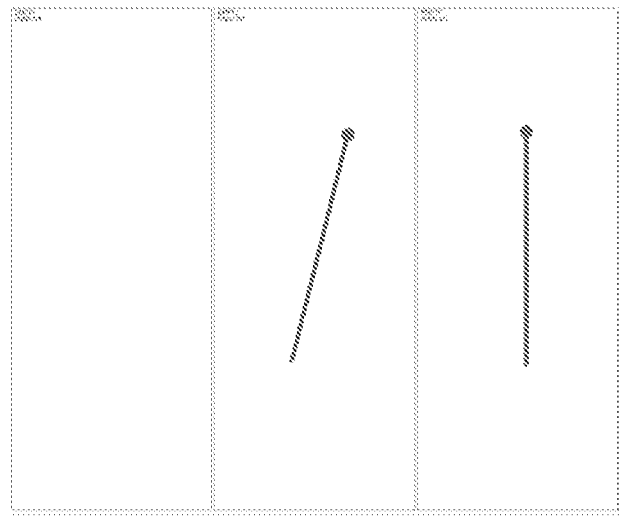
FIG. 94 illustrates a transform for rotating the line segment of FIG. 93, in accordance with an embodiment.

The user clicks on the line segment and manually rotate the line segment by about 20 degrees. Then, a transform is created and displayed on the left, as illustrated in FIG. 94.

Figure 95:
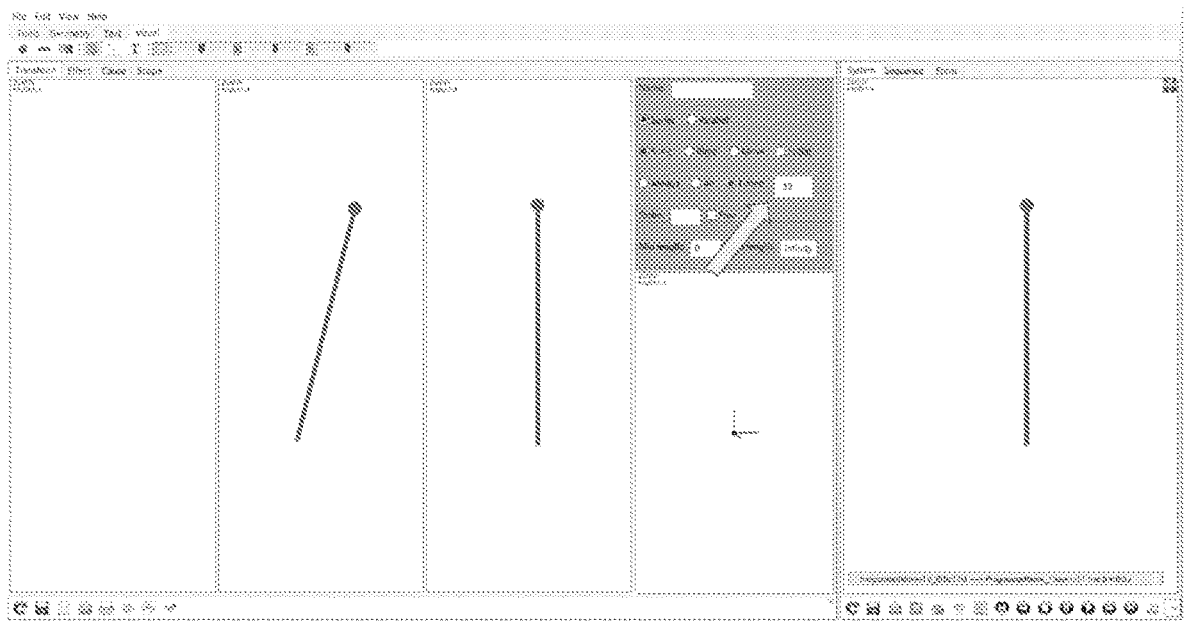
FIG. 95 illustrates the inputting of the number of times a transform will be applied within a user graphical interface, in accordance with an embodiment.

If the user is satisfied with the recorded transform, the user deselects the recording button. Then, after inputting "12" in the box "times" of the data of the transforms, the recorded transform is injected in the universe, as illustrated in FIG. 95.

Figure 96:
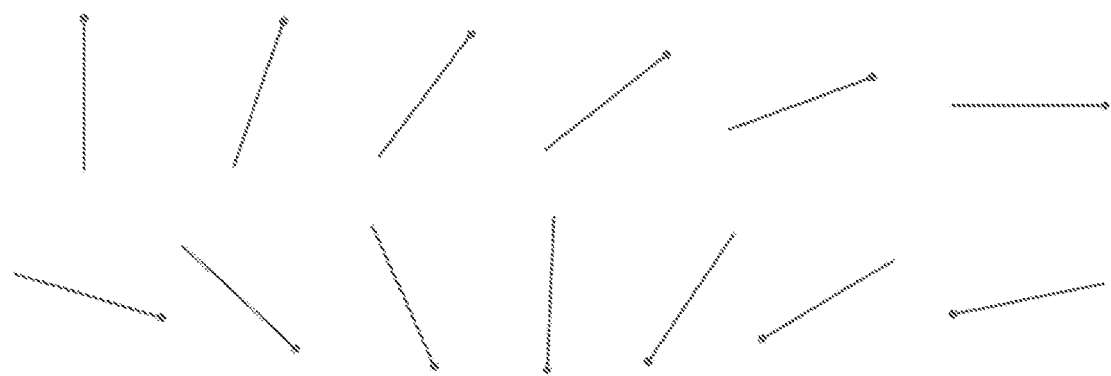
FIG. 96 illustrates the result of applying the transform of FIG. 95, in accordance with an embodiment.

After pressing "play", the line segment of the universe will be rotated 12 times, as illustrated in FIG. 96.

Editing Injected Transform

Figure 97:
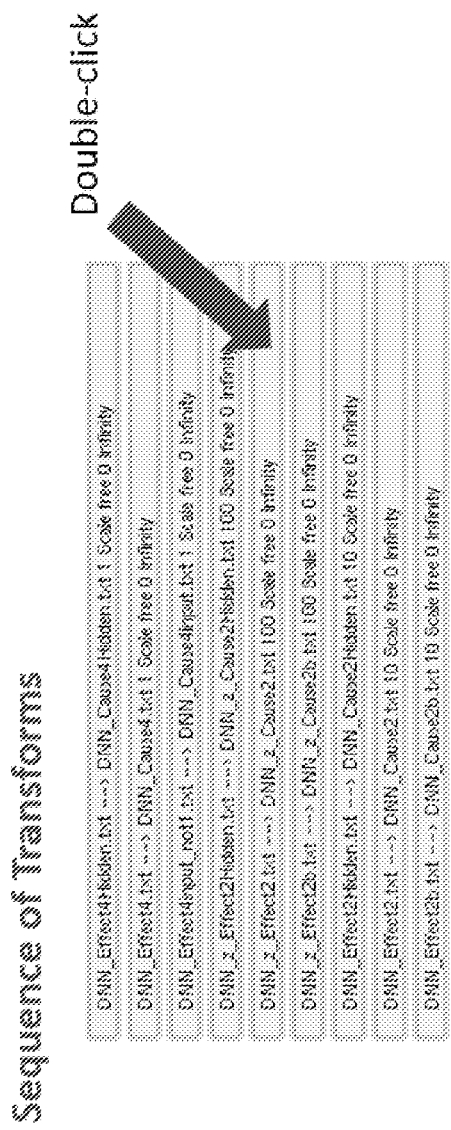
FIG. 97 illustrates an interface presenting a sequence of recorded transforms, in accordance with an embodiment.

Transforms that have been injected in the universe (which can be, but is not restricted to, a 2D or 3D space) can be edited and modified. FIG. 97 illustrates an interface presenting a sequence of recorded transforms. In the sequence of transforms, the user can double-click on one of the transforms.

The result of the double-click will display the transform in the GUI. Then the user can edit the specific transform for modification purposes. After modifying it, he can save it and it will act differently when it is it's turn to be applied.

In the sequence, it is possible to reorder the transform by dragging them up and down.

In one embodiment, a purpose of the present method and system is to provide a universal system with which models, simulations, communications and optimizations can be created and implemented for all domains of knowledge. Based on the present method, one can unify all knowledge and applications under a single system and paradigm. The universal system will now be referred to as "framework" in what follows.

The embodiments of the invention described above are intended to be exemplary only. The scope of the invention is therefore intended to be limited solely by the scope of the appended claims.

I claim:

1. A processing unit device comprising:
at least one control unit for controlling operations of the processing unit device;
a transform logic unit comprising at least one transform block associated with a transform to be executed by the at least one control unit, the transform comprising an effect to be applied to an output site comprising an output site form contained in an output universe, the output universe comprising a hierarchical data structure, the effect being associated with a modification of a property in a given hierarchical data substructure, each one of the at least one transform block comprising an effect block and an output site block, the effect block comprising at least one first storing unit for storing thereon information relative to the effect and the output site block comprising at least one second storing unit for storing thereon information relative to the output site; and
a display unit comprising a user graphical interface, the user graphical interface comprising
a first section for representing the output universe and the effect to be applied to the output site comprising the output site form contained in the output universe and
a second section for displaying a graphical representation of the transform.

2. The processing unit device of claim 1, wherein the at least one control unit is configured for executing the transform further using a transform-form instruction set comprising transform data defining parameters for the transform.

3. The processing unit device of claim 1, wherein the at least one control unit is included in the transform logic unit.

4. The processing unit device of claim 3, wherein the at least one control unit is included in a one of the at least one transform block.

5. The processing unit device of claim 4, wherein the at least one control unit comprises a plurality of control units and the at least one transform block comprises a plurality of transform blocks, each one of the plurality of control units being included in a respective one of the plurality of transform blocks.

6. The processing unit device of claim 5, wherein the at least one control unit comprises at least one first logic unit included in the effect block and at least one second logic unit included in the output site block.

7. The processing unit of claim 1, wherein information about the output universe is stored on at least one of some of the first storing units and some of the second storing units.

8. The processing unit device of claim 1, wherein each one of the at least one transform block comprises both the output site block and an input site block comprising at least one third storing unit for storing thereon information relative to an input site contained in an input universe.

9. The processing unit device of claim 8, wherein each one of the at least one transform block further comprises:
an input site scope block comprising at least one fourth storing unit for storing thereon information relative to an input scope defining a subspace of the input universe; and
an output site scope block comprising at least one fifth storing unit for storing thereon information relative to an output scope defining a subspace of the output universe.

10. The processing unit of claim 1, wherein the transform further comprises a second effect to be modified with information from an input site contained in an input site universe, and wherein the transform block further comprises an input site block comprising at least one second storing unit for storing thereon information relative to the input site.

11. A computer-implemented method for programming, the computer-implemented method being executed by a processing unit operatively connected to a non-transitory storage medium, the computer-implemented method comprising:
receiving, from the non-transitory storage medium, a transform comprising at least: (1) an output site comprising an output site form, the output site form comprising a given hierarchical data substructure; and (2) an effect, the effect being associated with a modification of a property in the given hierarchical data substructure;
identifying at least one form, in an output universe, that matches the output site form, thereby obtaining an output match on which the transform is to be applied, the output universe comprising a hierarchical data structure;
applying the effect to the output match, thereby obtaining a modified output match, the modified output match comprising at least one matched given hierarchical data substructure with the modified property;
outputting the modified output match; and
displaying a user graphical interface comprising a first section for representing the output universe and a second section for displaying a graphical representation of the transform, said outputting the modified output match comprising displaying the modified output match within the first section of the user graphical interface.

12. The computer-implemented method of claim 11, wherein said outputting comprises displaying a graphical presentation of the output universe and the modified output match within the output universe.

13. The computer-implemented method of claim 11, wherein the transform further comprises transform data defining parameters for the transform, said applying the effect to the retrieved output match being performed using the transform data.

14. The computer-implemented method of claim 11, wherein the transform further comprises an input site comprising an input site form, the input site form comprising another given hierarchical data substructure, the method further comprising identifying at least another form, in an input universe, that matches the input site form thereby obtaining an input match with the input site, the input universe comprising another hierarchical data structure, said applying the effect to the retrieved output match being performed using information associated with the retrieved input match.

15. The computer-implemented method of claim 14, further comprising displaying a user graphical interface comprising a first section for representing the output universe, a second section for defining the effect and a third section for representing the input universe.

16. The computer-implemented method of claim 15, further comprising:
    displaying the input site into the third section of the graphical user interface;
    displaying a graphical representation of the effect into the second section of the graphical user interface; and
    displaying the output site into the first section of the graphical user interface.

17. The computer-implemented method of claim 15, further comprising:
    displaying the input site into the third section of the graphical user interface;
    displaying a graphical representation of the effect into the second section of the graphical user interface;
    displaying the output site into the first section of the graphical user interface;
    displaying a graphical representation of the output scope in the fourth section of the graphical user interface; and
    displaying a graphical representation of the input scope in the fifth section of the graphical user interface.

18. The computer-implemented method of claim 14, further comprising receiving at least one of an input scope and an output scope, the input scope defining a subspace of the input universe and the output scope defining a subspace of the output universe, the input match being selected from the subspace of the input universe and the output match being selected from the subspace of the output universe.

19. The computer-implemented method of claim 18, further comprising displaying a user graphical interface comprising a first section for representing the output universe, a second section for defining the effect, a third section for representing the input universe, a fourth section for displaying the output scope and a fifth section for displaying the input scope.

20. A non-transitory computer-readable medium comprising computer instructions executable by at least one computer processor to perform:
    receiving a transform comprising at least: (1) an output site comprising an output site form, the output site form comprising a given hierarchical data substructure; and (2) an effect, the effect being associated with a modification of a property in the given hierarchical data substructure;
    identifying at least one form, in an output universe, that matches the output site form, thereby obtaining an output match on which the transform is to be applied, the output universe comprising a hierarchical data structure;
    applying the effect to the output match, thereby obtaining a modified output match, the modified output match comprising at least one matched given hierarchical data substructure with the modified property;
    outputting the modified output match; and
    displaying a user graphical interface comprising a first section for representing the output universe and a second section for displaying a graphical representation of the transform, said outputting the modified output match comprising displaying the modified output match within the first section of the user graphical interface.

* * * * *